US011591085B2

(12) United States Patent
Metzner et al.

(10) Patent No.: US 11,591,085 B2
(45) Date of Patent: Feb. 28, 2023

(54) AUTONOMOUS HOME SECURITY DEVICES

(71) Applicant: Amazon Technologies, Inc., Seattle, WA (US)

(72) Inventors: Jordan Anthony Metzner, Los Angeles, CA (US); Michael Edward James Paterson, Lafayette, CA (US); Benjamin Wild, Seattle, WA (US); James Wyatt Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/579,492

(22) Filed: Jan. 19, 2022

(65) Prior Publication Data

US 2022/0144424 A1 May 12, 2022

Related U.S. Application Data

(63) Continuation of application No. 17/029,688, filed on Sep. 23, 2020, now Pat. No. 11,260,970, which is a
(Continued)

(51) Int. Cl.
*H04N 5/44* (2011.01)
*B64C 39/00* (2023.01)
(Continued)

(52) U.S. Cl.
CPC ............ *B64C 39/005* (2013.01); *G08B 21/12* (2013.01); *G08B 21/182* (2013.01);
(Continued)

(58) Field of Classification Search
None
See application file for complete search history.

(56) References Cited

U.S. PATENT DOCUMENTS 4,865,248 A 9/1989 Barth
4,954,962 A 9/1990 Evans, Jr. et al.
(Continued)

FOREIGN PATENT DOCUMENTS

DE 102011086497 A1 5/2013
FR 2692064 A1 12/1993
(Continued)

OTHER PUBLICATIONS

Bullock et al., "Analysis of the Use of Digital Road Maps in Vehicle Navigation," 1994, IEEE, p. 494-501 (Year: 1994).
(Continued)

*Primary Examiner* — Munear T Akki
(74) *Attorney, Agent, or Firm* — Athorus, PLLC

(57) ABSTRACT

An aerial vehicle is programmed or configured to respond to reports of events or conditions within spaces of a facility. The aerial vehicle travels to a location of a reported event or condition and captures data using onboard sensors. The aerial vehicle independently determines whether the reported event or condition is occurring, or is otherwise properly addressed by resources that are available at the location, using images or other data captured by the onboard sensors. Alternatively, the aerial vehicle transmits a request for additional resources to be provided at the location, where necessary. A map of the location generated based on images or other data captured by the onboard sensors may be utilized for any purpose, such as to make one or more recommendations of products that are appropriate for use at the facility.

20 Claims, 45 Drawing Sheets

Related U.S. Application Data continuation-in-part of application No. 16/584,721, filed on Sep. 26, 2019, now Pat. No. 10,796,562.

(51) Int. Cl.
  *G08B 21/12* (2006.01)
  *G08B 21/18* (2006.01)

(52) U.S. Cl.
  CPC .. *B64C 2201/024* (2013.01); *B64C 2201/042* (2013.01); *B64C 2201/088* (2013.01); *B64C 2201/108* (2013.01); *B64C 2201/122* (2013.01); *B64C 2201/123* (2013.01); *B64C 2201/127* (2013.01); *B64C 2201/141* (2013.01)

(56) References Cited

U.S. PATENT DOCUMENTS

| | | | |
|---|---|---|---|
| 5,040,116 A | 8/1991 | Evans, Jr. et al. | |
| 5,283,739 A | 2/1994 | Summerville et al. | |
| 5,386,462 A | 1/1995 | Schlamp | |
| 5,452,374 A | 9/1995 | Cullen et al. | |
| 5,497,236 A | 3/1996 | Wolff et al. | |
| 5,731,884 A | 3/1998 | Inoue | |
| 5,901,253 A | 5/1999 | Tretter | |
| 5,995,898 A | 11/1999 | Tuttle | |
| 6,031,612 A | 2/2000 | Shirley | |
| 6,266,577 B1 | 7/2001 | Popp et al. | |
| 6,344,796 B1 | 2/2002 | Ogilvie et al. | |
| 6,374,155 B1 | 4/2002 | Wallach et al. | |
| 6,426,699 B1 | 7/2002 | Porter | |
| 6,507,670 B1 | 1/2003 | Moed | |
| 6,543,983 B1 | 4/2003 | Felder et al. | |
| 6,636,781 B1 | 10/2003 | Shen et al. | |
| 6,690,997 B2 | 2/2004 | Rivalto | |
| 6,694,217 B2 | 2/2004 | Bloom | |
| 6,705,523 B1 | 3/2004 | Stamm et al. | |
| 6,919,803 B2 | 7/2005 | Breed | |
| 6,954,290 B1 | 10/2005 | Braudaway et al. | |
| 6,961,711 B1 | 11/2005 | Chee | |
| 6,965,440 B1 | 11/2005 | Nakagiri et al. | |
| 6,970,838 B1 | 11/2005 | Kamath et al. | |
| 7,006,952 B1 | 2/2006 | Matsumoto et al. | |
| 7,016,536 B1 | 3/2006 | Ling et al. | |
| 7,031,519 B2 | 4/2006 | Elmenhurst | |
| 7,129,817 B2 | 10/2006 | Yamagishi | |
| 7,133,743 B2 | 11/2006 | Tilles et al. | |
| 7,145,699 B2 | 12/2006 | Dolan | |
| 7,149,611 B2 | 12/2006 | Beck et al. | |
| 7,188,513 B2 | 3/2007 | Wilson | |
| 7,337,686 B2 | 3/2008 | Sagi-Dolev | |
| 7,337,944 B2 | 3/2008 | Devar | |
| 7,339,993 B1 | 3/2008 | Brooks et al. | |
| 7,459,880 B1 | 12/2008 | Rosen | |
| 7,639,386 B1 | 12/2009 | Siegel et al. | |
| 7,668,404 B2 | 2/2010 | Adams et al. | |
| 7,673,831 B2 | 3/2010 | Steele et al. | |
| 7,685,953 B2 | 3/2010 | Giles | |
| 7,693,745 B1 | 4/2010 | Pomerantz et al. | |
| 7,894,939 B2 | 2/2011 | Zini et al. | |
| 7,925,375 B2 | 4/2011 | Schininger et al. | |
| 7,946,530 B1 | 5/2011 | Talmage, Jr. | |
| 7,966,093 B2 | 6/2011 | Zhuk | |
| 8,015,023 B1 | 9/2011 | Lee et al. | |
| 8,078,317 B2 | 12/2011 | Allinson et al. | |
| 8,126,642 B2 | 2/2012 | Frepagnier et al. | |
| 8,131,607 B2 | 3/2012 | Park et al. | |
| 8,145,351 B2 | 3/2012 | Schininger et al. | |
| 8,195,328 B2 | 6/2012 | Mallett et al. | |
| 8,286,236 B2 | 10/2012 | Jung et al. | |
| 8,412,588 B1 | 4/2013 | Bodell et al. | |
| 8,418,959 B2 | 4/2013 | Kang et al. | |
| 8,429,754 B2 | 4/2013 | Jung et al. | |
| 8,511,606 B1 | 8/2013 | Lutke et al. | |
| 8,577,538 B2 | 11/2013 | Lenser et al. | |
| 8,599,027 B2 | 12/2013 | Sanchez | |
| 8,602,349 B2 | 12/2013 | Petrov | |
| 8,736,820 B2 | 5/2014 | Choe et al. | |
| 8,752,166 B2 | 6/2014 | Jung et al. | |
| 8,791,790 B2 | 7/2014 | Robertson et al. | |
| 8,874,301 B1 | 10/2014 | Rao et al. | |
| 8,899,903 B1 | 12/2014 | Saad et al. | |
| 8,948,914 B2 | 2/2015 | Zini et al. | |
| 8,956,100 B2 | 2/2015 | Davi et al. | |
| 8,989,053 B1 | 3/2015 | Skaaksrud et al. | |
| 9,033,285 B2 | 5/2015 | Iden et al. | |
| 9,051,043 B1 | 6/2015 | Peeters et al. | |
| 9,079,587 B1 | 7/2015 | Rupp et al. | |
| 9,139,310 B1 | 9/2015 | Wang | |
| 9,163,909 B2 | 10/2015 | Chengalva | |
| 9,195,959 B1 | 11/2015 | Lopez et al. | |
| 9,216,587 B2 | 12/2015 | Ando et al. | |
| 9,216,857 B1 | 12/2015 | Kalyan et al. | |
| 9,230,236 B2 | 1/2016 | Villamar | |
| 9,235,213 B2 | 1/2016 | Villamar | |
| 9,244,147 B1 | 1/2016 | Soundararajan et al. | |
| 9,256,852 B1 | 2/2016 | Myllymaki | |
| 9,261,578 B2 | 2/2016 | Im et al. | |
| 9,336,506 B2 | 5/2016 | Shucker et al. | |
| 9,336,635 B2 | 5/2016 | Robertson et al. | |
| 9,358,975 B1 | 6/2016 | Watts | |
| 9,373,149 B2 | 6/2016 | Abhyanker | |
| 9,381,916 B1 | 7/2016 | Zhu et al. | |
| 9,397,518 B1 | 7/2016 | Theobald | |
| 9,404,761 B2 | 8/2016 | Meuleau | |
| 9,409,644 B2 | 8/2016 | Stanek et al. | |
| 9,411,337 B1 | 8/2016 | Theobald et al. | |
| 9,412,280 B1 | 8/2016 | Zwillinger et al. | |
| 9,436,183 B2 | 9/2016 | Thakur et al. | |
| 9,436,926 B2 | 9/2016 | Cousins et al. | |
| 9,448,559 B2 | 9/2016 | Kojo et al. | |
| 9,489,490 B1 | 11/2016 | Theobald | |
| 9,510,316 B2 | 11/2016 | Skaaksrud | |
| 9,535,421 B1 | 1/2017 | Canoso et al. | |
| 9,545,852 B2 | 1/2017 | Streett | |
| 9,561,941 B1 | 2/2017 | Watts | |
| 9,568,335 B2 | 2/2017 | Thakur et al. | |
| 9,582,950 B2 | 2/2017 | Shimizu et al. | |
| 9,600,645 B2 | 3/2017 | Fadell et al. | |
| 9,619,776 B1 | 4/2017 | Ford et al. | |
| 9,623,553 B1 | 4/2017 | Theobald et al. | |
| 9,623,562 B1 | 4/2017 | Watts | |
| 9,650,136 B1 | 5/2017 | Haskin et al. | |
| 9,652,912 B2 | 5/2017 | Fadell et al. | |
| 9,656,805 B1 | 5/2017 | Evans et al. | |
| 9,671,791 B1 | 6/2017 | Paczan | |
| 9,682,481 B2 | 6/2017 | Lutz et al. | |
| 9,697,730 B2 | 7/2017 | Thakur et al. | |
| 9,718,564 B1 | 8/2017 | Beckman et al. | |
| 9,720,414 B1 | 8/2017 | Theobald | |
| 9,731,821 B2 | 8/2017 | Hoareau et al. | |
| 9,733,646 B1 | 8/2017 | Nusser et al. | |
| 9,746,852 B1 | 8/2017 | Watts et al. | |
| 9,746,853 B2 | 8/2017 | Scheepjens et al. | |
| 9,778,653 B1 | 10/2017 | McClintock et al. | |
| 9,786,187 B1 | 10/2017 | Bar-Zeev et al. | |
| 9,796,529 B1 | 10/2017 | Hoareau et al. | |
| 9,828,092 B1 | 11/2017 | Navot et al. | |
| 9,858,604 B2 | 1/2018 | Apsley et al. | |
| 9,886,035 B1 | 2/2018 | Watts et al. | |
| 9,896,204 B1 | 2/2018 | Willison | |
| 9,959,771 B1 | 5/2018 | Carlson | |
| 9,959,773 B2 | 5/2018 | Raptopoulos et al. | |
| 9,974,612 B2 | 5/2018 | Pinter et al. | |
| 10,022,753 B2 | 7/2018 | Chelian et al. | |
| 10,022,867 B2 | 7/2018 | Saboo et al. | |
| 10,048,697 B1 | 8/2018 | Theobald | |
| 10,108,185 B1 | 10/2018 | Theobald | |
| 10,137,984 B1 | 11/2018 | Flick | |
| 10,558,226 B1 | 2/2020 | Bigdeli | |
| 2001/0045449 A1 | 11/2001 | Shannon | |
| 2002/0016726 A1 | 2/2002 | Ross | |
| 2002/0035450 A1 | 3/2002 | Thackston | |
| 2002/0072979 A1 | 6/2002 | Sinha et al. | |
| 2002/0087375 A1 | 7/2002 | Griffin et al. | |

(56) References Cited

U.S. PATENT DOCUMENTS

| | | |
|---|---|---|
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |
| 2004/0002898 A1 | 1/2004 | Kuhlmann et al. |
| 2004/0068416 A1 | 4/2004 | Solomon |
| 2004/0112660 A1 | 6/2004 | Johansson et al. |
| 2004/0160335 A1 | 8/2004 | Reitmeier et al. |
| 2004/0162638 A1 | 8/2004 | Solomon |
| 2004/0257199 A1 | 12/2004 | Fitzgibbon et al. |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0053534 A1 | 3/2006 | Mullen |
| 2006/0118162 A1 | 6/2006 | Saelzer et al. |
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1 | 10/2007 | Plishner |
| 2007/0244763 A1 | 10/2007 | Williams et al. |
| 2007/0293978 A1 | 12/2007 | Wurman et al. |
| 2008/0012697 A1 | 1/2008 | Smith et al. |
| 2008/0027591 A1 | 1/2008 | Lenser et al. |
| 2008/0100258 A1 | 5/2008 | Ward |
| 2008/0109246 A1 | 5/2008 | Russell |
| 2008/0111816 A1 | 5/2008 | Abraham et al. |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0189012 A1 | 8/2008 | Kaufmann |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0086275 A1 | 4/2009 | Liang et al. |
| 2009/0091435 A1 | 4/2009 | Bolourchi |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0007479 A1 | 1/2010 | Smith |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0169185 A1 | 7/2010 | Cottingham |
| 2010/0287065 A1 | 11/2010 | Alivandi |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0112761 A1 | 5/2011 | Hurley et al. |
| 2011/0153052 A1 | 6/2011 | Pettibone et al. |
| 2011/0166707 A1 | 7/2011 | Romanov et al. |
| 2011/0246331 A1 | 10/2011 | Luther et al. |
| 2011/0264311 A1 | 10/2011 | Lee et al. |
| 2011/0282476 A1 | 11/2011 | Hegemier et al. |
| 2011/0313878 A1 | 12/2011 | Norman |
| 2012/0039694 A1 | 2/2012 | Suzanne |
| 2012/0078592 A1 | 3/2012 | Sims |
| 2012/0109419 A1 | 5/2012 | Mercado |
| 2012/0219397 A1 | 8/2012 | Baker |
| 2012/0221438 A1 | 8/2012 | Cook et al. |
| 2012/0234969 A1* | 9/2012 | Savoye ............... A63H 27/12 244/17.11 |
| 2012/0323365 A1 | 12/2012 | Taylor et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0093582 A1 | 4/2013 | Walsh et al. |
| 2013/0126611 A1 | 5/2013 | Kangas et al. |
| 2013/0148123 A1 | 6/2013 | Hayashi |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0324164 A1 | 12/2013 | Vulcano |
| 2014/0022055 A1 | 1/2014 | Levien et al. |
| 2014/0025230 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0283104 A1 | 9/2014 | Nilsson |
| 2014/0309813 A1 | 10/2014 | Ricci |
| 2014/0325218 A1 | 10/2014 | Shimizu et al. |
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0058181 A1 | 3/2016 | Han et al. |
| 2016/0068267 A1 | 3/2016 | Liu et al. |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |

(56) References Cited

U.S. PATENT DOCUMENTS

| | | | |
|---|---|---|---|
| 2016/0117931 A1 | 4/2016 | Chan et al. | |
| 2016/0129592 A1 | 5/2016 | Saboo et al. | |
| 2016/0130015 A1* | 5/2016 | Caubel | B64C 27/08 |
| | | | 244/120 |
| 2016/0132059 A1 | 5/2016 | Mason et al. | |
| 2016/0144734 A1 | 5/2016 | Wang et al. | |
| 2016/0144982 A1 | 5/2016 | Sugumaran | |
| 2016/0180618 A1 | 6/2016 | Ho et al. | |
| 2016/0196755 A1 | 7/2016 | Navot et al. | |
| 2016/0196756 A1 | 7/2016 | Prakash et al. | |
| 2016/0200438 A1 | 7/2016 | Bokeno et al. | |
| 2016/0207627 A1 | 7/2016 | Hoareau et al. | |
| 2016/0214717 A1 | 7/2016 | Silva | |
| 2016/0214728 A1* | 7/2016 | Rossi | B64C 27/08 |
| 2016/0235236 A1 | 8/2016 | Byers et al. | |
| 2016/0236778 A1 | 8/2016 | Takayama et al. | |
| 2016/0239789 A1 | 8/2016 | Hanks | |
| 2016/0239803 A1 | 8/2016 | Borley et al. | |
| 2016/0257401 A1 | 9/2016 | Buchmueller et al. | |
| 2016/0258775 A1 | 9/2016 | Santilli et al. | |
| 2016/0266578 A1 | 9/2016 | Douglas et al. | |
| 2016/0282126 A1 | 9/2016 | Watts et al. | |
| 2016/0299233 A1 | 10/2016 | Levien et al. | |
| 2016/0321503 A1 | 11/2016 | Zhou | |
| 2016/0334229 A1 | 11/2016 | Ross et al. | |
| 2016/0340021 A1* | 11/2016 | Zhang | B64C 39/024 |
| 2016/0364660 A1 | 12/2016 | Brown | |
| 2016/0364679 A1 | 12/2016 | Cao | |
| 2016/0364823 A1 | 12/2016 | Cao | |
| 2016/0364989 A1 | 12/2016 | Speasl et al. | |
| 2017/0011333 A1 | 1/2017 | Greiner et al. | |
| 2017/0011340 A1 | 1/2017 | Gabbai | |
| 2017/0032315 A1 | 2/2017 | Gupta et al. | |
| 2017/0087999 A1 | 3/2017 | Miller et al. | |
| 2017/0096222 A1 | 4/2017 | Spinelli et al. | |
| 2017/0098378 A1 | 4/2017 | Soundararajan et al. | |
| 2017/0100837 A1 | 4/2017 | Zevenbergen et al. | |
| 2017/0101017 A1 | 4/2017 | Street | |
| 2017/0113352 A1 | 4/2017 | Luiz et al. | |
| 2017/0147975 A1 | 5/2017 | Natarajan et al. | |
| 2017/0154347 A1 | 6/2017 | Bateman | |
| 2017/0164319 A1 | 6/2017 | Skaaksrud et al. | |
| 2017/0167881 A1 | 6/2017 | Rander et al. | |
| 2017/0193442 A1 | 7/2017 | Ekkel et al. | |
| 2017/0199522 A1 | 7/2017 | Li et al. | |
| 2017/0255896 A1 | 9/2017 | Dyke | |
| 2017/0286905 A1 | 10/2017 | Richardson et al. | |
| 2017/0300855 A1 | 10/2017 | Lund et al. | |
| 2017/0305526 A1* | 10/2017 | Thomassey | B64C 27/22 |
| 2017/0308098 A1 | 10/2017 | Yu et al. | |
| 2017/0316379 A1 | 11/2017 | Lepek et al. | |
| 2017/0330145 A1 | 11/2017 | Studnicka et al. | |
| 2017/0345245 A1 | 11/2017 | Forresani et al. | |
| 2017/0372256 A1 | 12/2017 | Kantor et al. | |
| 2018/0024554 A1 | 1/2018 | Brady et al. | |
| 2018/0088586 A1 | 3/2018 | Hance et al. | |
| 2018/0127211 A1 | 5/2018 | Jarvis et al. | |
| 2018/0137454 A1 | 5/2018 | Kulkarni et al. | |
| 2018/0203464 A1 | 7/2018 | Yu et al. | |

FOREIGN PATENT DOCUMENTS

| | | |
|---|---|---|
| JP | 2004126800 A | 4/2004 |
| JP | 2011211025 A | 10/2011 |
| WO | 2013148123 A1 | 10/2013 |
| WO | 2017064202 A1 | 4/2017 |
| WO | 2018156991 A1 | 8/2018 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/gO/about_us/logistics_insights/dhl_self_driving_vehicles.pdf with an archived Web version available on https://web.archive.org/web/20151018154844/http://www.dhl.com/content/dam/downloads/gO/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kuckelhaus et al., URL: http://www.dhl.com/content/dam/downloads/gO/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

International Search Report and Written Opinion dated Mar. 16, 2021, issued in International Application No. PCT/US2020/052268.

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Nanohawk Aeraccess: "Unmanned Aerial Vehicle—Aeraccess—Nanohawk—Webarchive Jun. 16, 2019", Jun. 16, 2019 (Jun. 16, 2019), pp. 1-3, XP055759013,URL: https://web.archive.org/web/20190616235755/http://www.aeraccess-group.com/product/indoor/nanohawk [Retrieved from the Internet: Dec. 10, 2020]; the whole document.

Navaravong et al., "Formation Reconfiguration for Mobile Robots with Network Connectivity Constraints," 2012, IEEE, g. 18-24 (Year: 2012).

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

Partial International Search Report for International Application No. PCT/US2020/052268, dated Jan. 20, 2021.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.

URL: https://web.archive.org/web/20160804001046/https://www.starship.xyz/, download date: Aug. 4, 2016, 21 pages.

* cited by examiner

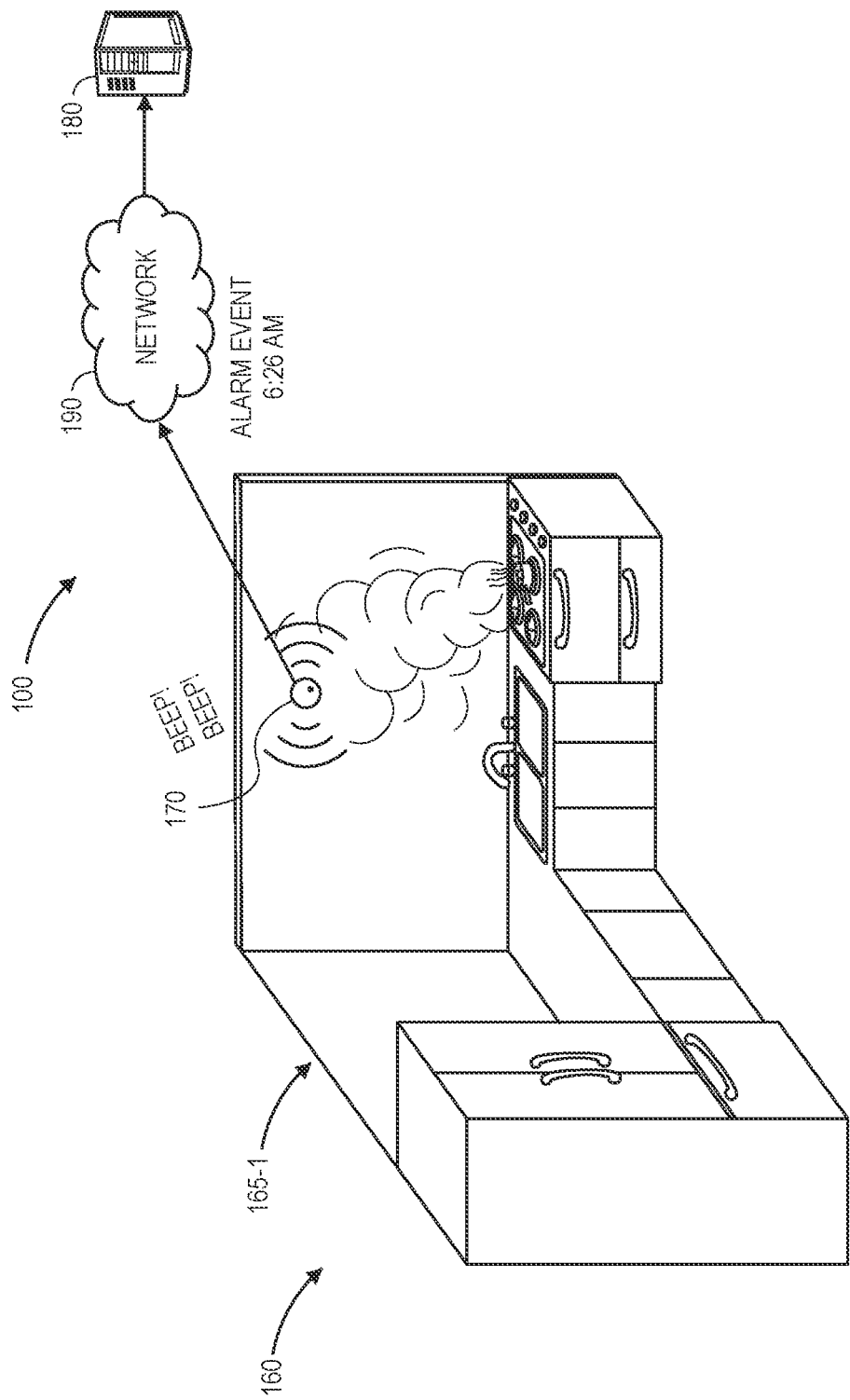

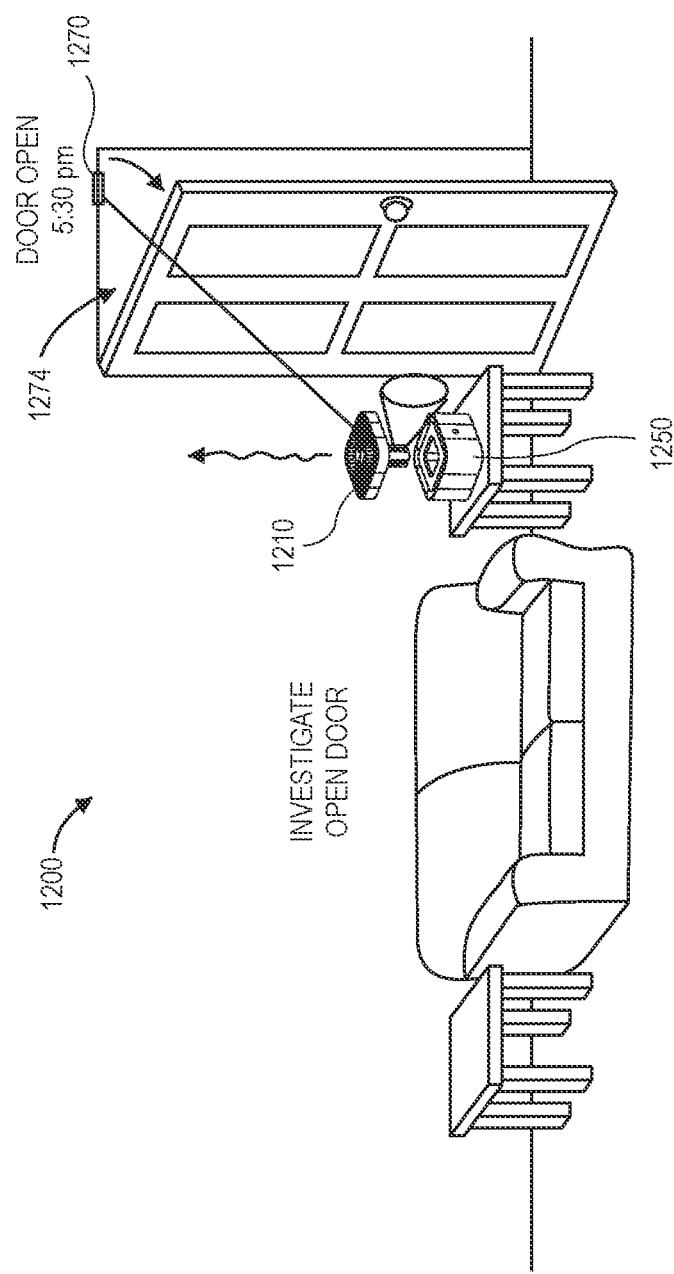

AUTONOMOUS HOME SECURITY DEVICES

CROSS-REFERENCE TO RELATED APPLICATIONS

This application is a continuation of U.S. patent application Ser. No. 17/029,688, now U.S. Pat. No. 11,260,970, filed Sep. 23, 2020, which is a continuation-in-part of U.S. patent application Ser. No. 16/584,721, now U.S. Pat. No. 10,796,562, filed Sep. 26, 2019. The contents of each of these applications are incorporated by reference herein in their entireties.

BACKGROUND

Many security systems are configured to monitor a space within a home, an office, or another facility to determine whether one or more predetermined substances is present within the facility, or whether one or more hazardous conditions is occurring there. For example, some security systems include sensors that may be mounted to fixed and movable portions of doors, windows or other portals, and configured to generate one or more signals when such portals are opened or closed. Some security systems also include one or more motion detectors that are configured to emit light at various wavelengths (e.g., infrared or microwave light) into spaces, and to generate one or more signals where return times of reflected light signals are different, due to the presence of one or more moving objects within such spaces. Some security systems also include one or more smoke detectors having photoelectric sensors with light sources that emit light into sensing chambers, or ionization chambers that permit electric current flow to pass between pairs of plates, and are configured to generate one or more signals upon determining that smoke is present within one or more spaces based on disruptions in the passage of light or the flow of current within such chambers. Some security systems also include one or more water sensors having probes or elements that form parts of electrical circuits that are open when the probes or sensors are dry, and closed when the probes or sensors are wet, and are configured to generate one or more signals upon determining that water is present within one or more spaces, e.g., when such circuits are closed. Security systems may include any number of such sensors, or other sensors, such as thermometers, hygrometers, barometers, carbon monoxide or carbon dioxide detectors, radon detectors, or others.

Security systems may also be outfitted with one or more transceivers or other communication components that are configured to contact an owner or other occupant of a facility when one or more predetermined events or conditions are detected within one or more spaces of the facility. Where a sensor determines that one or more of the predetermined events or conditions is occurring, and an owner or other occupant of (or personnel associated with) the facility is not present or is unreachable, such security systems may also contact one or more public or private authorities, which may then dispatch resources to a location of the facility to determine whether the one or more predetermined events or conditions is actually occurring, or to determine a degree or an extent to which such events or conditions are occurring.

Unfortunately, many security systems have extremely high rates of "false alarms," in which one or more sensors at a facility reports, in error, that an event or condition is occurring at a facility. Security systems, or public or private authorities dispatched in response to signals received from such systems, are typically programmed or instructed to treat all reports of events or conditions as if such events or conditions are actually occurring. Dispatching resources to a facility in response to a report of an event or condition comes at a cost, however, and where such reports are false, or are otherwise erroneous or misstated, resources that are dispatched in response to such reports are typically unavailable to respond to reports of events or conditions that are actually occurring or present at the facility or elsewhere.

Furthermore, many security systems that rely on cameras, microphones or other acoustic or visual sensors, may subject owners or other occupants of facilities to privacy risks. For example, cameras or microphones that are mounted outside or inside of facilities, or otherwise in association with the facilities, may be configured for continuous operation by one or more security systems. To the extent that such systems are subject to hacking, spoofing or other surreptitious acts, data captured using cameras or microphones for the purposes of monitoring or ensuring the safety of spaces within a home, an office, or another facility may end up in the wrong hands, thereby unintentionally, and ironically, leaving the owners or occupants less secure for having installed and operated such systems.

Moreover, most security systems are installed in a static manner, and are unable to determine when any structural or functional variations or modifications have occurred in spaces where such systems are installed. Most security systems that are installed within a space are also not integrated with existing systems within the space, and are instead limited to performing specific security-related functions.

BRIEF DESCRIPTION OF THE DRAWINGS

FIGS. 1A through 1F are views of aspects of one system including an autonomous home security device in accordance with embodiments of the present disclosure.

FIGS. 12A through 12C are views of aspects of one system including an autonomous home security device in accordance with embodiments of the present disclosure.

DETAILED DESCRIPTION

Figure 1B:
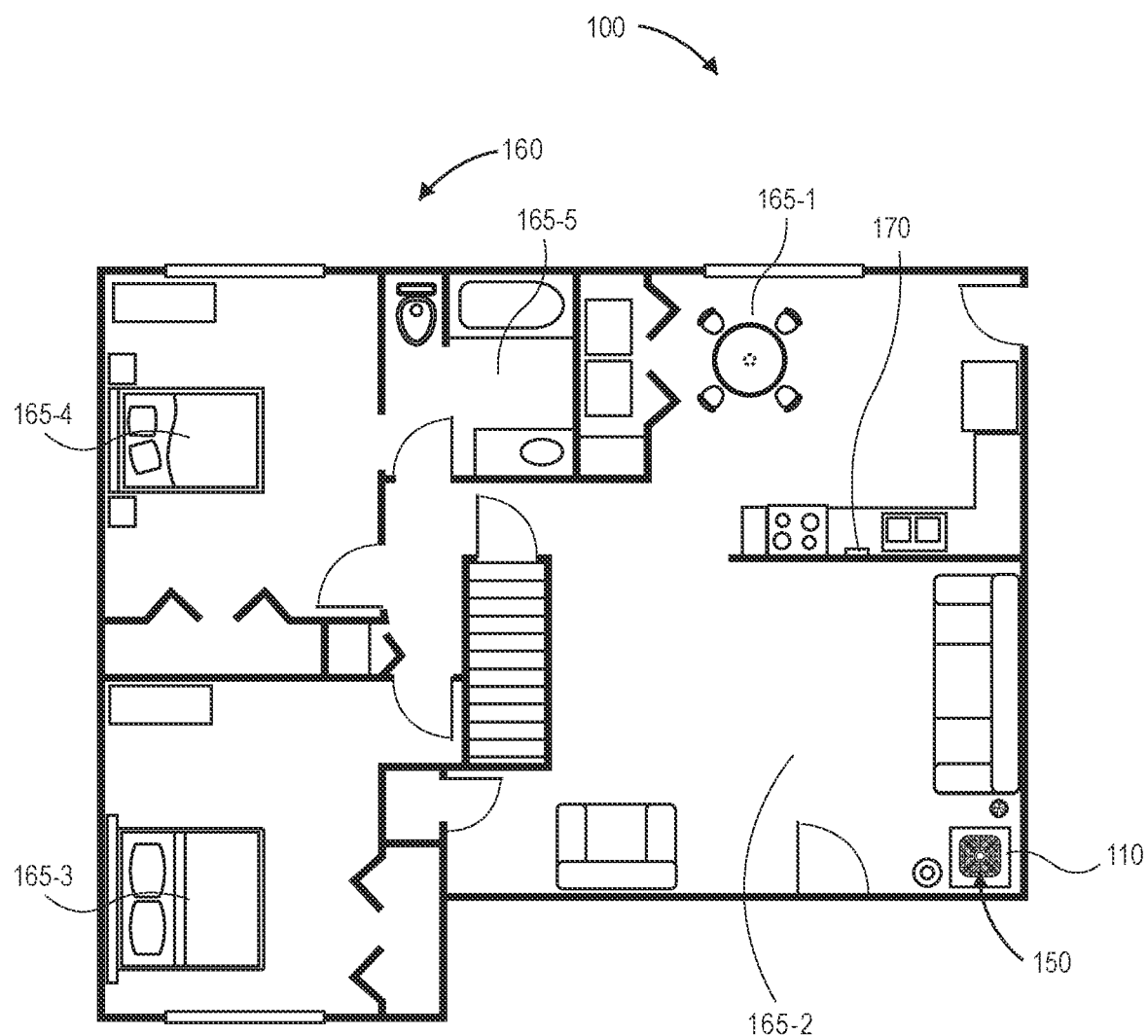

As is set forth in greater detail below, the present disclosure is directed to autonomous home security devices, including but not limited to aerial vehicles (e.g., drones), that are configured to perform one or more support functions within a home, an office, or any other facility. More specifically, the systems and methods of the present disclosure are directed to the use of autonomous vehicles to identify, or to confirm or verify, the existence of one or more events or conditions within spaces of a facility that may require external support or assistance from outside of the facility. Such events or conditions may include, but are not limited to, break-ins or other security breaches or violations, as well as fires or flooding conditions of any kind, or any other hazardous, abnormal or undesirable events or conditions. For example, in some embodiments, an alarm event or condition may be detected or identified by one or more sensors that are present within one or more spaces within a facility, and an autonomous vehicle outfitted with one or more cameras or other sensors may be dispatched or otherwise instructed to attend to such spaces. The autonomous vehicle may capture images or other data from such spaces, and the images or other data may be processed independently or in concert with other data, e.g., signals, information or data received from the sensors that originally detected or identified the alarm event or condition, to confirm whether the alarm event or condition exists within such spaces, or whether the alarm event or condition was improperly identified (e.g., a false alarm) or otherwise no longer exists. If the autonomous vehicle determines that the alarm event or condition does, in fact, exist, the autonomous vehicle may specify a type or level of additional resources that may be required to address the alarm event or condition, or to provide relevant information or data regarding a location where such additional resources may be appropriately directed.

The systems and methods of the present disclosure may be further directed to the use of autonomous vehicles to evaluate one or more spaces within a facility, e.g., regularly or periodically, or at scheduled or random times. For example, where an autonomous vehicle is outfitted with one or more cameras or other sensors, the autonomous vehicle may travel throughout such spaces and capture not only images (e.g., visual images or depth images) but also information or data regarding emissions of energy by one or more components within such spaces, such as security system components (e.g., door or window sensors, motion detectors, smoke detectors, carbon monoxide or dioxide detectors, or the like), wireless communications systems (e.g., routers), computer devices (e.g., mobile devices or personal devices), electrical components or systems (e.g., outlets or conductors), or any other systems within such spaces. In some embodiments, the autonomous vehicle may be transported (e.g., carried) or escorted by a human actor throughout such spaces as the images or other information or data are captured using such sensors. For example, as the autonomous vehicle is transported or escorted throughout a space, the autonomous vehicle may operate one or more propulsion motors or other systems to maintain altitude or tilt control.

The visual and the depth images captured by the autonomous vehicle may be processed to identify boundaries or physical features within such spaces, while the data regarding emissions of energy captured by the autonomous vehicle may be analyzed and characterized to identify types of energy sources within such spaces and their respective locations. A physical map of a facility, or of the one or more spaces therein, may be generated based on such boundaries and locations of such energy sources. The physical map may be utilized for any purpose, including but not limited to identifying one or more product recommendations for a customer, or to determine whether a given product may be accommodated in one or more of such spaces within a facility. Moreover, information or data captured by an autonomous vehicle while being transported or otherwise escorted throughout one or more spaces of a facility, including but not limited to depth images, ranging information, or other information or data, may be adjusted to account for detections of body parts of a human actor (e.g., arms, torsos or the like) that transported or otherwise escorted the autonomous vehicle within such information or data.

Referring to FIGS. 1A through 1F, views of aspects of one system 100 including an autonomous home security device (e.g., an aerial vehicle 110) in accordance with embodiments of the present disclosure are shown. As is shown in FIG. 1A, a sensor 170 (e.g., a smoke detector) within a space 165-1 (e.g., a kitchen, or another room) of a facility 160 (e.g., a home) detects an alarm event or condition, such as the presence of smoke or other airborne contaminants within the space 165-1.

For example, as is shown in FIG. 1A, one or more cooking operations involving baking, frying or other preparation techniques that are being performed within the space 165-1 may cause smoke, steam, or other airborne matter to rise to elevated levels or heights within the space 165-1. Where the sensor 170 is a smoke detector (e.g., an ionization smoke alarm, a photoelectric smoke alarm, or any other similarly configured device), the sensor 170 detects the presence of smoke or other airborne particulates, and causes the sensor 170 to emit one or more sounds, lights or other audible or visible indications of the alarm event or condition. The sensor 170 also reports the alarm event or condition to a remote computer system 180 (e.g., a first responder system such as a fire department or police department, or a private security company) over a network 190 that may include the Internet in whole or in part. Alternatively, in some embodiments, the sensor 170 may be a thermometer or other heat sensor, or any other type or form of sensor configured to capture data regarding the space 165-1, and to emit one or more sounds, lights or other indications, or to otherwise transmit one or more signals to the computer system 180, upon determining that the alarm event or condition is present or occurring within the space 165-1.

The computer system 180 may be associated with one or more public or private authorities, or any other entities, and may also be configured to transmit one or more signals or messages to one or more other devices or systems within the facility 160 (e.g., base components, charging docks, or other intermediary devices), or to another computer device or system associated with an owner or occupant of the facility 160 or the space 165-1, or any other personnel associated with the facility 160 or the space 165-1. In some embodiments, the computer system 180 may be located at or near the facility 160 or, alternatively, in one or more alternate or virtual locations, e.g., in a "cloud"-based environment. Alternatively, or additionally, the sensor 170 or the computer system 180 may transmit one or more signals to a computer device associated with the owner or the occupant of the facility 160 or the space 165-1, e.g., a desktop computer, a laptop computer, a tablet computer, a smartphone, a wrist watch, a television or another device, or to a client account (e.g., E-mail or other messaging systems) associated with the owner or the occupant of the facility 160 or the space 165-1.

Figure 1C:
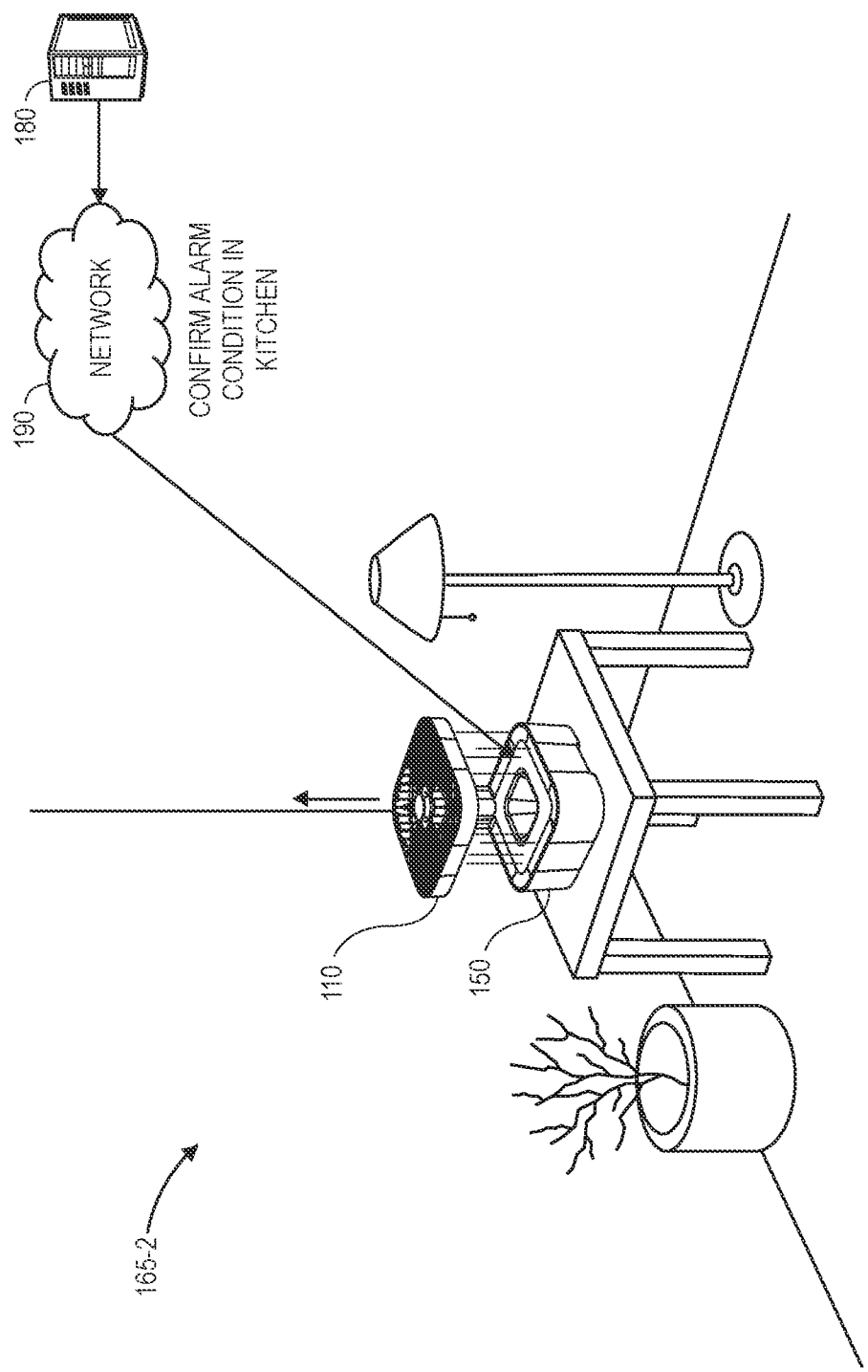

As is shown in FIG. 1B, in addition to the space 165-1, the facility 160 includes a plurality of other spaces 165-2, 165-3, 165-4, 165-5 (e.g., other rooms). As is shown in FIGS. 1B and 1C, the aerial vehicle 110 is located on or in a base component 150 within the space 165-2 at a time that the sensor 170 emits the one or more sounds, lights or other audible or visible indications of the alarm event or condition, or reports the alarm event or condition to the computer system 180. The base component 150 may be a charging dock or any other intermediary device configured to receive at least a portion of the aerial vehicle 110 therein, or to transfer or receive electrical power, information or data to or from the aerial vehicle 110.

The aerial vehicle 110 includes one or more computer processors, transceivers or other components that are in communication with the computer system 180 over the network 190. Alternatively, in some embodiments, the autonomous home security device may be a ground vehicle, such as an autonomous mobile robot. In some other embodiments, the facility 160 may include any number of other autonomous vehicles (not shown), e.g., two or more of such vehicles, and such vehicles may be located in any number of the spaces 165-1, 165-2, 165-3, 165-4, 165-5 within the facility 160, or outside of the facility 160. As is also shown in FIG. 1C, and in response to receiving the report of the alarm event or condition occurring in the space 165-1 from the sensor 170, as shown in FIG. 1A, the computer system 180 transmits an instruction or other message to the aerial vehicle 110 to dispatch the aerial vehicle 110 to the space 165-1. Alternatively, or additionally, the sensor 170 may report the alarm event or condition to the aerial vehicle 110 directly or indirectly, or in any other manner. For example. the aerial vehicle 110 may capture or detect the sounds, lights or other audible or visible indications of the alarm event or condition emitted by the sensor 170, such as is shown in FIG. 1A, and determine that the sensor 170 has detected the presence of smoke or other airborne particulates within the space 165-1 based on such indications.

Figure 1D:
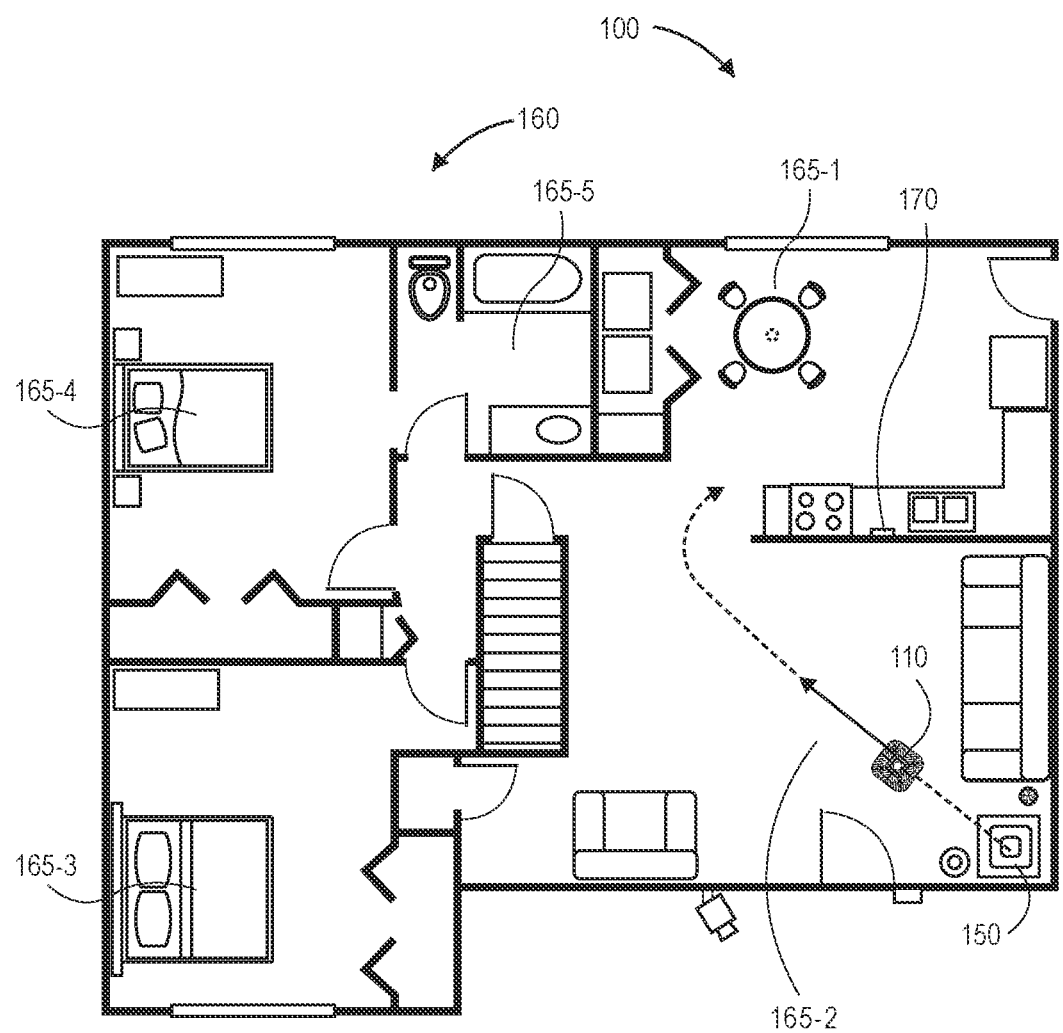

As is shown in FIGS. 1C and 1D, upon receiving the instruction or message from the computer system 180, the aerial vehicle 110 takes off from the base component 150 within the space 165-2, and begins to travel from the space 165-2 to the space 165-1. In some embodiments, the aerial vehicle 110 may be programmed with physical map data regarding locations of boundaries such as walls, ceilings or floors within the facility 160, as well as locations of various utilities, portals, systems, appliances, fixtures or other aspects of the facility 160. In some embodiments, the map data may have been generated at least in part by the aerial vehicle 110, or by one or more other autonomous vehicles, e.g., during one or more prior or concurrent missions throughout the facility 160. The aerial vehicle 110 may further select any courses, speeds and/or altitudes for traveling from the space 165-2 to the space 165-1 on any basis, including but not limited to an extent or a degree of the alarm condition, e.g., an amount of smoke or other airborne particulate activity detected by the sensor 170, a temperature or level of heat detected by the sensor 170, or an intensity or frequency of a light or a sound emitted by the sensor 170, or on any other basis.

Figure 1E:
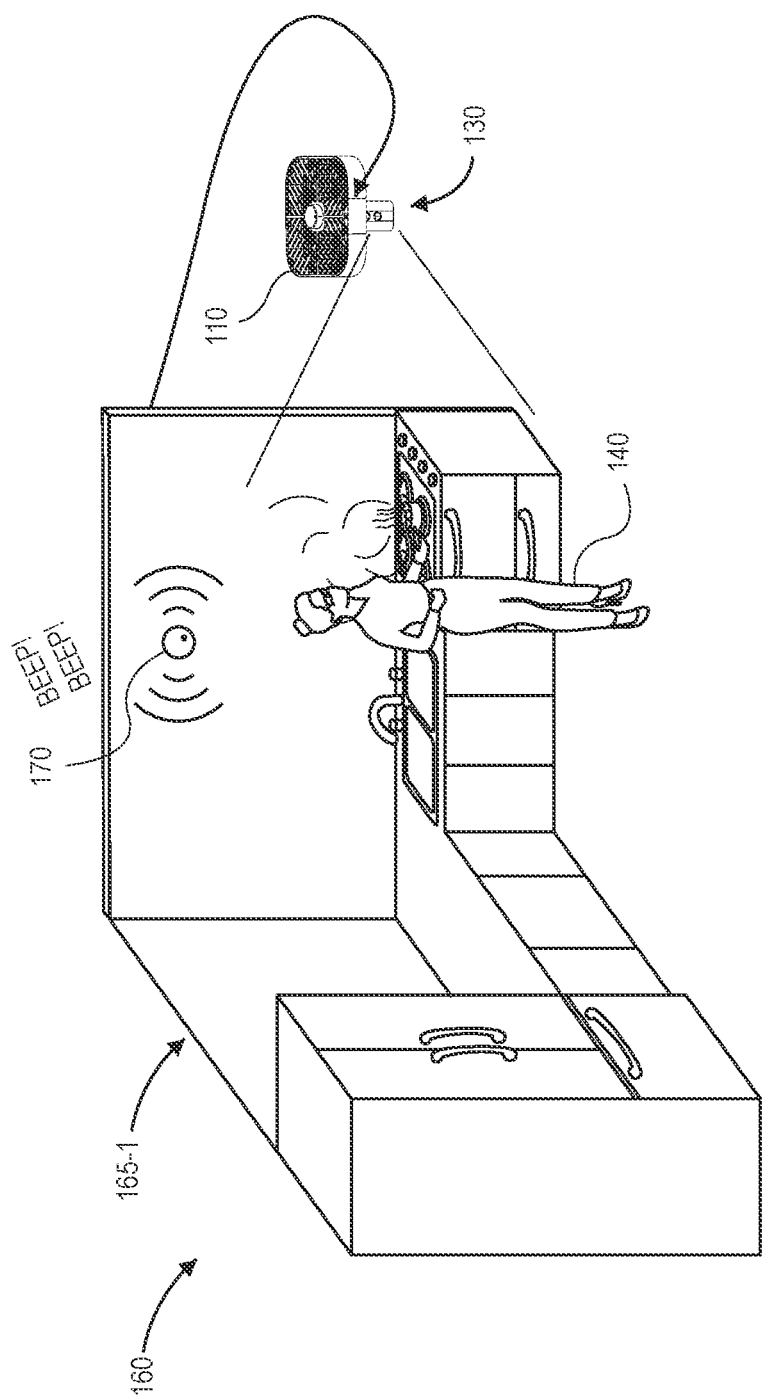

As is shown in FIG. 1E, upon arriving at the space 165-1, the aerial vehicle 110 captures data regarding conditions within the space 165-1 using one or more onboard sensors 130. Such sensors 130 may include, but are not limited to, imaging devices (e.g., digital cameras), or other sensors configured to capture data regarding temperatures, humidities, pressures, atmospheric conditions or other attributes of spaces, such as the space 165-1. As is also shown in FIG. 1E, upon the arrival of the aerial vehicle 110 at the space 165-1, a person 140 (e.g., an owner or other occupant of the space 165-1 or the facility 160) has attended to the space 165-1, and most of the smoke or other airborne particulate activity that was present within the space 165-1 as is shown in FIG. 1A has subsided.

Figure 1F:
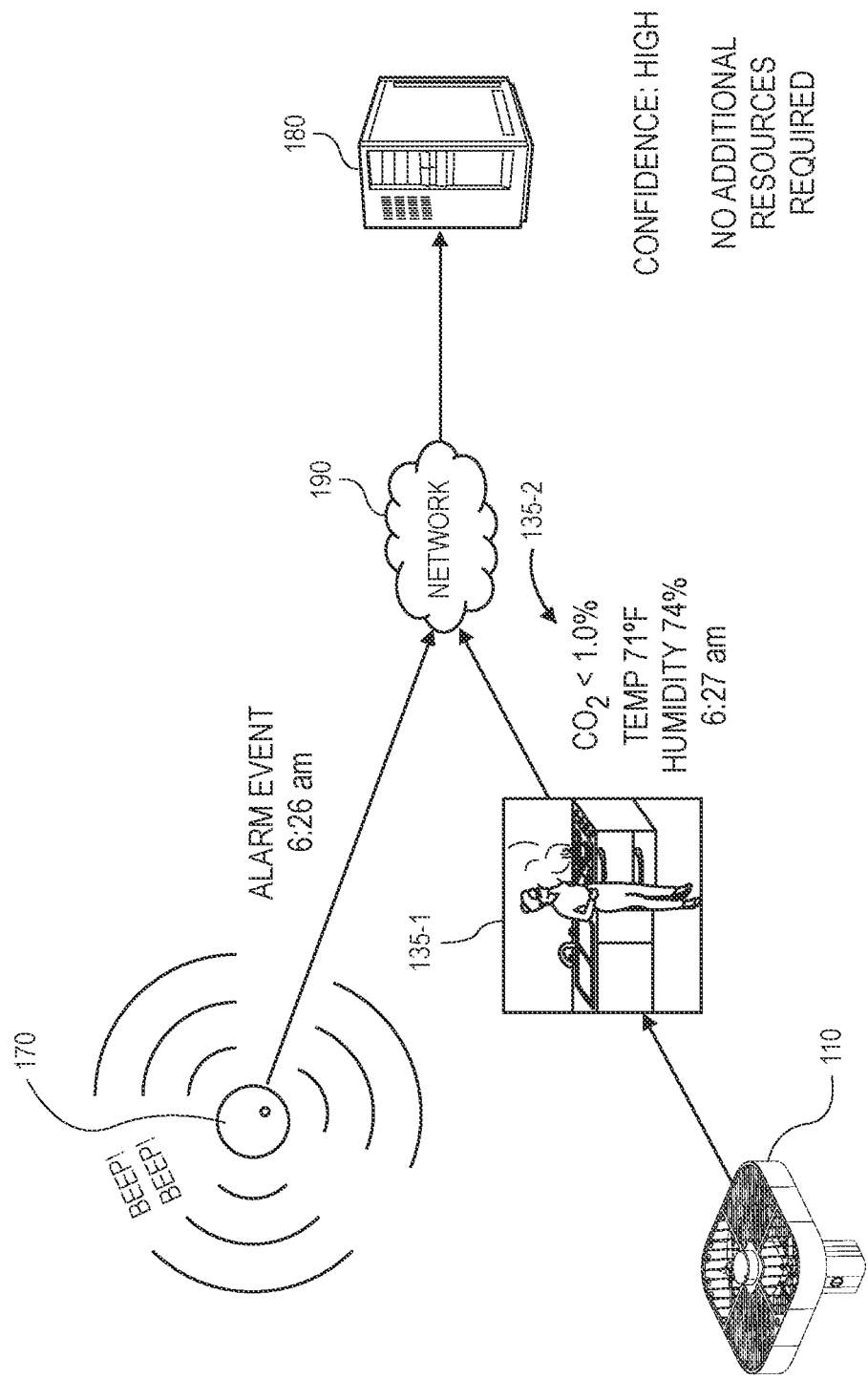

As is shown in FIG. 1F, the computer system 180 receives data regarding the alarm event or condition from the sensor 170, and also receives data 135-1, 135-2 captured from the space 165-1 by the aerial vehicle 110. Based on the data 135-1, 135-2 received from the sensor 170 and the aerial vehicle 110, the computer system 180 determines that no additional resources are required at the space 165-1, e.g., to a sufficiently high level of confidence. For example, although the sensor 170 determined that the alarm event or condition was occurring in the space 165-1 at a first time (e.g., at 6:26 a.m.), the data 135-1 captured by the aerial vehicle 110 at a second time (e.g., one minute later, at 6:27 a.m.) includes a photograph of the space 165-1, which shows that the person 140 has attended to the space 165-1 and that the smoke is no longer present there, or is present in diminishing quantities. Additionally, the data 135-2 that was also captured by the aerial vehicle 110 at the second time indicates that carbon dioxide levels, temperatures and humidities within the space 165-1 are normal or typical at the second time.

Accordingly, the computer system 180 determines that the alarm event or condition is no longer occurring or has been properly addressed by the person 140 at or prior to the second time. The computer system 180 thus determines that no additional resources are required at the facility 160 in general or in the space 165-1 in particular, thereby conserving resources of a public or private authority with which the computer system 180 is associated, or of an owner or other occupant of the facility 160 or the space 165-1, e.g., the person 140. In some embodiments, the computer system 180 may transmit one or more signals or instructions to the sensor 170, e.g., to direct the sensor 170 to terminate the emission of the one or more sounds, lights or other audible or visible indications of the alarm event or condition. In some embodiments, the computer system 180 may also transmit one or more signals or instructions to the aerial vehicle 110, e.g., to direct the aerial vehicle 110 to return to the base component 150 in the space 165-2 or to travel to another location or space within the facility 160.

The systems and methods of the present disclosure are directed to autonomous home security devices, namely, autonomous vehicles, such as aerial vehicles (e.g., unmanned aerial vehicles, or drones) or ground vehicles (e.g., autonomous mobile robots, or autonomous ground vehicles), that may be dispatched or otherwise instructed to travel to one or more locations, to capture images or other data in such locations, and to determine whether a predetermined event or condition (e.g., an alarm event or condition) is occurring or has occurred at the one or more locations. In some embodiments, the autonomous vehicles may be dispatched or instructed to travel to such locations directly, e.g., in response to one or more sets of instructions received from an external computer device over one or more networks. In some embodiments, the autonomous vehicles may determine that one or more sensors has detected an alarm event or condition by any means or in any manner, and may autonomously elect to travel to one or more locations associated with the event or condition, e.g., in response to one or more signals received from such sensors, or upon detecting one or more audible or visual indications emitted by such sensors. In some embodiments, the autonomous vehicles may be programmed or configured to travel throughout various spaces of a facility, e.g., randomly or in accordance with a predetermined schedule, to capture images or other data from such spaces, and to determine whether an alarm event or condition has occurred within such spaces based on the data captured therefrom.

The autonomous vehicles of the present disclosure may take any action in response to determining that one or more sensors has detected a predetermined event or condition, or upon processing or otherwise analyzing data captured from one or more spaces within a facility. For example, an autonomous vehicle may affirmatively determine, e.g., to various levels of confidence, that a predetermined event or condition has occurred in one or more spaces within a facility or, alternatively, that the predetermined event or condition has not occurred in such spaces. Alternatively, the autonomous vehicles of the present disclosure may transmit images or other data captured from such spaces to one or more external computer devices or systems, such as a base component or other station configured to charge the autonomous vehicles with electrical power (e.g., a base component, a charging dock, or another intermediary device or system) within the facility or, alternatively, to a server or other computer device or system provided in one or more alternate or virtual locations, e.g., in a "cloud"-based environment. The images or other data may be transmitted independently or along with one or more measures of a level of confidence (e.g., a confidence score) as to whether a predetermined event or condition has occurred or is present within the one or more spaces. Subsequently, the external computer device or system may make a determination, based on the images or other data, or any other data captured by one or more sensors present within such spaces or in any other location, whether a predetermined event or condition has occurred or is present within such spaces, or whether the predetermined event or condition has not occurred or is not present in such spaces.

Moreover, upon determining that a predetermined event or condition has occurred or is present within one or more spaces of a facility, an autonomous vehicle of the present disclosure, or a base component, a charging dock or another intermediary device in communication with the autonomous vehicle, may transmit one or more requests or sets of instructions requesting additional resources at such spaces to one or more external computer devices or systems. For example, upon determining that smoke, high temperatures, flames or other indications of a current or impending fire are present within one or more spaces of a facility, an autonomous vehicle of the present disclosure may transmit a request for one or more firefighting personnel or equipment (e.g., trucks, extinguishers, or others), and identify a location within such spaces where the personnel or equipment may be best utilized to address the fire. The autonomous vehicle may further cause one or more audible or visual indications of a fire to be emitted, e.g., by one or more onboard systems, or by transmitting one or more instructions to systems within such spaces. The autonomous vehicle may also cause one or more doors, air valves, water valves or other systems to be opened or closed, as necessary, in order to address the fire. Likewise, once the fire has been properly addressed, the autonomous vehicle may further take any actions to restore conditions within such spaces, including but not limited to any actions necessary to terminate, reverse or cancel any actions that were taken in response to the fire, or may transmit one or more sets of information or data regarding a status of the fire to one or more external computer devices or systems.

As another example, upon determining that high water levels, electrical short circuits or other indications of a current or impending flood are present within one or more spaces of a facility, an autonomous vehicle of the present disclosure may transmit a request for one or more flood response personnel or equipment (e.g., pumps, sandbags, or others), and identify a location within such spaces where the personnel or equipment may be best utilized to address the flood. The autonomous vehicle may further cause one or more audible or visual indications of a flood to be emitted, e.g., by one or more onboard systems, or by transmitting one or more instructions to systems within such spaces. The autonomous vehicle may also cause one or more doors, air valves, water valves or other systems to be opened or closed, as necessary, in order to address the flood. Likewise, once the flood has been properly addressed, the autonomous vehicle may further take any actions to restore conditions within such spaces, including but not limited to any actions necessary to terminate, reverse or cancel any actions that were taken in response to the flood, or may transmit one or more sets of information or data regarding a status of the flood to one or more external computer devices or systems.

As another example, upon determining that an open door, window or other portal, or motion, or other indications of a current or impending entry (e.g., a breach) into one or more spaces of a facility are present, an autonomous vehicle of the present disclosure may transmit a request for one or more personnel or equipment (e.g., security personnel or other vehicles), and identify a location within such spaces where the personnel or equipment may be best utilized to respond to the entry. The autonomous vehicle may further cause one or more audible or visual indications of an entry to be emitted, e.g., by one or more onboard systems, or by transmitting one or more instructions to systems within such spaces. The autonomous vehicle may also cause one or more doors or other systems to be opened or closed, as necessary, in order to address the entry. Once the entry has been properly addressed, the autonomous vehicle may further take any actions to restore conditions within such spaces, including but not limited to any actions necessary to terminate, reverse or cancel any actions that were taken in response to the entry, and may transmit one or more sets of information or data regarding a status of the entry to one or more external computer devices or systems.

As yet another example, upon determining that a predetermined level of one or more airborne, waterborne or particulate contaminants or substances is present within one or more spaces of a facility, an autonomous vehicle of the present disclosure may transmit a request for one or more personnel or equipment (e.g., firefighting personnel or cleanup crews), and identify a location within such spaces where the personnel or equipment may be best utilized to respond to the presence of the contaminants or substances. For example, such contaminants or substances may include, but are not limited to, gases such as carbon dioxide, carbon monoxide, or any number of liquids or gases having any numbers or chains of hydrocarbons (e.g., natural gas and/or propane). The autonomous vehicle may further cause one or more audible or visual indications of an abnormal level of one or more contaminants or substances to be emitted, e.g., by one or more onboard systems, or by transmitting one or more instructions to systems within such spaces. The autonomous vehicle may also cause one or more doors or other systems to be opened or closed, as necessary, in order to ventilate or drain a space or the facility of the one or more contaminants or substances. Once the presence of the airborne, waterborne or particulate contaminants or substances has been properly addressed, the autonomous vehicle may further take any actions to restore conditions within such spaces, including but not limited to any actions necessary to terminate, reverse or cancel any actions that were taken in response to the airborne, waterborne or particulate contaminants or substances, and may transmit one or more sets of information or data regarding a status of the airborne, waterborne or particulate contaminants or substances to one or more external computer devices or systems.

In accordance with some embodiments of the present disclosure, an autonomous vehicle may be programmed or configured to generate one or more physical maps of spaces within a facility, using images or other data captured by one or more onboard sensors. Such sensors may include digital cameras (e.g., visual or depth cameras) or other imaging devices, which may be aligned with fields of view or axes of orientation extending in any direction, e.g., forward, aft, port, starboard, up, down, or in any other direction. For example, the imaging devices may have fields of view or axes of orientation that are aligned along or parallel to yaw, pitch or roll axes of an autonomous vehicle, e.g., principal axes of the autonomous vehicle, or at any other angle. In some embodiments, an autonomous vehicle may include one or more depth cameras or range sensors, such as LIDAR sensors or time-of-flight sensors, that are aligned at any angle with respect to an orientation or configuration of an autonomous vehicle. For example, the autonomous vehicle may include depth cameras or range sensors with fields of view or orientations pointing vertically upward or downward, as well as depth cameras or range sensors having fields of view or orientations that vary with respect to an orientation or configuration of the autonomous vehicle. In some embodiments, an autonomous vehicle may include one or more imaging devices such as depth cameras or range sensors (e.g., LIDAR sensors or other time-of-flight sensors) that are configured to determine ranges based on any number of pixels of data, e.g., grids of four pixels by four pixels, or eight pixels by eight pixels, or the like. In some embodiments, an autonomous vehicle may include one or more imaging devices such as depth cameras or range sensors that are configured to determine ranges based on single pixels of data, e.g., a single-pixel LIDAR sensor or other time-of-flight sensor. Moreover, the autonomous vehicle may include one or more depth cameras, range sensors or other systems that are aligned with fixed orientations, or with variable orientations (e.g., rotating or shifting orientations).

The autonomous vehicles of the present disclosure may be outfitted with one or more processors, components, transceivers, sensors or other systems for engaging in communications with aspects of a facility (e.g., appliances, lighting, environmental or other systems), as well as any persons within the facility. For example, an autonomous vehicle may include any number of transceivers for communicating with aspects of the Internet or one or more other networks, including but not limited to any wired or wireless routers within a facility, or any other computer devices therein, as well as any number of sensors or readers for communicating via any wired or wireless systems or protocols, including but not limited to wireless fidelity ("Wi-Fi"), Bluetooth, radio frequency identification (or "RFID"), near-field communication (or "NFC") readers, or any other type of systems or protocols. For example, the autonomous vehicles may further include any number of audio or video sensors, including but not limited to one or more imaging devices (e.g., digital cameras) and/or microphones, or any other type of sensors, embedded or incorporated therein.

Additionally, an autonomous vehicle may further include any number of sensors, such as imaging devices (e.g., cameras configured to capture visual or depth data), temperature sensors, magnetometers, Wi-Fi receivers, Bluetooth receivers, or others, and may be programmed or configured to travel throughout one or more spaces of a facility and to capture data using such sensors. Based on the captured data, a physical map of such spaces or the facility may be generated. The physical map may identify or depict one or more boundaries (e.g., walls, ceilings, floors) or other aspects of such spaces, as well as the respective dimensions of such spaces, or the respective surfaces or textures of such boundaries. In some embodiments, an autonomous vehicle may autonomously travel throughout one or more spaces of a facility in order to capture data using one or more sensors, and such data may be utilized in generating a physical map of the spaces of the facility. In some other embodiments, an autonomous vehicle may be transported (e.g., carried) or escorted by a human actor throughout such spaces, and may capture data using one or more sensors as the autonomous vehicle is transported or escorted throughout such spaces. Data captured as the autonomous vehicle is escorted may be utilized in generating a physical map of the spaces of the facility. Additionally, in some embodiments, the autonomous vehicle may selectively operate one or more propulsion motors as the autonomous vehicle is transported or otherwise escorted throughout such spaces, in order to maintain altitude and/or tilt control. Furthermore, in some embodiments, data captured by the autonomous vehicle as the autonomous vehicle travels throughout the spaces of the facility may be adjusted to account for presence of one or more body parts of a human actor that is transporting or otherwise escorting the autonomous vehicle through the facility.

Additionally, a physical map generated based on data captured using one or more sensors of an autonomous vehicle may further include one or more layers identifying locations of utilities, services or other systems within such spaces. For example, where an autonomous vehicle captures wireless energy in the form of Wi-Fi or Bluetooth signals or others while traveling through a space, the autonomous vehicle may monitor strengths or other attributes of such signals with respect to its tracked positions within the space in order to estimate or otherwise determine positions of sources of such signals (e.g., routers, computer devices or other Wi-Fi or Bluetooth-enabled equipment). Similarly, the autonomous vehicle may detect strengths of magnetic fields within the space, or temperature variations within the space, and utilize information regarding such strengths or variations to determine or estimate locations of not only current-carrying conductors which emit the magnetic fields but also heat sources or sinks such as fireplaces, furnaces, heaters, water faucets, bathtubs or air conditioners. Any information that may be captured by such sensors may be processed and used to not only identify one or more systems or other aspects of such spaces but also to estimate or determine respective locations of such systems or aspects, and to incorporate identifiers of such systems or aspects and their respective locations within a physical map.

Moreover, a physical map that has been generated for a space or facility based on data captured using an autonomous vehicle of the present disclosure may be used to identify one or more recommendations of products for one or more owners or other occupants of the space or facility. For example, where a physical map identifies locations of boundaries such as walls, ceilings or floors, or locations of systems or services with respect to such boundaries (e.g., electrical outlets or other utility connections, Ethernet or other network connections, heaters or air conditioners, windows, doors or other portals), an electronic marketplace or other system may determine whether one or more commercial goods may be properly located within the space, based on dimensions or operational requirements of such commercial goods.

Furthermore, in some embodiments, a physical map may be generated based on data captured by one or more autonomous vehicles traveling through a space. Additionally, in some embodiments, the physical map may be updated as the one or more autonomous vehicles travel throughout the space at later times. For example, as one or more boundaries or systems or aspects within the space are installed or relocated, an autonomous vehicle may detect that a boundary is missing or relocated, or that one or more systems have been added to the space or removed therefrom, and a physical map of the space may be updated accordingly.

The autonomous vehicles of the present disclosure may be configured to operate any access-related systems within a facility, including any portals or other systems, or to enable communication with persons within a space of the facility via one or more secure communications channels (e.g., voice, video and/or data). In some embodiments, an autonomous vehicle may be programmed or instructed to automatically open a door or other entry point at a facility such as a home, an office or another structure (e.g., a private dwelling or business location), to access a public garage or other parking or standing area, or to activate an indication within the facility. For example, an autonomous vehicle may be configured to transmit wireless codes, signals or other information to trigger a response from one or more devices or machines equipped with wireless transceivers, such as garage door openers, doorbells, lights, haptic feedback systems or other machines or devices. The autonomous vehicles may also be configured to share any relevant information or data with persons, while preventing such persons from accessing any other sensitive information or data within the facility. The autonomous vehicles may also be configured to communicate with any other vehicles or systems within a facility, including but not limited to cleaning robots, servicing robots, domestic robots, household robots, monitoring and/or surveillance robots, or robots of any other kind, e.g., to provide one or more instructions for performing one or more tasks within the facility.

In accordance with some embodiments of the present disclosure, an autonomous vehicle may be configured to operate along with one or more stations, e.g., base components, charging docks (or charging stations or docking stations), or other intermediary devices. Such stations may have openings, cavities or spaces configured to accommodate one or more portions of an autonomous vehicle, and may include one or more surfaces that are aligned to come into contact with corresponding surfaces of the autonomous vehicle, thereby enabling electrical power, information or data to be conveyed between the autonomous vehicle and such stations. In some embodiments, a base component, a charging dock, or another intermediary device may include an opening, a cavity or another space that is sized and shaped to receive or accommodate a specific portion of an autonomous vehicle, e.g., a fuselage of the autonomous vehicle, and to enable the autonomous vehicle to be aligned in one of a plurality of alignments or orientations with respect to the base component, the charging dock or intermediary device.

For example, in some embodiments, the autonomous vehicle may include one or more contacts that are positioned or aligned in an arrangement or pattern on an external surface of a portion of the autonomous vehicle, e.g., a fuselage of the autonomous vehicle, that is designed for insertion or accommodation into an opening of a base component, a charging dock or another intermediary device. One or more internal surfaces of the opening may include one or more contacts that are positioned or aligned in an arrangement or pattern that is consistent with the arrangement or pattern of the contacts on the external surface of the portion of the autonomous vehicle, such that the contacts on the external surface of the portion of the autonomous vehicle and the contacts on the one or more internal surfaces of the opening mate or otherwise come into contact with one another when the portion of the autonomous vehicle is inserted into the opening, and in one of a plurality of predetermined alignments or orientations.

In some embodiments, a portion of an autonomous vehicle that is designed for insertion or accommodation into an opening of a base component, a charging dock or another intermediary device may include one or more visual cameras or other optical sensors having fields of view extending normal to one or more surfaces of the portion of the autonomous vehicle. Thus, when the portion of the autonomous vehicle is inserted into the opening, the visual cameras or other optical sensors are obscured by walls or other surfaces of the opening, and precluded from operating normally, thereby ensuring that data is only captured during times of normal operation, and not at other times.

In some embodiments, an autonomous vehicle that includes a time-of-flight sensor or other range camera that is exposed when the autonomous vehicle is coupled to or associated with a base component, a charging dock or another intermediary device may, from time to time, capture depth information, such as with a depth camera or a range sensor (e.g., a LIDAR sensor or another time-of-flight sensor), to ensure that the base component, the charging dock or the intermediary device has not been inadvertently moved from an intended or desired location or position. For example, an autonomous vehicle may be configured to capture depth or ranging information at regular intervals of time, e.g., at intervals of a predetermined number of minutes, hours or days, when the autonomous vehicle is parked, docked or stopped in association with a base component, a charging dock, or another intermediary device. If the autonomous vehicle has not changed its location or position over a previous interval of time, depth or ranging information captured by the autonomous vehicle should be consistent with or substantially identical to depth or ranging information captured by the autonomous vehicle prior to the interval. If the depth or ranging information is inconsistent with or is not substantially identical to the depth or ranging information captured by the autonomous vehicle prior to the interval, however, then a change in location or position of the autonomous vehicle may be inferred based on a difference in the depth or ranging information.

Moreover, autonomous vehicles of the present disclosure may be configured for use or operation within facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks). In some embodiments, the facility may be or include an island or a space station.

Figure 2:
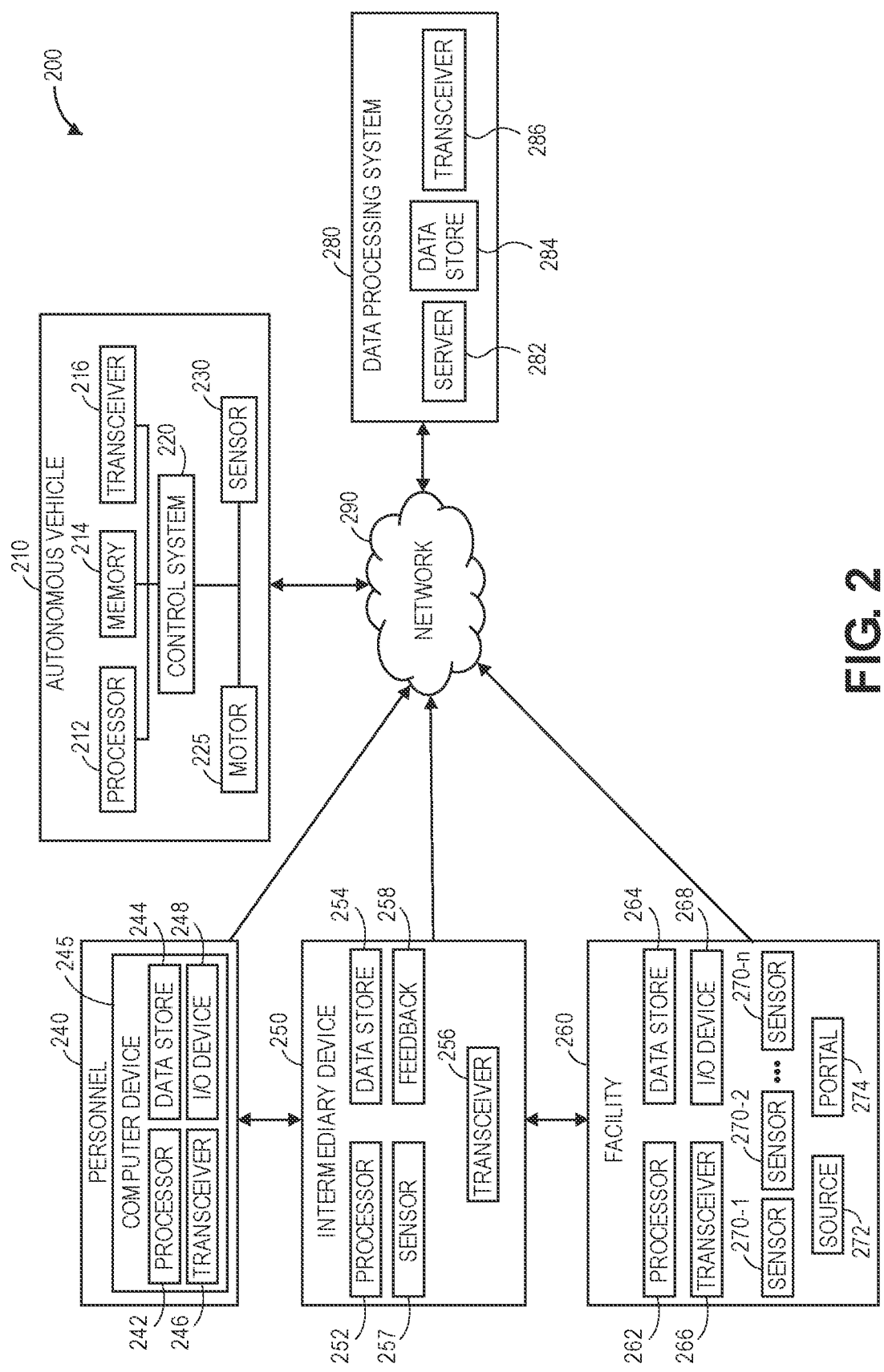
FIG. 2 is a block diagram of one system including an autonomous home security device in accordance with embodiments of the present disclosure.

Referring to FIG. 2, a block diagram of components of one system 200 including an autonomous home security device (e.g., an autonomous vehicle 210) in accordance with embodiments of the present disclosure is shown. The system 200 includes the autonomous vehicle 210, personnel 240, an intermediary device 250, a facility 260 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1F.

The autonomous vehicle 210 may be an aerial vehicle (e.g., an unmanned aerial vehicle, or drone), a ground vehicle (e.g., an autonomous mobile robot), or any other autonomous vehicle 210 that may be programmed or configured to autonomously perform one or more operations within spaces of a facility. As is shown in FIG. 2, the autonomous vehicle 210 includes a processor 212, a memory 214 and a transceiver 216. The autonomous vehicle 210 further includes a control system 220, one or more motors 225, and one or more sensors 230.

The processor 212 may be configured to perform any type or form of computing function associated with the operation of the autonomous vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the autonomous vehicle 210. The processor 212 may be configured to control any aspects of the operation of the autonomous vehicle 210 and any computer-based components thereon, including but not limited to the motors 225 or the sensors 230. For example, the processor 212 may control the operation of one or more control systems or modules, such as the control system 220, for generating instructions for conducting operations of one or more of the motors 225 or the sensors 230. Such control systems or modules may be associated with one or more other computing devices or machines, and may communicate with the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the autonomous vehicle 210 further includes one or more memory or storage components 214 (such as databases or data stores) for storing any type of information or data, e.g., instructions for operating the autonomous vehicle 210, or information or data captured during operations of the autonomous vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the autonomous vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the autonomous vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 225 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the autonomous vehicle 210 and for engaging with or releasing items, as desired. For example, the control system 220 may be configured to cause or control the operation of one or more of the motors 225, e.g., to cause one or more of the motors 225 to operate at desired speeds, in order to guide the autonomous vehicle 210 along a desired course, at a desired speed, or at a desired altitude, as appropriate. The control system 220 may further control any other aspects of the autonomous vehicle 210, including but not limited to the operation of one or more steering or braking systems of a ground vehicle, or one or more control surfaces such as wings, rudders, flaperons, elevons, elevators, ailerons, flaps, brakes or slats of an aerial vehicle, within desired ranges. In some embodiments, the control system 220 may be integrated with one or more of the processor 212, the memory 214 and/or the transceiver 216.

The motors 225 may be any type or form of motor (e.g., electric, gasoline-powered or any other type of motor) capable of generating sufficient rotational speeds of one or more propellers or other components to provide thrust and/or lift forces to the autonomous vehicle 210 and any payload engaged thereby. In some embodiments, one or more of the motors 225 may be a brushless direct current ("DC") multi-phase motor such as an outrunner brushless motor or an inrunner brushless motor.

The autonomous vehicle 210 may include any number of such motors 225 of any kind. For example, one or more of the motors 225 may be aligned or configured to operate with different capacities or ratings, or at different speeds, or coupled to any number of wheels or propellers having different sizes and shapes. Additionally, one or more of the motors 225 may be an electric motor, e.g., a brushless DC multi-phase motor, and one or more of the motors 225 may be a gasoline-powered motor.

The autonomous vehicle 210 may also include any number of sensors 230 or other components or other features for capturing data within a vicinity of the autonomous vehicle 210, including but not limited to one or more imaging devices (e.g., digital cameras), Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions).

Although the block diagram of FIG. 2 includes a single box corresponding to a motor 225 and a single box corresponding to a sensor 230, those of ordinary skill in the pertinent arts will recognize that the autonomous vehicle 210 may include any number of motors 225 or sensors 230 in accordance with the present disclosure.

The personnel 240 (or operators, or users, or other persons) may be any individual or entity associated with the facility 260. For example, the personnel 240 may be any individual or entity having a permanent or temporary right of occupation, possession or ownership of all or any portion of the facility 260, including but not limited to a resident, a tenant, an employee, or a contractor, or any other individual designated by an owner, a resident, a tenant, an employee or a contractor of the facility 260. The personnel 240 may utilize any number of computing devices 245 (e.g., a smartphone, a tablet computer, a laptop computer, a desktop computer, or computing devices provided in wristwatches, televisions, set-top boxes, automobiles or any other appliances or machines), or any other machines. As is shown in FIG. 2, the computer device 245 may include one or more processors 242, data stores (e.g., databases) 244, transceivers 246 (e.g., transmitters and/or receivers) and I/O devices 248 (e.g., keyboards, keypads, mice, styluses, touchscreens, RFID readers, or other devices).

The intermediary device 250 includes one or more processors 252, data stores 254, transceivers 256, sensors 257 and/or feedback devices 258. The transceivers 256 may be configured to receive or transmit electrical power to or from the autonomous vehicle 210, or to receive or transmit information or data to or from the autonomous vehicle 210, the personnel 240, the facility 260 and/or the data processing system 280, or any other computing device over the network 290.

Moreover, in some embodiments, the intermediary device 250 may be configured to receive and/or interpret signals received from any systems or sensors within or without the facility 260, and to determine, with one or more measures of a level of confidence (e.g., a confidence score), whether a predetermined event or condition has occurred or is present within the one or more spaces. In some embodiments, the intermediary device 250 may transmit one or more sets of instructions to such systems or sensors, or to establish one or more settings or conditions of such systems or sensors. Any of the applications or functions described herein as being executed or performed by the data processing system 280 herein may be executed or performed by the intermediary device in accordance with embodiments of the present disclosure.

Additionally, the intermediary device 250 may further include any type of power source for providing electrical power, e.g., alternating current ("AC") or DC power, or other forms of power in support of one or more electrical loads. Such power sources may include, for example, one or more batteries or other power cells, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The intermediary device 250 may also include any type, size or form of other power source, e.g., other than a battery, including but not limited to one or more fuel cells or solar cells.

The intermediary device 250 may be or include any computer-related machine that is configured to control the operation of one or more aspects of the facility 260 on behalf of the personnel 240. For example, the intermediary device 250 may be configured to control the capture of information or data within the facility 260 by one or more sensors 270-1, 270-2 . . . 270-n, or to grant or restrict access to the facility 260 by operating (e.g., locking, unlocking, opening, closing) one or more of the portals 274. Alternatively, the intermediary device 250 may be configured to activate any other systems that may be associated with the facility 260 (e.g., lighting and/or environmental systems). In this regard, the intermediary device 250 may receive information, data and/or instructions from one or more of the personnel 240, e.g., by way of the computer device 245, in the form of a direct inter-device connection or over the network 290. In some embodiments, the intermediary device 250 may be a general purpose computer device or system, or a special purpose computer device or system, provided within or in association with the facility 260, and configured to execute one or more applications or functions associated with operations occurring with the facility 260.

In some embodiments, the intermediary device 250 may be a charging station, e.g., a system including a set of one or more contacts for transferring electrical power to the autonomous vehicle 210 or any other component, or for receiving electrical power from the autonomous vehicle 210 or any other component, via a corresponding set of one or more contacts provided on one or more portions of the autonomous vehicle 210. In some embodiments, the intermediary device 250 may be a docking station, e.g., a system including one or more physical or structural features for engaging with or providing support to the autonomous vehicle 210 or any other component, such as to maintain the autonomous vehicle 210 in a specific location, position or orientation. In some embodiments, the intermediary device 250 may be a charging dock, e.g., a system having one or more features of a charging station and/or a docking station as described herein. In some embodiments, the intermediary device 250 may be a smart speaker, a personal assistant device, a home security system component, or any other like machine associated with the facility 260. Alternatively, or additionally, in some embodiments, the intermediary device 250 may include any number or set of features of a charging station, a docking station, a charging dock, a smart speaker, a personal assistant device, a home security system component, or any other machine or component.

The sensors 257 may be any type or form of sensors having any components or features for determining one or more attributes of the intermediary device 250 and/or the facility 260, including extrinsic information or data or intrinsic information or data. Such sensors 257 may be installed in the same common unit as the one or more processors 252, data stores 254, transceivers 256 and/or feedback devices 258, or in one or more units provided in association with (and in communication with) such components, subject to functional or spacing limitations or constraints.

In some embodiments, the sensors 257 may include one or more thermometers, barometers, hygrometers, anemometers, current sensors, voltage sensors, resistance sensors or any other type or form of sensor. In some other embodiments, the sensors 257 may include one or more air monitoring sensors (e.g., oxygen, ozone, hydrogen, carbon monoxide or carbon dioxide sensors), acoustic sensors (e.g., microphones, piezoelectric sensors, vibration sensors), infrared sensors, ozone monitors, pH sensors, magnetic anomaly detectors, metal detectors, radiation sensors (e.g., Geiger counters, neutron detectors, alpha detectors) or the like, as well as one or more imaging devices (e.g., digital cameras). In some embodiments, information or data captured by one or more of the sensors 257 may be used to authenticate one or more individuals or entities at the facility 260, including but not limited to the personnel 240, or any other individual or entity.

The intermediary device 250 may further include one or more feedback devices 258. The feedback devices 258 may be any component configured for returning feedback to the personnel 240, or to any other individuals or entities in or around the facility 260. Such feedback devices 258 may be installed in the same common unit as the one or more processors 252, data stores 254 and/or transceivers 256, or in one or more units provided in association with (and in communication with) such components, subject to functional or spacing limitations or constraints.

In some embodiments, the feedback devices 258 may include one or more individually addressable lighting elements (e.g., LED lights) that may be automatically controlled or configured to emit light in any frequency, intensity or hue. In some other embodiments, the feedback devices 258 may include one or more audio speakers or other physical components that may be automatically controlled or configured to transmit audible messages, signals or sounds. In some other embodiments, the feedback devices 258 may include one or more haptic vibrating elements, e.g., any physical component that may be automatically controlled or configured to generate tactile vibrations of any frequency or intensity.

The facility 260 may be any building, region, structure or other space (e.g., covered or uncovered) to which the automated control of access may be desired, or from within which secure communications may be desired. For example, as is discussed above, the facility 260 may be a home or a business-related structure of any type, kind, shape or form, or any other type of facility. The facility 260 may further include a networked computer infrastructure, including one or more processors 262, data stores (e.g., databases) 264, transceivers 266 (e.g., transmitters and/or receivers) and I/O devices 268 (e.g., keyboards, keypads, mice, styluses, touchscreens, RFID readers, or other devices).

The facility 260 further includes the sensors 270-1, 270-2 . . . 270-n, one or more sources 272 of wireless energy, and one or more portals 274. The sensors 270-1, 270-2 . . . 270-n may take the form of one or more of the sensors 257 described above, and, like such sensors 257, may be any operational and/or environmental sensors having any components or features for determining one or more attributes of the facility 260, including extrinsic information or data or intrinsic information or data. The sensors 270-1, 270-2 . . . 270-n may further include one or more sensors that are associated with security functions at the facility 260, including one or more door sensors, window sensors, motion sensors, security cameras, or others.

In some embodiments, the I/O devices 268 may be configured to receive and provide information to the personnel 240 or to any other individuals or entities at the facility 260, and may include, but are not limited to, a display, (e.g., a touch-screen display), a scanner, a keypad, a biometric scanner, an audio transducer, one or more speakers, one or more imaging devices such as a video camera, and any other types of input or output devices that may support interaction between the intermediary device 250, the facility 260 and/or the various personnel 240. For example, in one embodiment, the I/O devices 268 may include a touchscreen display and/or a keypad for receiving inputs. In various embodiments, the I/O devices 268 may have capabilities for directly receiving such signals from the personnel 240 or the intermediary device 250 that provides a signal or an instruction to operate one or more of the portals 274.

The sources 272 may be any components within or associated with the facility 260 that are configured to transmit wireless energy in any type or form. For example, one or more of the sources 272 may include a current-carrying conductor of any kind, which may generate and radiate a magnetic field according to Ampere's Law. The sources 272 may further include any device or system that is configured to communicate according to one or more wireless protocols or standards, such as any Wi-Fi or Bluetooth protocol or standard.

The portals 274 may include one or more doors, windows or other access points, as well as any electrometrical components for automatically operating such doors or other access points. Such portals 274 may be used to obtain access to the facility 260, e.g., an external door, or to obtain access to one or more specific spaces within the facility 260, e.g., an internal door, such as one or more rooms within the facility 260. The portals 274 may further include any other systems associated with other openings to the facility 260, such as windows.

The portals 274 may be operated under the control of the autonomous vehicle 210, the processors 262 and/or the intermediary device 250 or, alternatively, the computer device 245 of the personnel 240. For example, each of the portals 274 may be in communication with the one or more processors 262 and/or the intermediary device 250, e.g., Bluetooth® or Wi-Fi, and may transmit or receive one or more signals or instructions associated with their respective operations. Alternatively, any of the portals 274 may be operated based at least in part on manual or automatic inputs provided by the personnel 240 or another authorized individual at the facility 260, e.g., by way of the I/O devices 268. In some embodiments, one or more of the portals 274 may include an electromechanical operating and/or locking mechanism which is designed to automatically open or close a portal, or to lock or unlock the portal, in response to signals or instructions from an authorized device using a wired or wireless protocol. Such instructions may include a password or another authenticator (e.g., a cryptographic key). Additionally, the portals 274 may be associated with the one or more sensors 270-1, 270-2 . . . 270-n, or may include one or more sensors, and may be configured to capture information or data regarding successful or unsuccessful attempts at operation thereof, or any other events occurring at the facility 260.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the autonomous vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location, e.g., in association with the facility 260. In other such embodiments, the data processing system 280 may be provided in one or more alternate or virtual locations, e.g., in a "cloud"-based environment. In still other embodiments, the data processing system 280 may be provided onboard one or more vehicles, including but not limited to the autonomous vehicle 210.

Each of the transceivers 216, 246, 256, 266, 286 or other communications devices, systems or components may be configured to communicate through one or more wired or wireless means, e.g., wired technologies such as Universal Serial Bus (or "USB") or fiber optic cable, or wireless standards or protocols such as Bluetooth® or any Wi-Fi protocol, over the network 290 or directly. The transceivers 216, 246, 256, 266, 286 may further include or be in communication with one or more I/O interfaces, network interfaces or devices, and may be configured to allow information or data to be exchanged between one another, or to or from one or more other computer devices or systems via the network 290.

The transceivers 216, 246, 256, 266, 286 may perform any necessary protocol, timing or other data transformations in order to convert data signals from a first format suitable for use by one component into a second format suitable for use by another component. For example, in some embodiments, the transceivers 216, 246, 256, 266, 286 may be configured to communicate according to one or more protocols traditionally associated with discrete components, e.g., within specific frequency spectra, including but not limited to radio frequency signals typically within ranges of approximately three hundred to four hundred megahertz, or MHz, as well as radio frequency signals typically within ranges of approximately three hundred to five hundred megahertz, or MHz.

In some embodiments, the transceivers 216, 246, 256, 266, 286 may be configured to transmit or receive Bluetooth® signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth® networks of 3 megabits per second (or 3 Mbps) or more, with a maximum transmission range of 10 to 100 meters or more, and at powers of approximately one milliwatt (mW), or 0.001 watts (W). The transceivers 216, 246, 256, 266, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 246, 256, 266, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 246, 256, 266, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 246, 256, 266, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 246, 256, 266, 286 may be configured to communicate within customized frequency spectra, or at dynamic frequencies, in accordance with the present disclosure. For example, in some embodiments, one or more of the transceivers 216, 246, 256, 266, 286 may be configured to communicate according to a proprietary standard or protocol, or within a proprietary frequency spectrum.

In some embodiments, the transceivers 216, 246, 256, 266, 286 may include support for devices attached through various types of peripheral buses, e.g., variants of the Peripheral Component Interconnect (PCI) bus standard or the Universal Serial Bus (USB) standard. In some other embodiments, functions of the transceivers 216, 246, 256, 266, 286 may be split into two or more separate components, or incorporated directly into one or more processors or other components.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The autonomous vehicle 210, the personnel 240, the intermediary device 250, the facility 260 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the autonomous vehicle 210, the computer device 245, the intermediary device 250, the facility 260 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the autonomous vehicle 210, the computer device 245, the intermediary device 250, the facility 260 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212, the computer device 245, the intermediary device 250, the facility 260 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD- ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
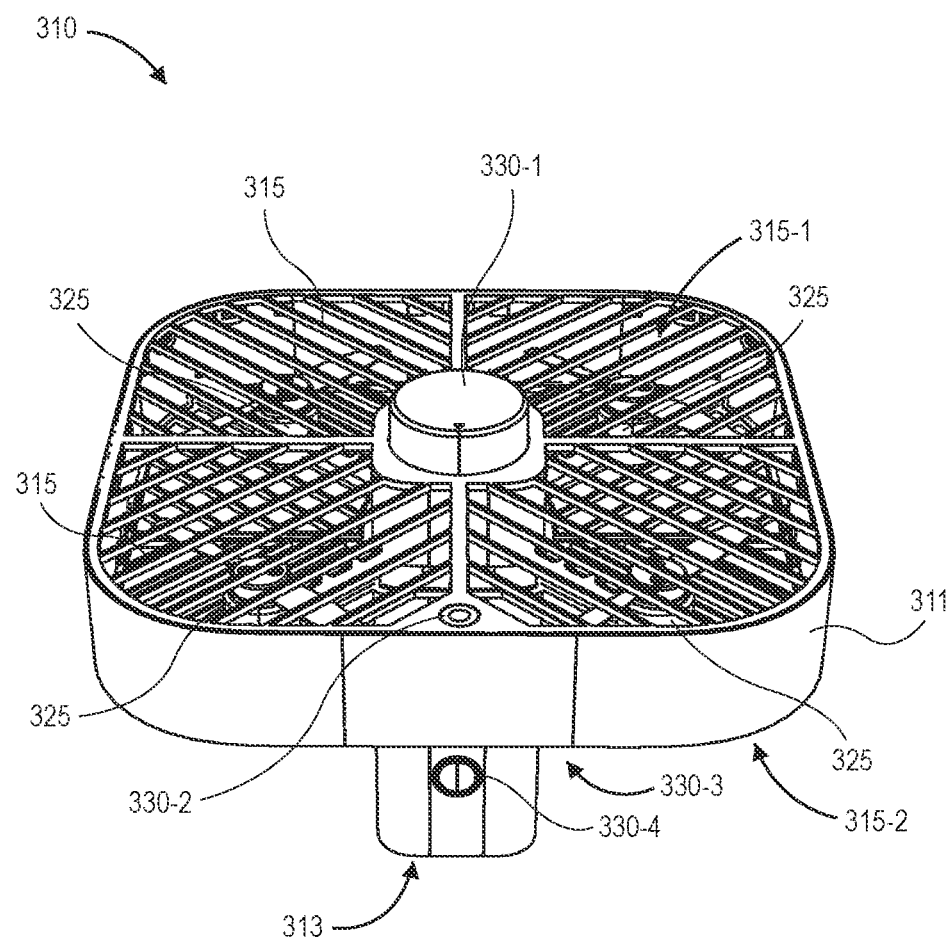
FIGS. 3A through 3C are views of aspects of one autonomous home security device in accordance with embodiments of the present disclosure.
Figure 3B:
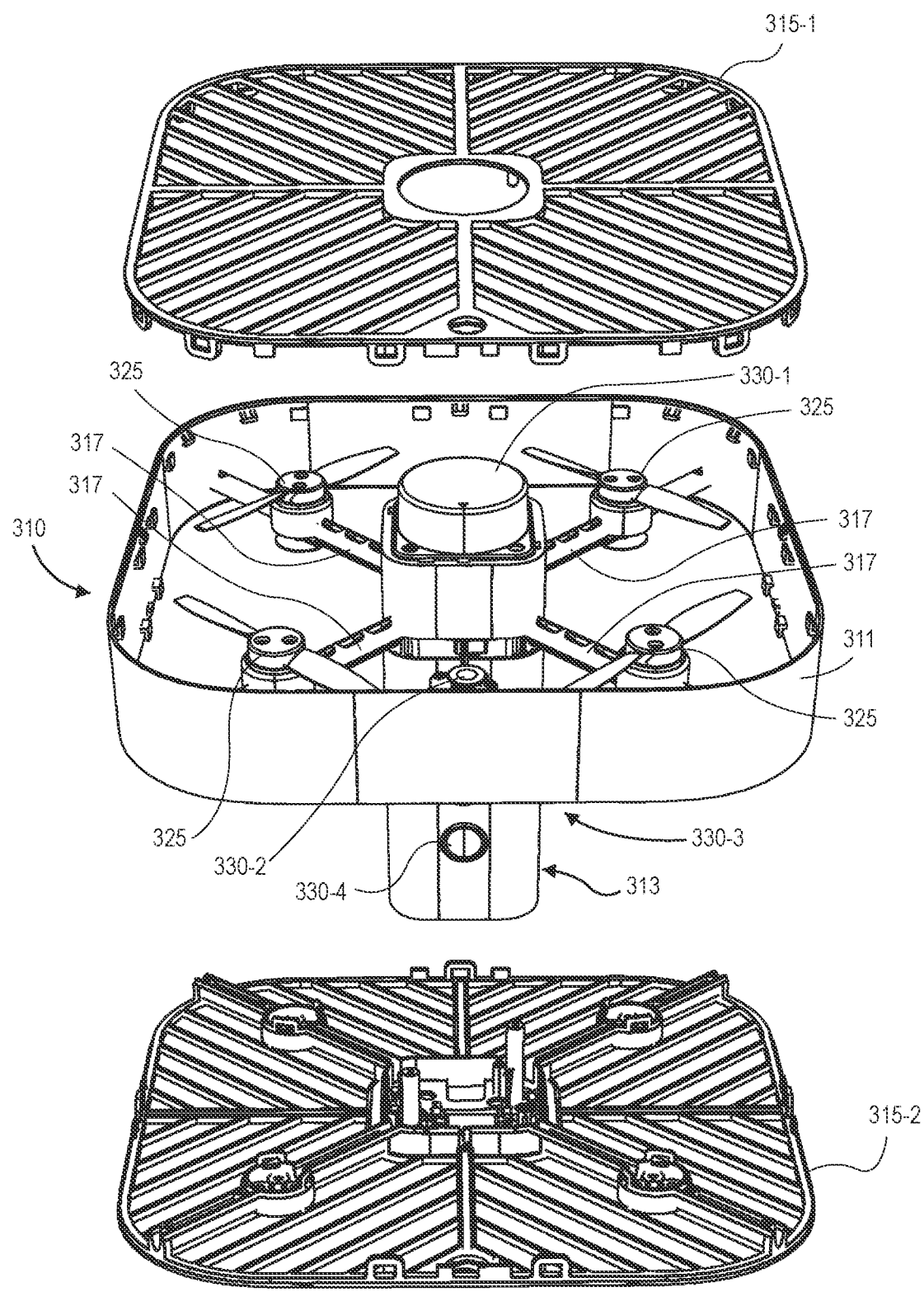
Figure 3C:
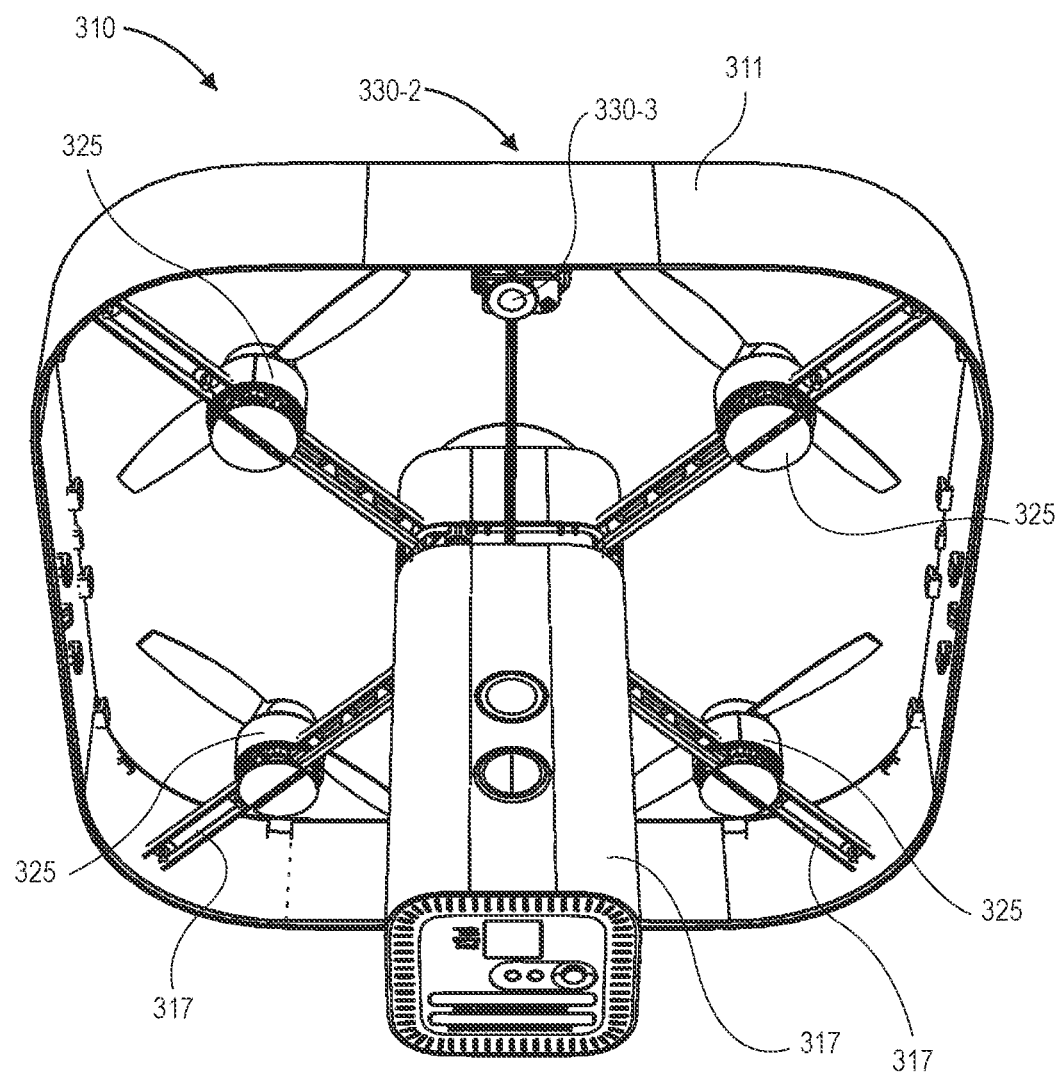

Referring to FIGS. 3A through 3C, views of aspects of one autonomous home security device (e.g., an aerial vehicle 310) in accordance with embodiments of the present disclosure are shown. Except where otherwise noted, reference numerals preceded by the number "3" shown in FIGS. 3A through 3C indicate components or features that are similar to components or features having reference numerals preceded by the number "2" shown in FIG. 2 or by the number "1" shown in FIGS. 1A through 1F.

FIG. 3A is a top perspective view of the aerial vehicle 310 with a top cover 315-1 and a bottom cover 315-2 mounted thereto. FIG. 3B is an exploded view of the top perspective view of the aerial vehicle 310 with the covers 315-1, 315-2 detached from the aerial vehicle 310. FIG. 3C is a bottom view of the aerial vehicle 310 with the covers 315-1, 315-2 removed therefrom.

As is shown in FIG. 3A, the aerial vehicle 310 includes a frame 311, a fuselage 313, and the pair of covers 315-1, 315-2. The frame 311 is defined by a plurality of sides (e.g., four sides) and has a common height. For example, as is shown in FIG. 3A, the frame 311 has a substantially square cross-section, e.g., a cross-section in the shape of a square with rounded corners or edges, or a squircle, with a constant height.

The fuselage 313 comprises a housing or chamber having a shape that is also defined by a plurality of sides (e.g., four sides) and a common height. For example, as is shown in FIG. 3A, the fuselage 313 also has a substantially square cross-section, e.g., a cross-section in the shape of a square with rounded corners or edges, or a squircle, with a constant height.

As is also shown in FIG. 3A, a height of the fuselage 313 is greater than a height of the frame 311. As is further shown in FIG. 3A, a length or width of the frame 311 is greater than a length or width of the fuselage 313. Alternatively, in some embodiments, the frame 311 and the fuselage 313 may have cross-sections of any other sizes or shapes, e.g., rectangles other than squares, triangles, or any other polygons, or circles or any other curvilinear shapes. In some embodiments, the frame 311 and the fuselage 313 may have the same or similar shapes, such as is shown in FIG. 3A, where each of the four sides of the frame 311 is parallel to at least one of the sides of the fuselage 313. In some other embodiments, however, the frame 311 and the fuselage 313 may have different or dissimilar shapes.

The frame 311 and the fuselage 313 are mounted to one another in a manner that causes a geometric center or centroid of a cross-section of the frame 311 to be aligned along a common axis with a geometric center or centroid of a cross-section of the fuselage 313. As is shown in FIG. 3A, the aerial vehicle 310 further includes a time-of-flight sensor module 330-1 provided at an upper end of the fuselage 313, at least partially above the frame 311, as well as a time-of-flight sensor module 330-2 provided at an upper edge of the fuselage 313, and a time-of-flight sensor module 330-3 provided at a lower edge of the fuselage 313.

The time-of-flight sensor module 330-1 may comprise an illuminator or other light source (e.g., a modulated light source) that is configured to transmit light along axes or directions that are normal to, and extend radially outward from, the axis along which the geometric center or centroid of the frame 311 and the geometric center or centroid of the fuselage 313 are coaligned. The time-of-flight sensor module 330-1 is further configured to capture reflections of the light off one or more surfaces. Reflected light captured by the time-of-flight sensor module 330-1 may be interpreted to generate a depth image or range profile of distances between the time-of-flight sensor module 330-1, and the one or more surfaces, several times per second.

In some embodiments, the time-of-flight sensor module 330-1 may be configured to rotate an illuminator, or the axis or the direction along which the time-of-flight sensor module 330-1 transmits light, about the axis along with the geometric center or centroid of the frame 311 and the geometric center or centroid of the fuselage 313 are coaligned. By rotating the illuminator or the transmissions of light about the axis along with the geometric center or centroid of the frame 311, and the geometric center or centroid of the fuselage 313 are coaligned, the time-of-flight sensor module 330-1 may be used to generate depth images, range profiles or other sets of distances covering three hundred sixty degrees around the aerial vehicle 310.

The time-of-flight sensors 330-2, 330-3 also include illuminators or other light sources (e.g., modulated light sources) that are configured to transmit light along axes that are parallel to the axis along which the geometric center or centroid of the frame 311 and the geometric center or centroid of the fuselage 313 are coaligned, and in opposite directions, e.g., up and down, with respect to the orientation of the aerial vehicle 310 as shown in FIG. 3A. The time-of-flight sensor modules 330-2, 330-3 are further configured to capture reflections of the light transmitted thereby off one or more surfaces above or below the aerial vehicle 310, and to interpret such reflections in order to generate depth images, range profiles or other sets of distances between the time-of-flight sensor modules 330-2, 330-3, and the one or more surfaces, several times per second.

The aerial vehicle 310 includes a visual camera 330-4 or other imaging device embedded or installed within the housing or chamber defined by the fuselage 313. The visual camera 330-4 has a lens and an image sensor defining a field of view extending normal to one of the sides of the fuselage 313. Alternatively, the aerial vehicle may include any number of the visual cameras 330-4, which may be provided on the same side of the fuselage 313, or on different sides of the fuselage 313. In some embodiments, the aerial vehicle 310 may include at least one visual camera 330-4 provided on each of the sides of the fuselage 313, thereby covering three hundred sixty degrees around the aerial vehicle 310. Alternatively, in some other embodiments, one or more visual cameras 330-4 may be mounted in association with the frame 311 or in any other location on the aerial vehicle 310. The housing or chamber defined by the fuselage 313 may further include any number of other components therein, including but not limited to processors, control systems, memory components, batteries or other power sources, transceivers, circuitry, or other sensors.

As is shown in FIGS. 3A and 3B, the aerial vehicle 310 further includes the top cover 315-1 and the bottom cover 315-2, which are mounted to upper and lower edges of the frame 311, respectively. The cross-sections of the covers 315-1, 315-2 have substantially the same size and shape as the frame 311, and may be joined to the upper and lower edges of the frame 311 in any manner. The covers 315-1, 315-2 may include grill-like or grated structures or features such as bars or other extensions that are distributed within planes of the covers and inhibit objects from entering into a cavity defined by the frame 311 from above or below the aerial vehicle 310. The covers 315-1, 315-2 may be aligned or provided in any manner. For example, as is shown in FIG. 3B, each of the covers 315-1, 315-2 includes four primary bars extending radially outward from a geometric center or centroid of the covers, or from the axis along which the geometric center or centroid of the frame 311 and the geometric center or centroid of the fuselage 313 are coaligned. The four primary bars are separated by approximately ninety degrees within planes defined by the respective covers 315-1, 315-2, and thereby divide such covers 315-1, 315-2 into quadrants of substantially equal area and shape.

As is also shown in FIG. 3B, the covers 315-1, 315-2 also feature secondary bars within each of the quadrants defined by the primary bars. Although secondary bars shown in FIG. 3B are aligned at forty-five degree angles with respect to the primary bars, the secondary bars of the covers 315-1, 315-2 may be aligned at any angle with respect to the primary bars, including parallel, perpendicular, or any other angle, in accordance with the present disclosure. As is further shown in FIG. 3B, the covers 315-1, 315-2 further include holes or other openings that enable light to be transmitted above or below the aerial vehicle 310 through such holes by the time-of-flight sensor modules 330-2, 330-3, and enable reflections of such light to be received through such holes by the time-of-flight sensor modules 330-2, 330-3.

As is also shown in FIGS. 3B and 3C, the aerial vehicle 310 further includes a plurality of struts 317 that join the frame 311 and the fuselage 313. For example, as is shown in FIG. 3B, each of the struts 317 includes a proximal end joined to an external surface of one of the rounded corners of the fuselage 313 and a distal end joined to an interior surface of one of the rounded corners of the frame 311. As is shown in FIGS. 3B and 3C, each of the struts 317 is of approximately equal length, and maintains the geometric center or centroid of the frame 311 in coalignment with the geometric center or centroid of the fuselage 313.

As is further shown in FIGS. 3B and 3C, the aerial vehicle 310 further includes a plurality of propulsion motors 325 that are provided within a cavity or volume defined by interior surfaces of the frame 311, exterior surfaces of the fuselage 313, and the covers 315-1, 315-2. The propulsion motors 325 may be any type or form of motors or prime movers that are configured to rotate propellers at desired speed within the cavity or volume, thereby providing forces of lift or thrust to the aerial vehicle 310.

In accordance with embodiments of the present disclosure, the top cover 315-1 and the bottom cover 315-2 may be mounted to the upper and lower edges of the frame 311 in any manner, such as by clips, screws, bolts, snap-fit connections, or any other features. Alternatively, or additionally, the covers 315-1, 315-2 may be mounted to the fuselage 313, the struts 317, the propulsion motors 325, the time-of-flight sensor modules 330-1, 330-2, 330-3 or any other portion of the aerial vehicle 310 in any manner. Moreover, as is further shown in FIGS. 3A and 3B, the top cover 315-1 includes a substantially circular hole (or bore, or other opening) at a geometric center or centroid, thereby enabling the top cover 315-1 to be placed over and coupled to an upper edge of the frame 311, with the hole or other opening encircled around or surrounding a circumference of the time-of-flight sensor module 330-1.

As is further shown in FIGS. 3B and 3C, the propulsion motors 325 includes housings or other features that are mounted to the struts 317, at locations between the proximal ends of the struts 317 joined to the rounded corners of the fuselage 313 and the distal ends of the struts 317 joined to the rounded corners of the frame 311. The propulsion motors 325 may be any type or form of motor, including but not limited to electric, gasoline-powered or other types of motors, that are capable of generating sufficient rotational speeds of one or more propellers or other components and providing thrust and/or lift forces to the aerial vehicle 310. In some embodiments, one or more of the propulsion motors 325 may be a brushless direct current ("DC") multi-phase motor such as an outrunner brushless motor or an inrunner brushless motor. In some embodiments, one or more of the propulsion motors 325 may be a brushed DC motor.

Furthermore, the frame 311, the fuselage 313, the covers 315-1, 315-2 and the struts 317, or external portions of housings of the propulsion motors 325, or any other components of the aerial vehicle 310, may be formed as single pieces, or as two or more pieces, that may be joined together or combined to form such components. For example, as is shown in FIG. 3B, the struts 317 may be substantially hollow or open channels that are closed or defined at least in part when the bottom cover 315-2 is mated with an upper portion of the fuselage 313. As is also shown in FIG. 3B, in some embodiments, the bottom cover 315-2 forms a portion of the housings of each of the propulsion motors 325. In some other embodiments, however, the struts 317 may be closed channels that extend between the fuselage 313 and the housings of the propulsion motors 325 or the frame 311

In some embodiments, the top cover 315-1, the bottom cover 315-2 and one or more portions of the fuselage 313 may be mated together in a manner that defines a cavity or volume that includes the propulsion motors 325 and any rotating propellers therein. For example, as is shown in FIG. 3B, the top cover 315-1 and the bottom cover 315-2 may be configured for mounting to an upper portion of the fuselage 313, thereby defining the cavity or the volume within which the propulsion motors 325 may operate to rotate one or more propellers. A lower portion of the fuselage 313 including the visual camera 330-4 and any number of other components therein, e.g., processors, control systems, memory components, batteries or other power sources, transceivers, circuitry, or other sensors, may be mounted to an underside of the bottom cover 315-2. Alternatively, in some embodiments, the fuselage 313 may be formed as a single, integral unit. In such embodiments, the bottom cover 315-2 may include a substantially square hole (or bore, or other opening) at a geometric center or centroid, thereby enabling the bottom cover 315-2 to be placed over the fuselage 313, such that the fuselage 313 is inserted through the hole, prior to coupling the bottom cover 315-2 to a lower edge of the frame 311.

The autonomous vehicles of the present disclosure may be formed from materials of any type or form. For example, in some embodiments, one or more of the frame 311, the fuselage 313, the covers 315-1, 315-2 and the struts 317, or external portions of housings of the propulsion motors 325, may be formed from one or more polycarbonates, or from one or more styrenes, e.g., polystyrenes or acrylonitrile butadiene styrenes (or "ABS"), or blends thereof, including but not limited to blends of polycarbonates and ABS. Alternatively, or additionally, one or more of the frame 311, the fuselage 313, the covers 315-1, 315-2 and the struts 317, or external portions of housings of the propulsion motors 325, may be formed from any other lightweight, durable materials such as plastics (e.g., thermosetting plastics such as epoxy or phenolic resins, polyurethanes or polyesters, as well as polyethylenes, polypropylenes or polyvinyl chlorides, and also recycled plastics), wood (e.g., woods with sufficient strength properties such as ash), metals (e.g., lightweight metals such as aluminum, or metals of heavier weights including alloys of steel), composites (e.g., carbon fiber), rubbers, or any other combinations of materials.

Some autonomous vehicles of the present disclosure may include internal flow paths that enable air flow, such as propeller wash, to pass into chambers or housings defined by a fuselage, and to maintain a temperature of one or more components within such chambers or housings at a desired or acceptable level, or within a desired or acceptable range or band.

Figure 4A:
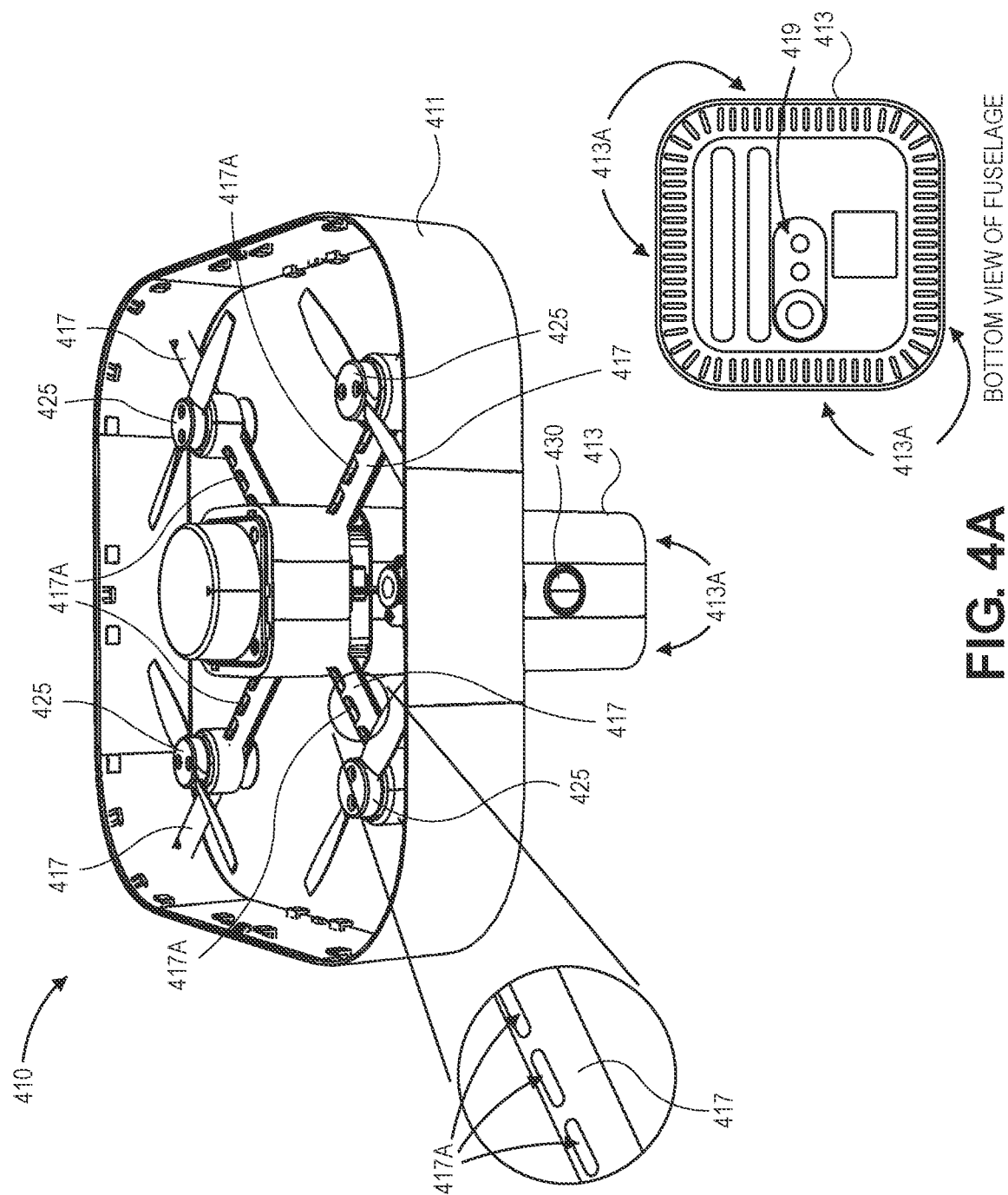
FIGS. 4A and 4B are views of aspects of one autonomous home security device in accordance with embodiments of the present disclosure.
Figure 4B:
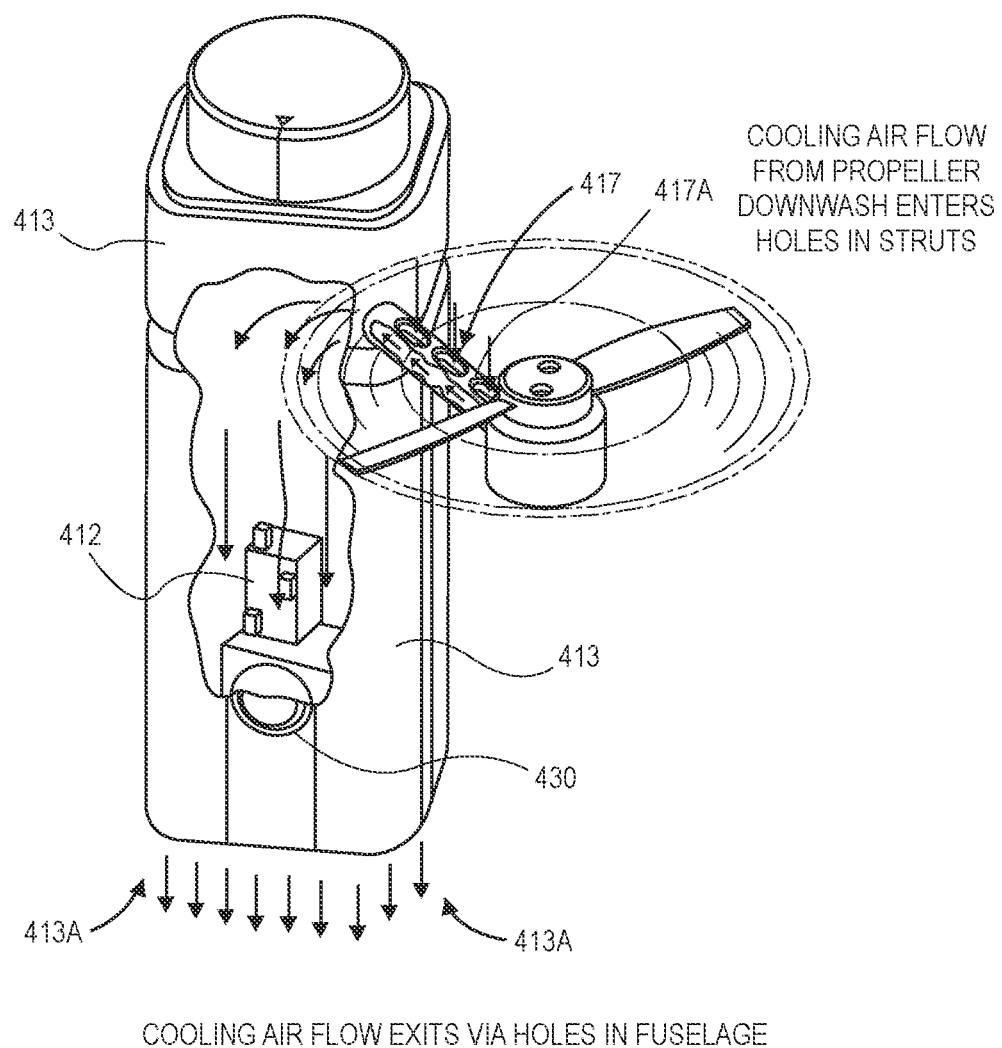

Referring to FIGS. 4A and 4B, views of aspects of one autonomous home security device (e.g., an aerial vehicle 410) in accordance with embodiments of the present disclosure are shown. Except where otherwise noted, reference numerals preceded by the number "4" shown in FIGS. 4A and 4B indicate components or features that are similar to components or features having reference numerals preceded by the number "3" shown in FIGS. 3A through 3C, by the number "2" shown in FIG. 2 or by the number "1" shown in FIGS. 1A through 1F.

As is shown in FIG. 4A, the aerial vehicle 410 includes a frame 411, a fuselage 413 and a plurality of struts 417. The frame 411 and the fuselage 413 have substantially square (e.g., rounded square) cross-sections and are joined to one another by the struts 417, which maintain a geometric center or centroid of the frame 411 and a geometric center or centroid of the fuselage 413 aligned on a common axis, or in any other manner. In particular, as is shown in FIG. 4A, each of the struts 417 is of approximately equal length, and includes a proximal end joined to an external surface of one of the rounded corners of the fuselage 413 and a distal end joined to an interior surface of one of the rounded corners of the frame 411. The aerial vehicle 410 further includes a plurality of propulsion motors 425 that are provided within a space between interior surfaces of the frame 411 and exterior surfaces of the fuselage 413, and are mounted to the struts 417 at locations between the proximal ends and the distal ends of the struts 417. In some embodiments, the aerial vehicle 410 may include a top cover or a bottom cover mounted at an upper edge or a lower edge, respectively, of the frame 411.

As is also shown in FIG. 4A, each of the struts 417 includes a plurality of holes 417A, bores or other openings on upper surfaces. When the propulsion motors 425 are operated to rotate propellers and generate forces of lift or thrust on the aerial vehicle 410, the holes 417A lie directly below the rotating propellers. Furthermore, as is further shown in FIG. 4A, an underside of the fuselage 413 includes a plurality of holes 413A at or near a perimeter of the fuselage 413, and a pair of contacts 419. Each of the holes 413A is provided along a perimeter of the underside of the fuselage 413, and may be formed within the sides or rounded corners of the fuselage 413, or in a bottom panel of the fuselage 413. The holes 413A in the underside of the fuselage 413 and the holes 417A in the upper surfaces of the struts 417 may each have the same size or shape, or may have varying or different sizes or shapes.

The pair of contacts 419 may be provided in a predetermined arrangement or pattern that is consistent with an arrangement or pattern of corresponding contacts on an internal surface of an opening of a base component (or a charging dock, or another intermediary device). For example, a primary one of the contacts 419 may be provided substantially centrally in the underside of the fuselage 413, or aligned at or along a geometric center or centroid of a cross-section of the fuselage 413, while a secondary one of the contacts 419 may be provided at a predetermined fixed distance from the geometric centroid or center of the cross-section of the fuselage 413.

As is shown in FIG. 4B, the holes 417A in the struts 417 define flow paths that extend through the struts 417 and into a chamber or housing formed by the fuselage 413 before exiting the fuselage 413 by way of the holes 413A.

Thus, as is shown in FIG. 4B, when one or more of the propulsion motors 425 are engaged in rotating operation, cooling air flow from the downwash of propellers rotated by such motors 425 enters the holes 417A in the struts 417 and passes through openings in the struts 417 into the chamber or housing defined by the fuselage 413, passing over and along one or more processors 412 and internal components of the camera 430 before exiting via the holes 413A in the fuselage 413. The cooling air flow supplied by the downwash of propellers enables heat generated during the operation of the processors 412, the camera 430 or any other components within the chamber or housing to be convectively transferred out of the fuselage 413, without requiring any further or additional fans, pumps or other systems.

Figure 5A:
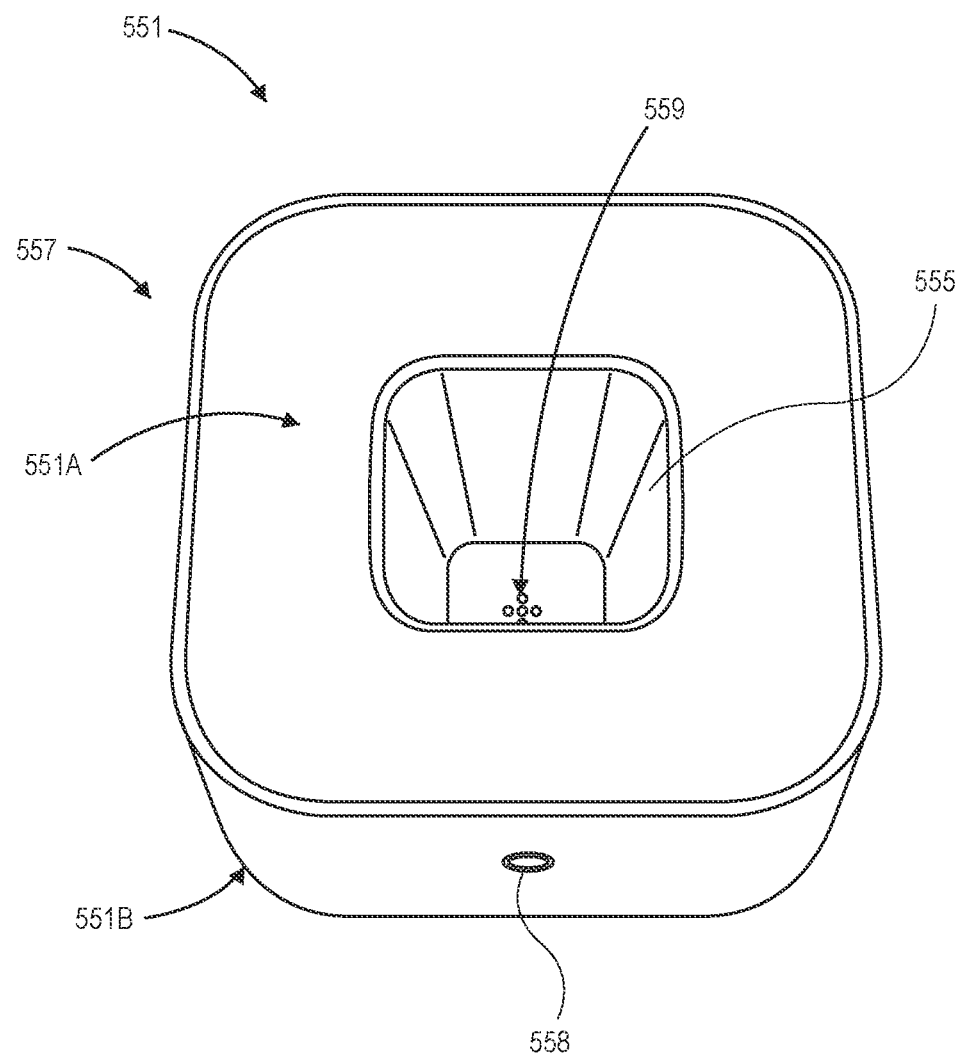
FIGS. 5A and 5B are views of aspects of one system for use in connection with autonomous home security devices in accordance with embodiments of the present disclosure.
Figure 5B:
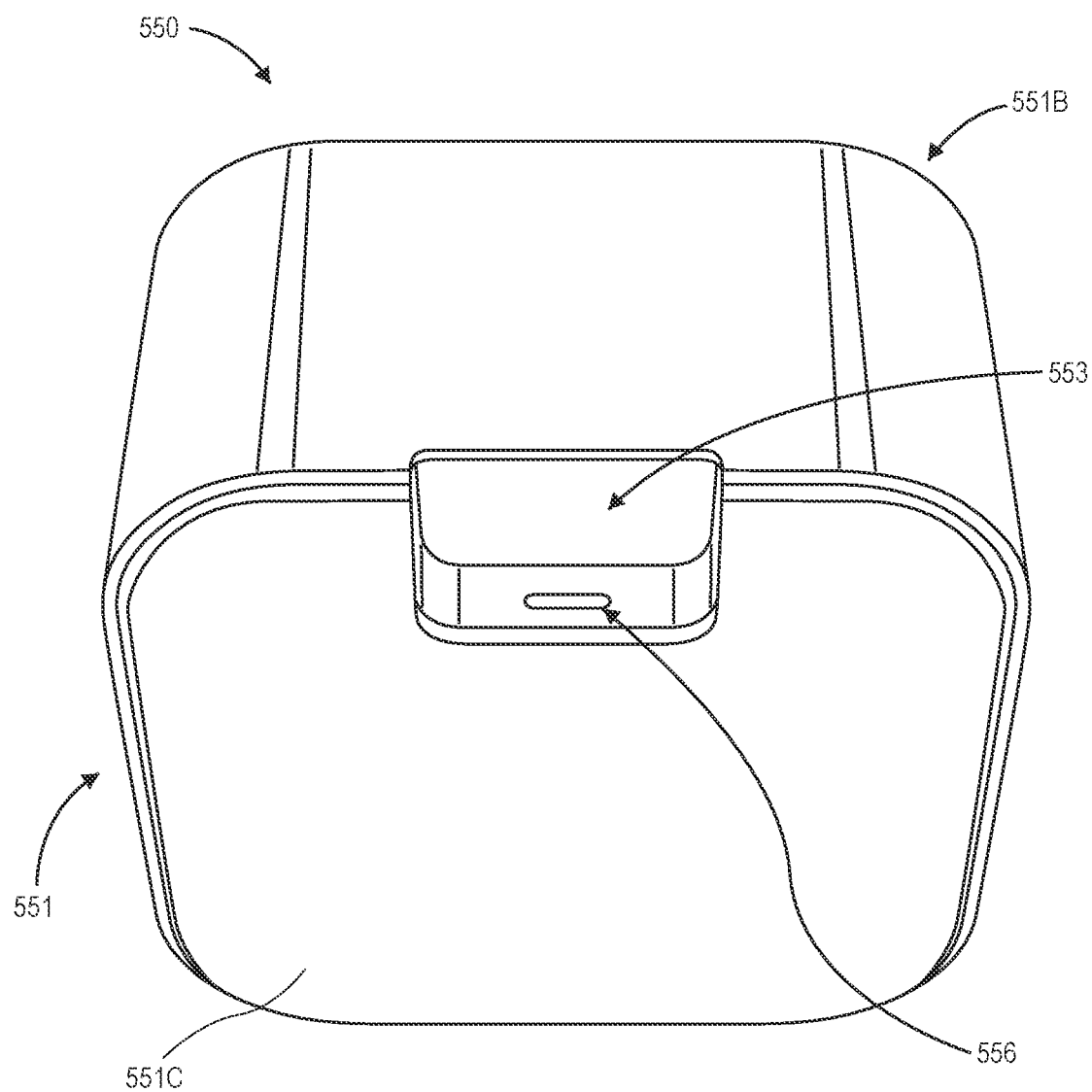

As is discussed above, the autonomous vehicles of the present disclosure may be configured to operate in conjunction with one or more base components, charging docks or other intermediary devices. Such components, docks or devices may be configured to receive one or more portions of an autonomous vehicle therein, and to transfer electrical power, information or data to or from the autonomous vehicle, or to otherwise provide services to the autonomous vehicle, among other functions. Referring to FIGS. 5A and 5B, views of aspects of one system (e.g., a base component 550) for use in connection with autonomous home security devices in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A and 4B, by the number "3" shown in FIGS. 3A through 3C, by the number "2" shown in FIG. 2 or by the number "1" shown in FIGS. 1A through 1F.

FIG. 5A is a top perspective view of the base component 550. FIG. 5B is a bottom perspective view of the base component 550.

As is shown in FIG. 5A, the base component 550 (or charging dock, or another intermediary device) including a frame 551 (or body) defined by or formed from a top section 551A and a bottom section 551B. The top section 551A includes a substantially planar top surface and an opening 555 descending downward therefrom. The top surface of the top section 551A has a substantially square area, e.g., an area in a shape of a rounded square, and the opening 555 is formed or molded therein with a cross-section that also has a substantially square shape, e.g., a shape of a rounded square. Alternatively, in some embodiments, the top surface of the top section 551A and the cross-section of the opening 555 need not have the same or similar shapes. A bottom surface of the opening 555 further includes a plurality of contacts 559 that are provided in a predetermined arrangement or pattern that is consistent with an arrangement or pattern of corresponding contacts on an external surface of a portion of an autonomous vehicle, e.g., the contacts 419 on the underside of the fuselage 413 shown in FIG. 4A. For example, as is shown in FIG. 5A, a primary one of the contacts 559 may be provided substantially centrally in the bottom of the opening 555, or aligned at or along a geometric center or centroid of a cross-section of the opening 555, while four other secondary contacts 559 may be provided at a predetermined fixed distance from the primary one of the contacts 559, each separated by ninety degrees with respect to the primary one of the contacts 559.

Thus, when the fuselage 413 of the autonomous vehicle 410 of FIGS. 4A and 4B, or any other portion of an autonomous vehicle having a pair of contacts in an arrangement or pattern that matches the arrangement or pattern of the contacts 559 and a substantially square cross-section of a similar size, is inserted into the opening 555, the fuselage 413 may be received therein in any one of four orientations about an axis along which a geometric center or centroid of the fuselage 413 is aligned. With the fuselage 413 inserted into the opening 555, the primary one of the contacts 419 in the center of the underside of the fuselage 413 may come into contact with the primary one of the contacts 559 in the center of the bottom of the opening, and the secondary one of the contacts 419 may come into contact with any one of the four secondary contacts 559. Where contacts of an autonomous vehicle, such as the aerial vehicle 410, mate with or otherwise contact the contacts 559 within the opening 555, the base component 550 may transfer electrical power, information or data to the autonomous vehicle, or receive electrical power, information or data from the autonomous vehicle, by way of the contacts 559.

Those of ordinary skill in the pertinent arts will recognize that the opening 555 may include any number of contacts 559 therein, including as few as one, or as many as three, four, five or more. Moreover, the number of the contacts 559 may but need not correspond to a shape of the opening 555. For example, as is shown in FIG. 5A, the opening 555 has a cross-section in a shape of a square, and the contacts 559 include four contacts provided around a central contact. Alternatively, in some embodiments, the opening 555 may have a cross-section in a shape of a triangle, and may be sized to accommodate a portion of an autonomous vehicle (e.g., a fuselage) that also has a cross-section in a shape of a triangle, and includes three contacts provided around a central contact, each separated by one hundred twenty degrees about the central contact. When a surface of the portion of the autonomous vehicle is inserted into the opening 555, the base component 550 may transfer electrical power, information or data to the autonomous vehicle, or receive electrical power, information or data from the autonomous vehicle, by way of the contacts 559. Similarly, where the opening 555 has a cross-section in a shape of a pentagon, and is sized to accommodate a portion of an autonomous vehicle (e.g., a fuselage) that also has a cross-section in a shape of a pentagon, and includes five contacts provided around a central contact, each separated by seventy-two degrees about the central contact. When a surface of the portion of the autonomous vehicle is inserted into the opening 555, the base component 550 may transfer electrical power, information or data to the autonomous vehicle, or receive electrical power, information or data from the autonomous vehicle, by way of the contacts 559. A cross-section of the opening 555 may have any shape, e.g., a polygon having any number of sides, or any curvilinear shape, and may receive any portion of an autonomous vehicle having a similar size and the same shape.

Components of the frame 551, including the top portion 551A and the bottom portion 551B, may be formed from any suitable materials in accordance with the present disclosure, including the same materials as one or more aspects of an autonomous vehicle, or different materials. For example, in some embodiments, the frame 551 may be formed from polycarbonates, ABS, a blend of polycarbonates and ABS, or any other suitable materials, e.g., plastic, wood, metal, composites, or any other materials. The frame 551 may be formed from any number of portions, pieces or sections, such as one, two (viz., the top portion 551A and the bottom portion 551B), or more.

As is also shown in FIG. 5A, the base component 550 includes a visual feedback element 558, e.g., one or more individually addressable lights, such as LED lights. The visual feedback element 558 may be configured to display, present or visually indicate a status of the base component 550, or an autonomous vehicle associated with the base component 550, in any manner. For example, the visual feedback 558 may be configured to display one or more lights with different intensities, frequencies or wavelengths to reflect various statuses of the base component 550 or an autonomous vehicle, including levels of electrical power (e.g., battery level) of the base component 550 or the autonomous vehicle, or a status of a power transfer (e.g., a battery charge) between the base component 550 and the autonomous vehicle. Alternatively, the visual feedback element 558 may indicate a status of a security system with which the base component 550 or the autonomous vehicle is associated. The intensities, frequencies or wavelengths of light emitted by the visual feedback element 558 may be selected on any basis, such as green (or brighter or more intense lights) to indicate a fully charged battery, yellow (or less bright or less intense lights) to indicate a battery charge in progress, and red (or dim or not intense lights) to indicate an insufficiently charged battery. Alternatively, the visual feedback element 558 may emit a green light of any intensity when a security system is armed or activated, and a red light of any intensity when the security system is not armed or is deactivated.

The base component 550 may include any number of the visual feedback elements 558, either on the same side of the base component 550, or on multiple sides of the base component 550.

Moreover, in some embodiments, such as where the base component 550 includes or is a smart speaker or like device, the visual feedback element 558 may be a LED display on which any information or data may be displayed. Furthermore, in some other embodiments, the visual feedback element 558 may be accompanied or replaced by one or more other feedback elements of any type or form, e.g., audible feedback elements (such as speakers), haptic feedback elements, or feedback elements of any other type or form.

The base component 550 may be designed or constructed to maintain an autonomous vehicle or a portion thereof within the opening 555 by gravity alone, such that one or more portions of an autonomous vehicle rests on one or more upper portions of the frame 551, or one or more portions within the opening 555, or by gravity with one or more other components or systems. For example, in some embodiments, the base component 550 may include one or more latches, hooks or electromagnetic elements (not shown) that may be activated to release or secure an autonomous vehicle or portion thereof within the opening 555.

As is shown in FIG. 5B, the base component 550 further includes a foot (or other section or panel) 551C that mates with the bottom cover and forms an underside of the base component 550. The foot 551C may be formed from the same materials as the top portion 551A or the bottom portion 551B or, alternatively, one or more other materials, such as one or more rubbers or another waterproof material or electrical insulator.

Additionally, as is further shown in FIG. 5B, the base component 550 also includes a recess 553 having a connector 556 for connecting the base component 550 to one or more networks, power sources, or other external systems (not shown). By providing the connector 556 within the recess 553 in the frame 551, rather than on an outer surface of the frame 551, the connector 556 enables the base component 550 to be placed adjacent or otherwise within close proximity of a wall or other structure while still receiving connections with cords, cables or other conductors having standard or custom plugs, jacks or other connectors, and without subjecting such cords, cables or other conductors to undesirable bends or turn radii. Alternatively, or additionally, the recess 553 may include one or more other jacks, ports or other connectors alongside or in lieu of the connector 556. In some embodiments, the base component 550 may receive electrical power along with information or data by way of the connector 556, e.g., by Power over Ethernet (or "PoE"), USB Type-C, or any other systems or protocols.

In some embodiments, an autonomous vehicle may include one or more visual cameras or other imaging devices provided in locations that are concealed or obstructed by a base component, a charging dock or another intermediary device when the autonomous vehicle is not operating. In some other embodiments, an autonomous vehicle may further include one or more time-of-flight sensors that are operated on an intermittent basis, or at regular intervals, when the autonomous vehicle is not operating in order to determine whether the autonomous vehicle, or a base component, a charging dock or another intermediary device has been moved.

Figure 6A:
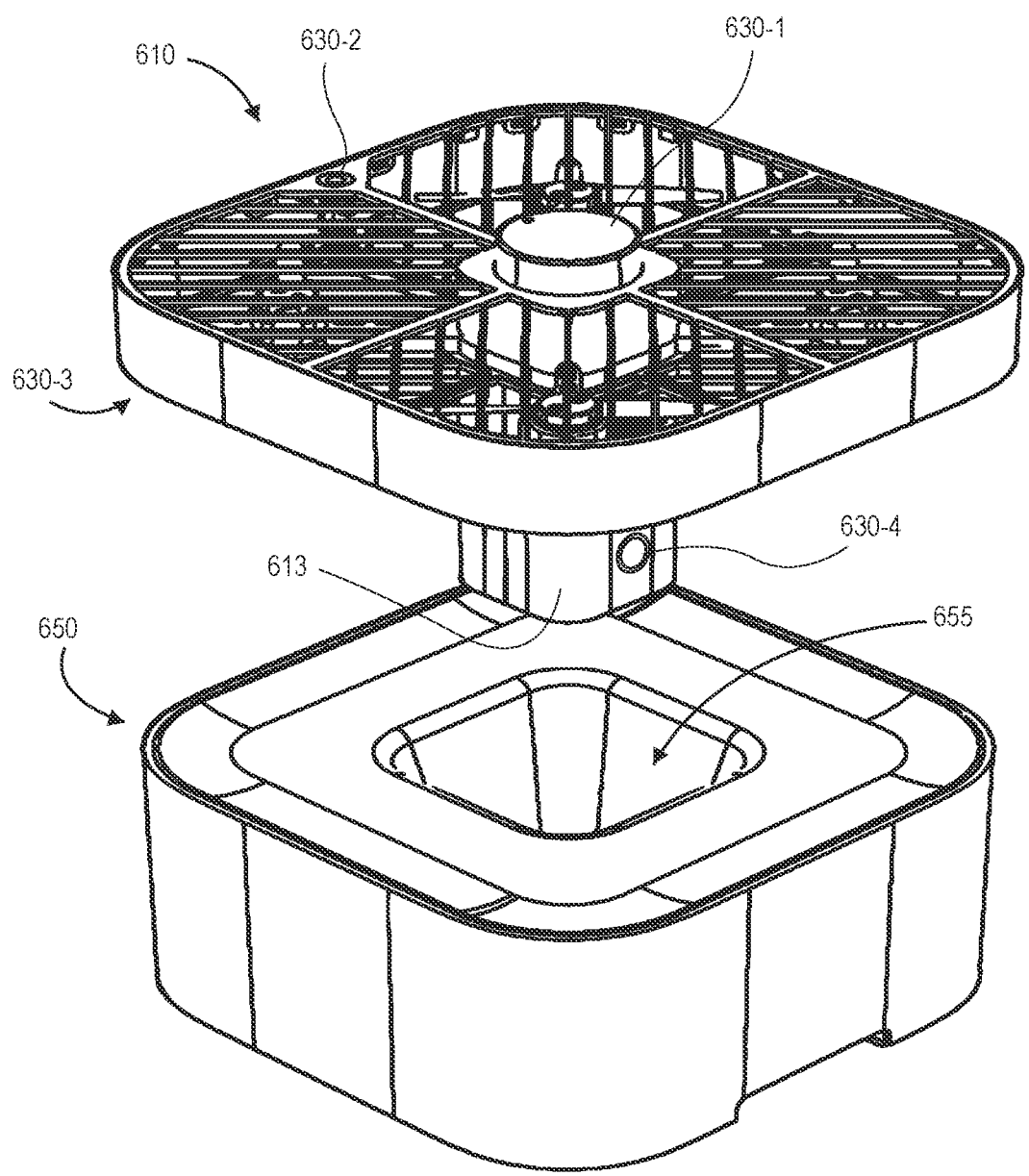
FIGS. 6A and 6B are views of aspects of one system including an autonomous home security device in accordance with embodiments of the present disclosure.
Figure 6B:
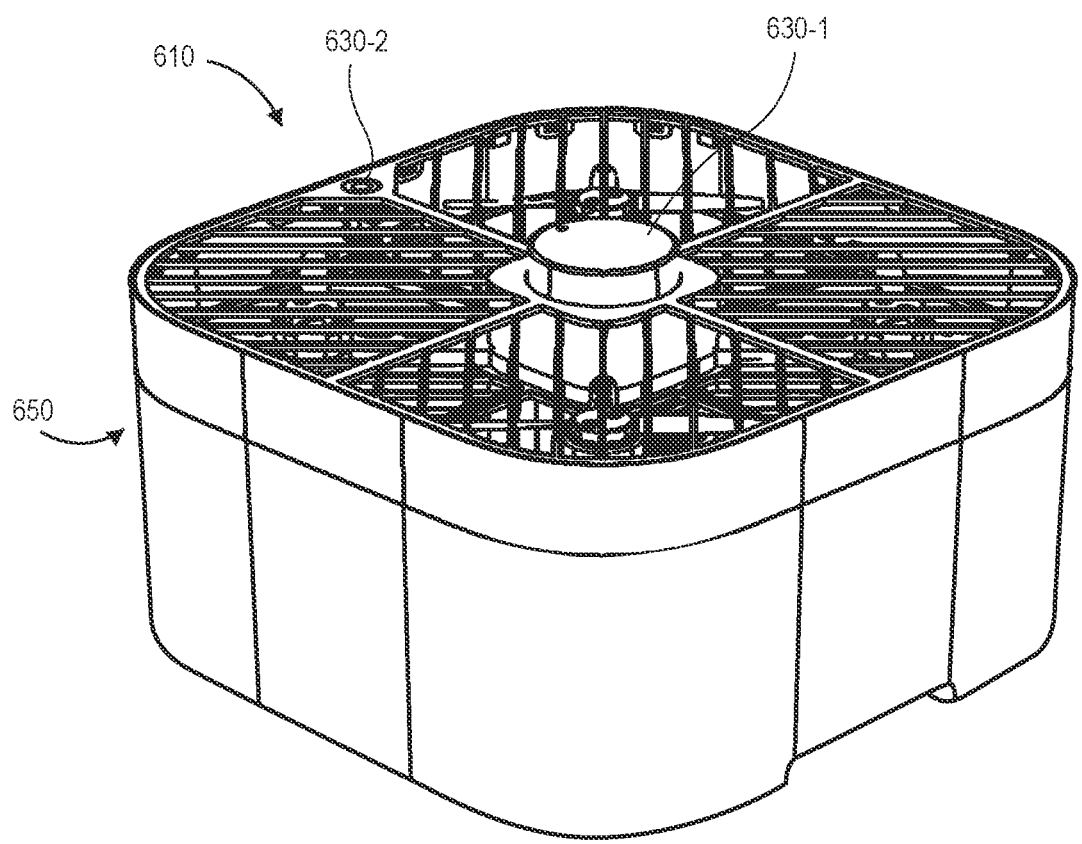

Referring to FIGS. 6A and 6B, views of aspects of one system including an autonomous home security device (e.g., an aerial vehicle 610) in accordance with embodiments of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

As is shown in FIG. 6A, the aerial vehicle 610 is shown positioned above a base component 650. The aerial vehicle 610 includes a plurality of imaging devices or other sensors 630-1, 630-2, 630-3, 630-4, including time-of-flight sensors 630-1, 630-2, 630-3 and a visual camera 630-4. The base component 650 includes an opening 655 that is sized to receive a fuselage 613 of the aerial vehicle 610. For example, as is shown in FIG. 6A, the fuselage 613 has a substantially square cross-section, and the opening 655 has a substantially square cross-section that is sufficiently large to accommodate the fuselage 613 therein. As is further shown in FIG. 6A, the aerial vehicle 610 and the base component 650 also have substantially square cross-sections of substantially equal sizes.

The time-of-flight sensor module 630-1 extends above the aerial vehicle 610 and includes an illuminator or other light source (e.g., a modulated light source) that is configured to transmit light along rotating axes or in directions that are normal to, and extend radially outward from, a yaw axis (or a vertical axis) of the aerial vehicle 610, and to capture reflections of light from surfaces around the aerial vehicle 610. The time-of-flight sensor 630-2 comprises an illuminator or other light source that is configured to transmit light vertically upward, above the aerial vehicle 610, along an axis that is parallel to the yaw axis (or vertical axis) of the aerial vehicle 610, and to capture reflections of the light from surfaces above the aerial vehicle 610. Likewise, the time-of-flight sensor 630-3 comprises an illuminator or other light source that is configured to transmit light vertically upward, below the aerial vehicle 610, along an axis that is parallel to the yaw axis (or vertical axis) of the aerial vehicle 610, and to capture reflections of the light from surfaces below the aerial vehicle 610. Reflections of light captured by the time-of-flight sensors 630-1, 630-2, 630-3 may be interpreted to construct depth images, range profiles or other sets of distances between the time-of-flight sensors 630-1, 630-2, 630-3, and one or more surfaces above, below or around the aerial vehicle 610, several times per second.

The visual camera 630-4 includes a lens provided in a side of the fuselage 613 of the aerial vehicle 610, along with image sensors and any number of chips, electrodes, clocks, boards, timers or other relevant features on or within the fuselage 613. A field of view of the visual camera 630-4 extends radially outward from the fuselage 613.

As is shown in FIG. 6A, the time-of-flight sensors 630-1, 630-2, 630-3 are capable of transmitting light and receiving reflections of the light, and determining distances or ranges to surfaces of objects from which the light was reflected when the aerial vehicle 610 has ascended above the base component 630 and engages in airborne operations. Likewise, the visual camera 630-4 is exposed and capable of capturing visual imaging data when the aerial vehicle 610 ascends above the base component 650, and engages in airborne operations after the fuselage 613 is clear from the opening 655.

As is shown in FIG. 6B, however, when the aerial vehicle 610 has descended to the base component 650, e.g., to land, and the fuselage 613 is inserted into the opening 655, the visual camera 630-4 is concealed or obstructed, and the time-of-flight sensor 630-3 is in contact with or close proximity of an upper surface of the base component 650. However, the time-of-flight sensors 630-1, 630-2 are neither concealed nor obstructed by the base component 650, and may be operated to determine distances or ranges to surfaces of objects above or around the aerial vehicle 610, even as the aerial vehicle 610 is not engaged in airborne operations.

Figure 7B:
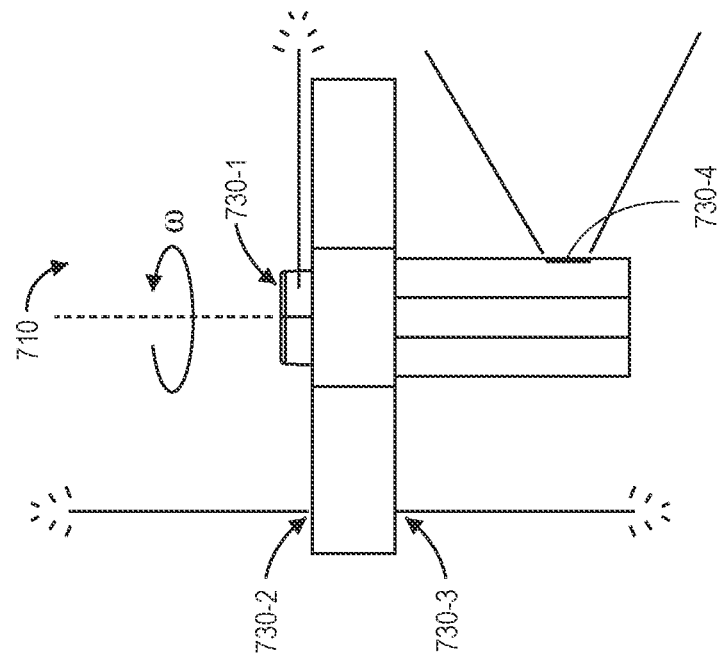
FIGS. 7A and 7B are views of aspects of one autonomous home security device in accordance with embodiments of the present disclosure.
Figure 7A:
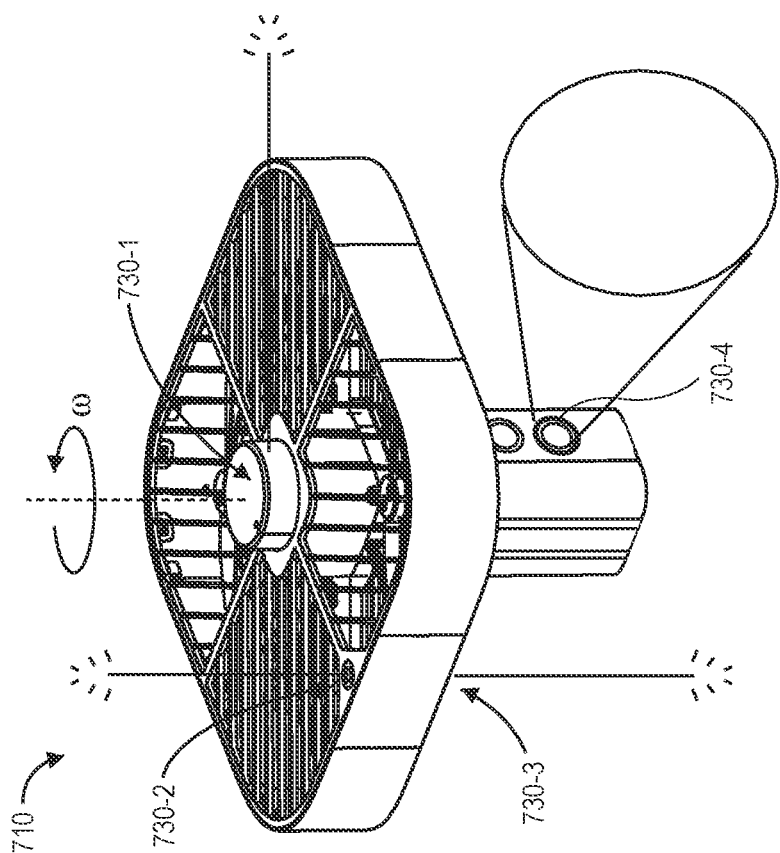

Autonomous vehicles of the present disclosure may be operated in any manner to capture information or data, e.g., distances or ranges to surfaces of objects above, below or around the autonomous vehicles, as well as images of their surroundings, or any other information or data. Referring to FIGS. 7A and 7B, views of aspects of one autonomous home security device (e.g., an aerial vehicle 710) in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

As is shown in FIGS. 7A and 7B, the aerial vehicle 710 includes time-of-flight sensors 730-1, 730-2, 730-3 and a visual camera 730-4. The time-of-flight sensor 730-1 extends above the aerial vehicle 710 and is configured to transmit light on axes or directions that may rotate at any angular velocity ω, such as ten revolutions per minute. The time-of-flight sensors 730-2, 730-3 are configured to transmit light above and below the aerial vehicle 710, respectively. Reflections of light captured by the time-of-flight sensors 730-1, 730-2, 730-3 may be interpreted to construct depth images, range profiles or other sets of distances between the time-of-flight sensors 730-1, 730-2, 730-3, and one or more surfaces above, below or around the aerial vehicle 710, several times per second. Additionally, the visual camera 730-4 includes a lens provided in a side of the fuselage 713 of the aerial vehicle 710, along with image sensors and any number of chips, electrodes, clocks, boards, timers or other relevant features within the fuselage 713. A field of view of the visual camera 730-4 extends radially outward from the fuselage 713.

Thus, as is shown in FIG. 7B, the aerial vehicle 710 may be operated to travel in any direction and on any course, at any speed, and at any altitude, and may capture imaging data, e.g., reflections of light or visual images, regarding its surroundings. In some embodiments, the aerial vehicle 710 may include any other type or form of sensors, including but not limited to Wi-Fi or Bluetooth receivers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors, and may capture any type or form of information or data as the aerial vehicle 710 travels on any course, at any speed, and at any altitude.

Figure 8:
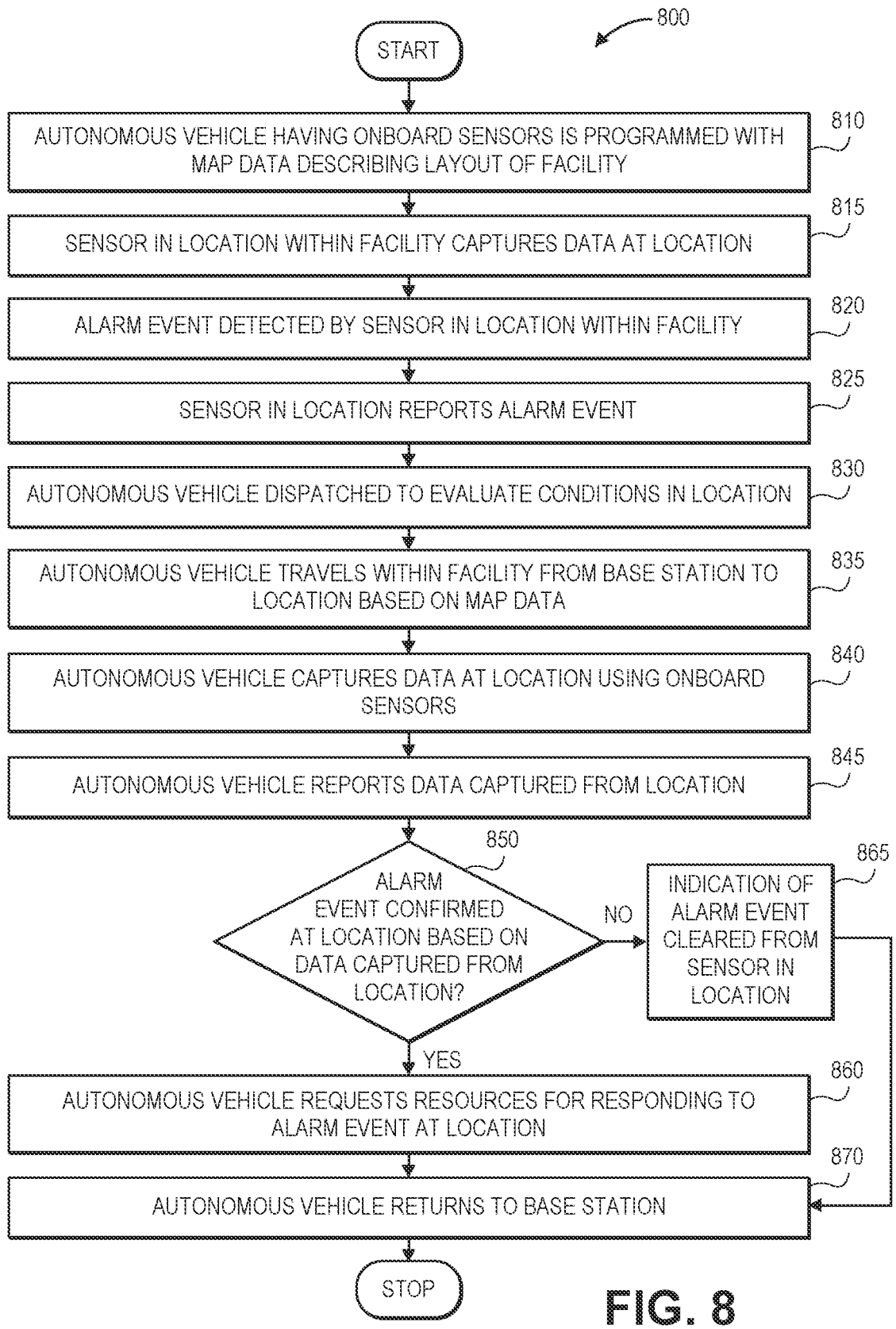
FIG. 8 is a flow chart of one process for using an autonomous home security device in accordance with embodiments of the present disclosure.

As is discussed above, autonomous home security devices (e.g., autonomous vehicles) of the present disclosure may be configured to determine whether an alarm event or condition that has been detected by one or more sensors within a facility is actually occurring. Referring to FIG. 8, a flow chart 800 of one process for using an autonomous home security device in accordance with embodiments of the present disclosure is shown.

At box 810, an autonomous vehicle having one or more onboard sensors is programmed with map data describing a layout of a facility. The autonomous vehicle may be an aerial vehicle (e.g., a drone), a ground vehicle (e.g., a robot), or any other vehicle that may be programmed with one or more sets of instructions for autonomously traveling throughout one or more spaces within the facility, e.g., by one or more motors or other propulsion systems. The sensors may include any type or form of acoustic sensors (e.g., microphones), imaging devices (e.g., digital cameras), wireless communication transceivers, heat sensors, water sensors, or any other type or form of sensors. The map data may identify or depict one or more boundaries (e.g., walls, ceilings, floors) or other aspects of such spaces, as well as the respective dimensions of such spaces, or the respective surfaces or textures of such boundaries.

The map data may further include locations of utilities, services or other systems within such spaces. For example, the map data may identify locations of water faucets, gas mains, electrical outlets or conductors, coaxial or network (e.g., Ethernet) connections, air ducts (e.g., inlets or outlets), or other utility connections. The map data may further identify locations of one or more portals such as doors of any type or size, windows or other openings. The map data may also identify locations of any systems within such spaces, including but not limited to signal emitting devices such as mobile devices (e.g., computer systems that are configured to communicate via Wi-Fi, Bluetooth, or other protocols or standards), acoustic speakers, video displays (e.g., televisions), security components (e.g., smoke alarms, door sensors, window sensors, motion sensors, wireless routers), or any other systems that emit wireless energy of any type or form. The map data may further identify locations of any appliances, fixtures or other systems within such spaces, e.g., ovens, refrigerators, washing machines, dryers, set-top boxes, ceiling fans, fireplaces, heating equipment, ventilation equipment, air conditioners, or any other appliances, fixtures or systems. In some embodiments, the map data may have been generated at least in part by the autonomous vehicle, or by one or more other autonomous vehicles, e.g., during one or more prior or concurrent missions throughout the facility.

At box 815, a sensor in a location within the facility captures data at the location. For example, the sensor may be a component part of one or more of a smoke detector, a carbon monoxide or carbon dioxide detector, a thermostat, a hygrometer, a barometer, a water sensor, a light sensor, a heat sensor, a microphone, an imaging device (e.g., a digital camera) or any other system at the location. At box 820, an alarm event is detected by the sensor at the location, based at least in part on the data captured at box 815. For example, the sensor may detect a numerical value or indication of a status or a condition at the location, e.g., a temperature, a pressure, a humidity level, or any other status or condition, and determine that the value or indication exceeds or falls below a predetermined threshold or set point. Alternatively, the sensor may detect the existence of matter at the location, e.g., broken glass or water on floor surfaces, airborne particulates, or any other matter, and determine that the presence of the matter is untimely or inappropriate at the location. The sensor may also detect motion, light, sounds or other indications of events or conditions at the location, e.g., within imaging data, and may determine that such events or conditions at the location are also untimely or inappropriate.

At box 825, the sensor in the location reports the alarm event. For example, the sensor may be configured to transmit one or more signals or other information or data to one or more computer devices or systems over a network, e.g., to the autonomous vehicle (or to one or more other autonomous vehicles), to an intermediary device, or to a server either at the location or in one or more alternate or virtual locations, such as in a "cloud"-based environment. Such signals or other information or data may include an indication that the alarm event has been detected, and, alternatively or additionally, may include any of the data captured at box 815 that served as a basis for determining that the alarm event is occurring at the location. Alternatively, the sensor may emit one or more acoustic signals (e.g., sirens), visual signals (e.g., lights), or take any other actions to indicate that the alarm event has occurred.

At box 830, an autonomous vehicle is dispatched to evaluate conditions in the location of the sensor. For example, the autonomous vehicle may receive a request or instruction from the sensor directly, or from another computer device or system such as an intermediary device at the facility or a server at the facility or elsewhere. Alternatively, the autonomous vehicle may dispatch itself to the location of the sensor, e.g., upon detecting that the sensor in the location has reported the alarm event, such as by emitting one or more acoustic or visual signals.

At box 835, the autonomous vehicle travels within the facility from a base station to the location based on the map data. For example, the autonomous vehicle may select one or more courses, speeds or altitudes for traveling to the location from the base station, or from any other location, taking into account locations of any boundaries or other airborne or ground traffic, or any other obstacles, and cause the autonomous vehicle to travel by air or on the ground from the base station to the location. Alternatively, the autonomous vehicle may travel from any other location to the location based on the map data. For example, at a time that the autonomous vehicle is dispatched to evaluate the conditions in the location of the sensors at box 830, the autonomous vehicle may be engaged in one or more roaming operations throughout the facility, or may be performing any other function, and may travel from any associated location to the location of the sensor.

At box 840, the autonomous vehicle captures data at the location using the one or more onboard sensors. For example, the autonomous vehicle may capture data relating to the alarm event, or data of a similar type or form to that which was captured by the sensor at box 815, such as data regarding temperatures or smoke where the reported alarm event is a fire, or water levels where the reported event is a flood or a leak. Alternatively, the autonomous vehicle may capture data that is not of the same type or form as the data that was captured by the sensor at box 815, e.g., one or more images where the reported event is a fire identified based on heat or smoke, or a flood or a leak identified based on the presence of water.

At box 845, the autonomous vehicle reports the data that was captured at the location at box 840, e.g., to one or more external computer devices or systems. For example, the autonomous vehicle may transmit the data to an intermediary device or other computer device or system (e.g., a server) over one or more networks. In some embodiments, the data captured at box 840 may be transmitted to a device or system that dispatched the autonomous vehicle to the location at box 830.

At box 850, whether the alarm event has been confirmed at the location based on the data captured at box 840 is determined. For example, a computer device or system to which the data was reported at box 845 may evaluate the data, independently or along with data captured by the sensor at box 815, to determine whether the alarm event is actually occurring at the location, e.g., to various levels of confidence. In some embodiments, the computer device or system may make one or more quantitative or qualitative determinations regarding a probability or a likelihood that the alarm event is occurring at the location. In some embodiments, where the computer device or system determines that the alarm event is occurring, e.g., to a sufficiently high level of confidence, the computer device or system may calculate a degree to which the alarm event is occurring, or some other metric indicative of an extent of the alarm event based on the data captured at box 840. In some embodiments, where the computer device or system indicates that the alarm event is not occurring, e.g., to a sufficiently high level of confidence, the computer device or system may calculate one or more degrees or metrics indicative of a proximity or an imminence of the alarm event, e.g., a likelihood or probability that the alarm event will occur at the location, based on the data captured at box 840.

Alternatively, in some embodiments, the autonomous vehicle may be programmed or configured to autonomously determine whether the alarm event reported by the sensor at box 825 is occurring at the location based on the data captured at box 840. In such embodiments, the autonomous vehicle need not report the data captured at box 840 to any other computer device or system.

If an alarm event is determined to be occurring at the location, e.g., to a sufficiently high level of confidence, either by the autonomous vehicle or by any other device or system, then the process advances to box 860, where the autonomous vehicle requests one or more resources for responding to the alarm event at the location. For example, upon confirming or otherwise determining that a fire is occurring at the location, the autonomous vehicle transmits one or more signals or requests for firefighting equipment or personnel to travel to the location. Such signals or requests may include any information regarding the fire, such as a classification of the fire (e.g., Class A, Class B, Class C), as well as an identifier of a location or a source of the fire, along with an identifier of a size or extent of the fire. As another example, upon confirming or otherwise determining that a flood or a leak is occurring at the location, the autonomous vehicle may transmit one or more signals or request for dewatering or repairing equipment or personnel to travel to the location. Such signals or requests may include any information regarding the flood or leak, such as a classification of a fluid within the flood or leak (e.g., water, gasoline, oil), as well as an identifier of a location or a source of the flood or leak, along with an identifier of a size or extent of the flood or leak. As yet another example, upon confirming or otherwise determining that a security breach is occurring or has occurred at the location, the autonomous vehicle may transmit one or more signals or requests for security personnel (e.g., police or other public or private authorities) to address the security breach. Such signals or requests may include any information regarding the security breach, such as an identifier of evidence by which the security breach was determined (e.g., open doors or windows, broken glass or other damage, footprints or other human-related artifacts), along with an identifier of a location where the security breach occurred, or an identifier of a size or an extent of the security breach. An autonomous vehicle may transmit such signals or requests in any manner in response to determining that the alarm event is occurring at the location.

If the alarm event is determined to not be occurring at the location, e.g., to a sufficiently high level of confidence, then the process advances to box 865, where the indication of the alarm event is cleared from the sensor in the location. For example, the autonomous vehicle may transmit one or more signals to an external computer device or system, or to the sensor in the location directly, indicating that the alarm event is not occurring. Alternatively, or additionally, the autonomous vehicle may request that one or more maintenance or repair operations be performed on the sensor or within the location, in the event that the alarm event was identified in error, or may remain in the location for a period of time to monitor conditions there, such as to determine whether the alarm event is intermittently occurring in the location of the sensor.

At box 870, after requesting resources for responding to the alarm event at the location, or after the indication that the alarm event has cleared from the sensor in the location, the autonomous vehicle returns to the base station, and the process ends. The autonomous vehicle may remain within the location for any time or duration, or move to one or more other locations within the facility, and continue to monitor events or conditions within the location of the sensor or elsewhere, e.g., progress in addressing the alarm event, or take any other actions.

As is discussed above, one or more of the autonomous vehicles of the present disclosure may be configured to communicate with external computer devices or systems directly over a network, which may include the Internet in whole or in part, or via a base component, a charging dock or another intermediary device provided within or in association with a facility. Such systems may also be in communication with any sensors within the facility, any sources of wireless energy within the facility, or any portals within the facility.

Figure 9:
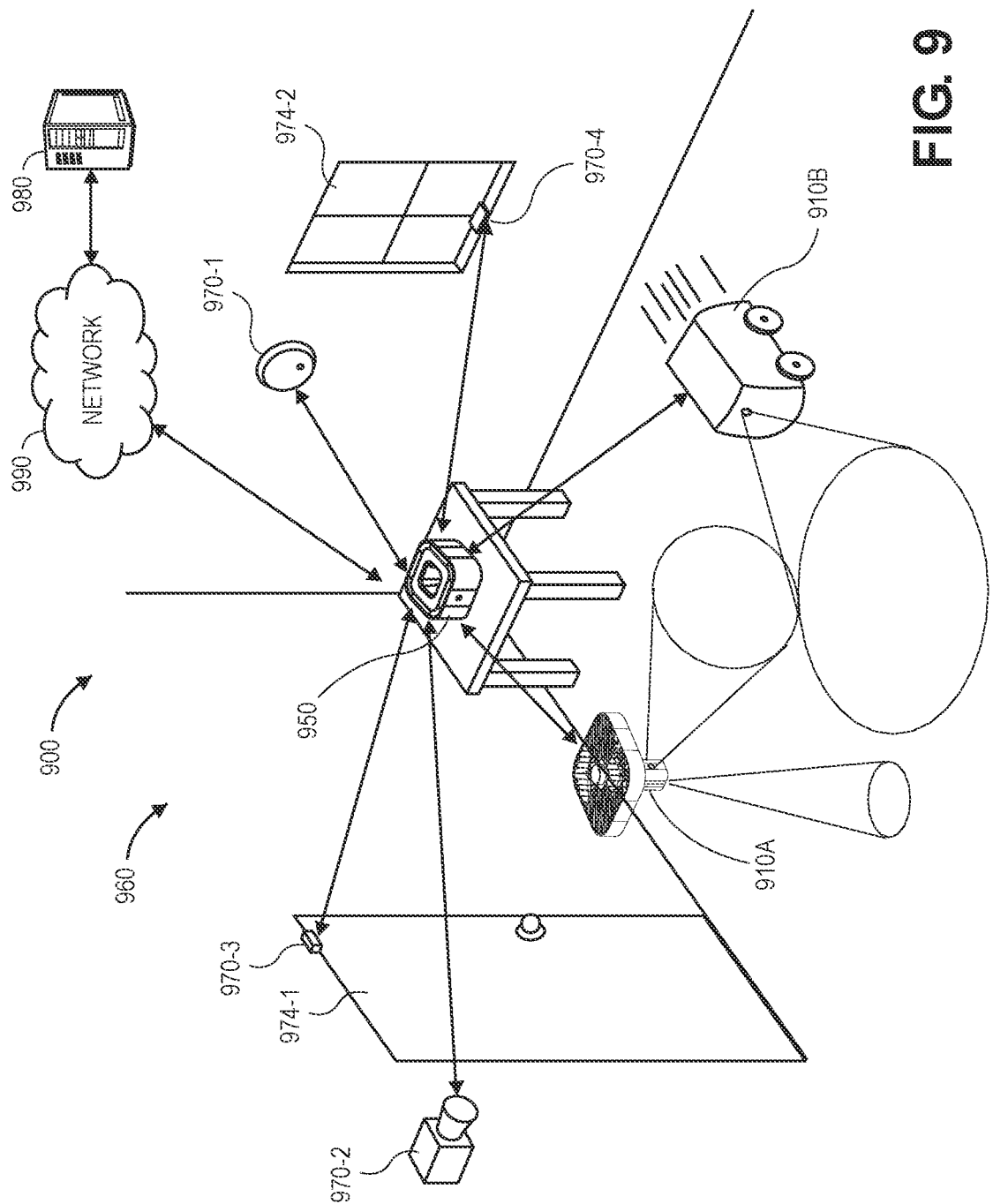
FIG. 9 is a view of aspects of one system including autonomous home security devices in accordance with embodiments of the present disclosure.

Referring to FIG. 9, views of aspects of one system 900 including autonomous home security devices in accordance with embodiments of the present disclosure are shown. Except where otherwise noted, reference numerals preceded by the number "9" shown in FIG. 9 indicate components or features that are similar to components or features having reference numerals preceded by the number "7" shown in FIGS. 7A and 7B, by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

As is shown in FIG. 9, the system 900 includes a pair of autonomous home security devices, viz., autonomous vehicles 910A, 910B, along with an intermediary device 950 within a facility 960, such as a home or other building or structure. The intermediary device 950 may be a base component, a charging dock or another device for providing power, communications or other services to one or both of the autonomous vehicles 910A, 910B. The intermediary device 950 includes an opening or other feature for receiving a portion of the aerial vehicle 910A (e.g., a fuselage), and is further configured to communicate with one or more external computer devices or systems 980 over a network 990, which may include the Internet in whole or in part.

The autonomous vehicle 910A is an aerial vehicle, or drone, outfitted with one or more sensors for capturing data within the facility 960. The autonomous vehicle 910B is an autonomous ground vehicle or robot that is also outfitted with one or more sensors for capturing data within the facility 960. For example, each of the autonomous vehicles 910A, 910B may include any number of digital cameras or other imaging devices, as well as any other types or forms of sensors, such as Wi-Fi or Bluetooth receivers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors.

As is also shown in FIG. 9, the facility 960 includes a plurality of other sensors, such as a smoke detector 970-1, a security camera 970-2 including portions of the facility 960 within a field of view, a door sensor 970-3 associated with a door 974-1, and a window sensor 970-4 associated with a window 974-2. Each of such sensors 970-1, 970-2, 970-3, 970-4 is in communication with the intermediary device 950, e.g., by one or more Wi-Fi, Bluetooth or other wireless protocols or standards. Alternatively, one of the sensors 970-1, 970-2, 970-3, 970-4 may be configured to communicate with one another, or with one or both of the autonomous vehicles 910A, 910B, directly.

Accordingly, the autonomous vehicles 910A, 910B may be configured to travel throughout the facility 960 either in response to one or more instructions received from the intermediary device 950 or from the computer device or system 980 by way of the intermediary device 950, or upon determining that one or more of the sensors 970-1, 970-2, 970-3, 970-4 has determined that an alarm event or condition is occurring within the facility 960. Alternatively, the autonomous vehicles 910A, 910B may be configured to travel throughout the facility 960 spontaneously, or at regularly scheduled or random times, in order to determine whether an alarm event or condition is occurring within the facility 960.

Figure 10:
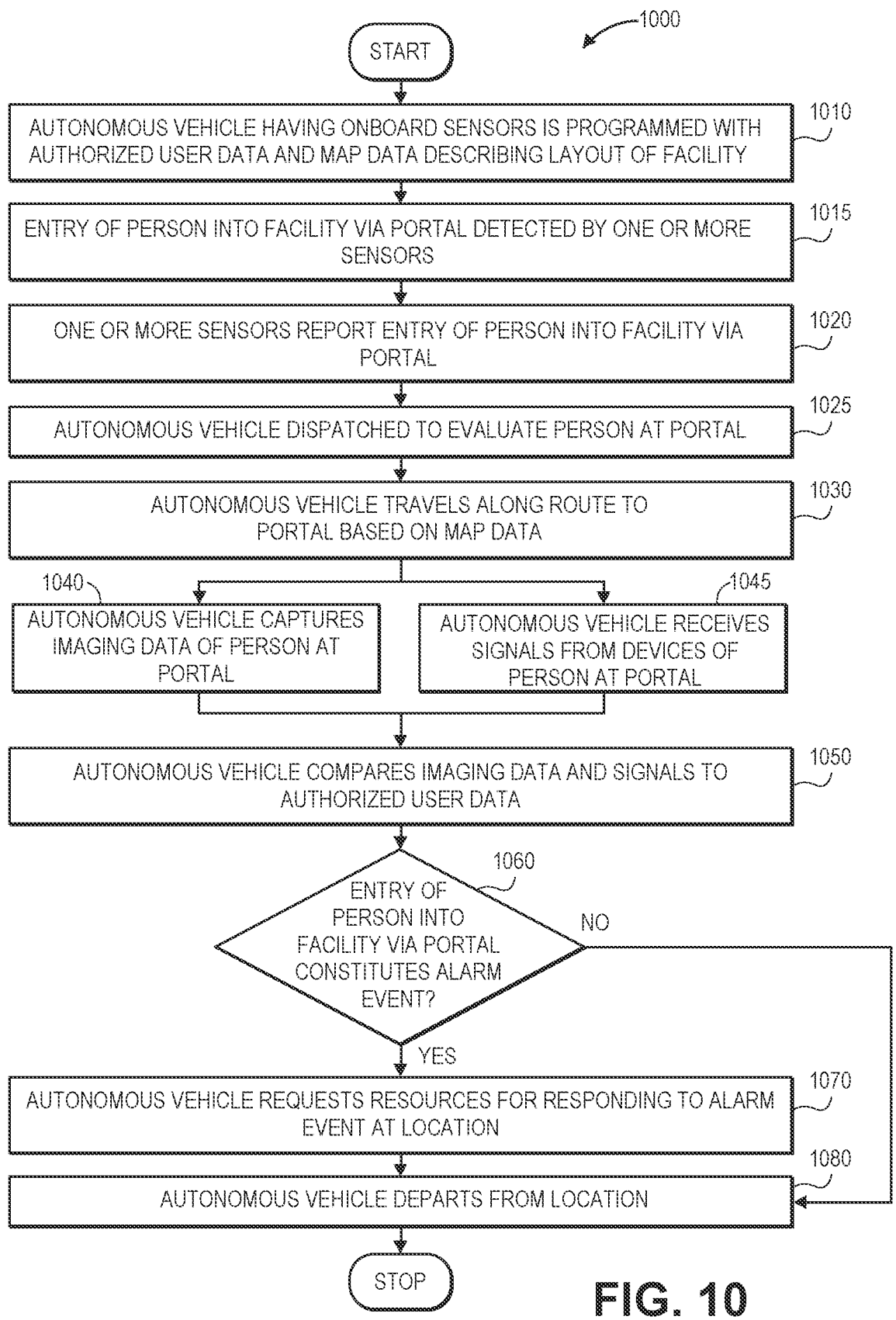
FIG. 10 is a flow chart of one process for using an autonomous home security device in accordance with embodiments of the present disclosure.

As is also discussed above, in accordance with embodiments of the present disclosure, an autonomous vehicle may be configured to determine whether any number of persons or machines entering a facility, e.g., a home, is authorized to do so, and take any number of actions in response to determining that one or more of such persons or machines is not. Referring to FIG. 10, a flow chart 1000 of one process for using an autonomous home security device in accordance with embodiments of the present disclosure is shown. At box 1010, an autonomous vehicle having one or more onboard sensors is programmed with map data describing a layout of a facility. The map data may, as is discussed above, contain identifiers of locations of boundaries or other aspects of the facility, including but not limited to walls, floors, ceilings, utility systems, components or other aspects of the facility. The authorized user data may include images of authorized users, as well as any other information or data regarding the authorized users, including heights, weights, genders, or other physical descriptions. The authorized user data may also include any information or data regarding devices that are known to be associated with authorized users, including mobile devices, wrist watches, car keys, key fobs, or any other devices.

At box 1015, an entry of a person into a facility via a portal is detected by one or more sensors. For example, such sensors may be associated with doors, windows or other portals or systems for accessing the facility, and may detect the entry by an opening or a closing of one or more of such portals or systems. Alternatively, the entry of the person may be detected based on data captured by one or more motion sensors, acoustic sensors, visual sensors (e.g., digital cameras), or in any other manner.

At box 1020, the one or more sensors report the entry of the person into the facility via the portal, e.g., by transmitting one or more signals or other information or data to one or more computer devices or systems over a network, such as to the autonomous vehicle (or to one or more other autonomous vehicles), to an intermediary device, or to a server or other computer device or system in any location. Alternatively, the sensor may emit one or more acoustic signals (e.g., sirens), visual signals (e.g., lights), or take any other actions to indicate that the entry via the portal has occurred. In some embodiments, where the one or more sensors are associated with a security system that is armed or otherwise fully operational, such signals may be associated with the occurrence of an alarm event. In some other embodiments, however, such as where the one or more sensors are associated with a security system that is not armed or is not operational, such signals may merely indicate that an entry has occurred.

At box 1025, the autonomous vehicle is dispatched to evaluate the person at the portal. For example, the autonomous vehicle may receive a request or instruction from the sensor directly, or from another computer device or system such as an intermediary device at the facility or a server at the facility or elsewhere. Alternatively, the autonomous vehicle may dispatch itself to the location of the sensor, e.g., upon detecting that the sensor in the location has reported the alarm event, such as by emitting one or more acoustic or visual signals. At box 1030, the autonomous vehicle travels along a route (e.g., along one or more courses, speeds or altitudes that are selected based on the map data) to the portal, or to a vicinity of the portal.

At box 1040, the autonomous vehicle captures imaging data regarding the person at the portal. For example, the imaging data may include visual imaging data (e.g., color, grayscale or black and white images of the person), depth imaging data (e.g., distances or ranges to the person), or any other imaging data. In parallel, at box 1045, the autonomous vehicle receives signals from one or more devices associated with the person. Such devices may include, but are not limited to, mobile devices (e.g., laptop computers, tablet computers, smartphones or others), wrist watches, media players, gaming systems, headphones or earphones, or any other like systems that may emit wireless energy of any type or form, including but not limited to Wi-Fi signals, Bluetooth signals, or any other type or form of signals according to any protocol or standard.

At box 1050, the autonomous vehicle compares the imaging data captured at box 1040 and the signals captured at box 1045 to the authorized user data. For example, the autonomous vehicle may be configured to determine whether the imaging data depicts one or more faces or other aspects of the person, and whether such faces or other aspects are consistent with the authorized user data, e.g., whether such faces or other aspects correspond to one or more users who are authorized to enter the facility, either via the portal or by any other portal. In some embodiments, based on the imaging data, the signals, or any other information or data captured by the autonomous vehicle (e.g., words spoken or sounds emitted by the person), as well as any other intrinsic or extrinsic information or data such as a time or date of the entry, identities of any other persons who entered the facility via the portal at the time of the entry, a confidence score may be calculated for the entry. The confidence score may indicate a probability or likelihood that the person is (or is not) one of the authorized users of the portal, or that the entry is authorized (or unauthorized).

At box 1060, whether the entry of the person into the facility via the portal constitutes an alarm event is determined. For example, where the person is not listed or identified among one or more authorized users, the entry of the person may be deemed an alarm event. Even if the person is listed or identified among the one or more authorized users, however, the entry of the person may still be deemed an alarm event, such as where the user is not authorized to enter the facility via the portal (or is required or expected to enter the facility via another portal), or where entries via the portal were not authorized at the time that the person entered the facility via the portal at box 1015, e.g., where the portal is required to be closed or locked at such times.

If the entry of the person into the facility via the portal is determined to constitute an alarm event, then the process advances to box 1070, where the autonomous vehicle requests resources for responding to the alarm event, such as by transmitting one or more signals or requests for security personnel or other public or private authorities. The request for resources may include any information that may be determined regarding the person, including one or more images of the person, as well as a name of the person, or any dimensions or other identifying features of the person, if such identifying features are known. After the autonomous vehicle has requested the resources for responding to the alarm event, or after the autonomous vehicle has determined that the entry of the person into the facility via the portal does not constitute an alarm event, the process advances to box 1080, where the autonomous vehicle departs from the location, e.g., to return to a base station or to travel to another location, and the process ends. The autonomous vehicle may remain within a vicinity of the portal for any duration or period, and may continue to capture data or take any other actions for any purpose.

As is discussed above, one or more of the autonomous vehicles of the present disclosure may be configured to determine whether an individual who has entered a facility is authorized to do so. Referring to FIGS. 11A through 11D, views of aspects of one system including an autonomous home security device (e.g., an autonomous vehicle 1110) in accordance with embodiments of the present disclosure are shown. Except where otherwise noted, reference numerals preceded by the number "11" shown in FIGS. 11A through 11D indicate components or features that are similar to components or features having reference numerals preceded by the number "9" shown in FIG. 9, by the number "7" shown in FIGS. 7A and 7B, by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

Figure 11A:
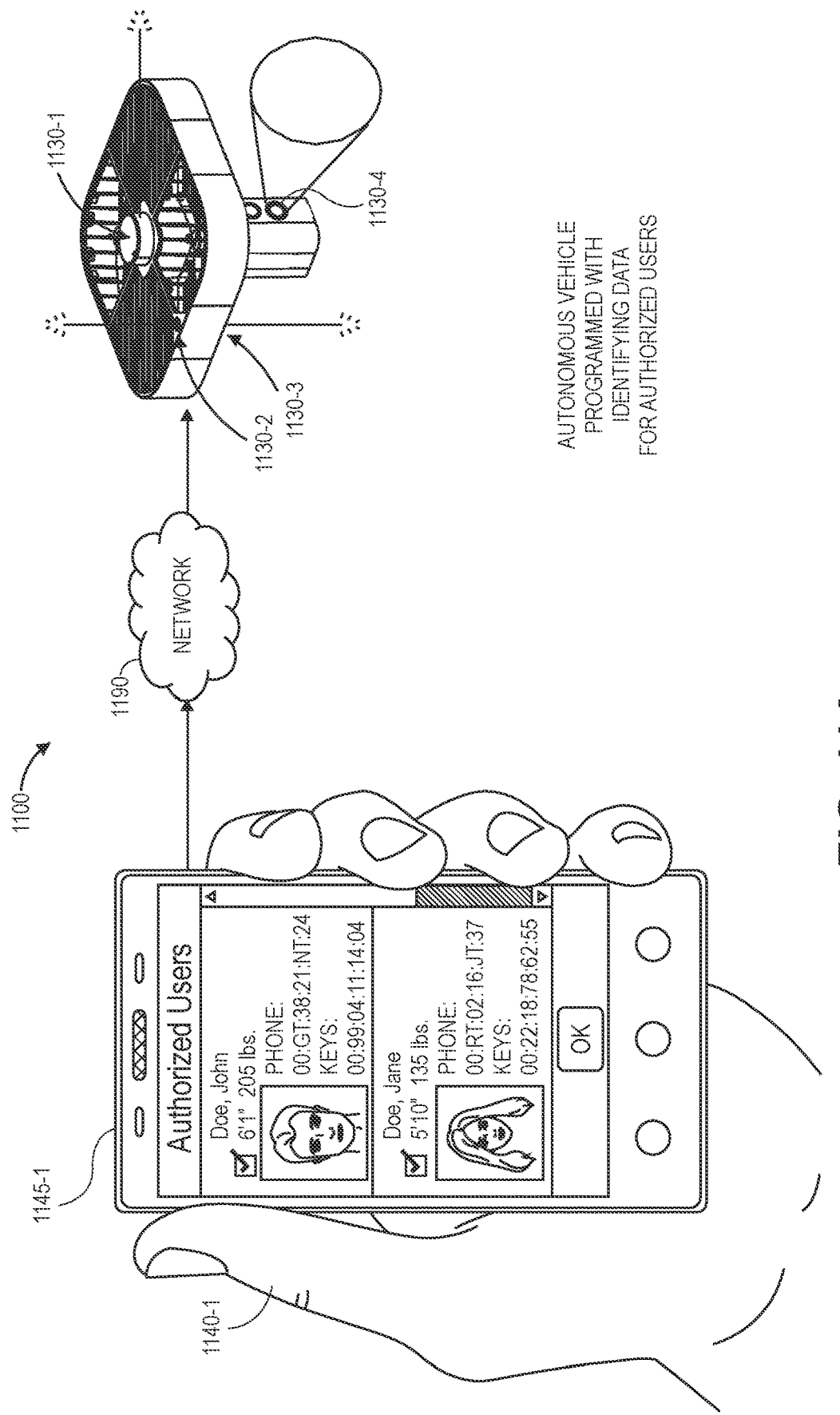
FIGS. 11A through 11D are views of aspects of one system including an autonomous home security device in accordance with embodiments of the present disclosure.

As is shown in FIG. 11A, the system 1100 includes the autonomous vehicle 1110 and a computer device 1145-1 (e.g., a mobile device) that are connected to one another over a network 1190, which may include the Internet in whole or in part. The autonomous vehicle 1110 is an aerial vehicle having a plurality of time-of-flight sensors 1130-1, 1130-2, 1130-3 configured to transmit light in fixed or variable axes or directions, to receive reflections of the light, and interpret the reflections of the light to determine distances or ranges to one or more surfaces of objects from which the light was reflected. The autonomous vehicle 1110 further includes one or more visual cameras 1130-4 for capturing visual images of any type or form.

The computer device 1145-1 may be a tablet computer, a smartphone, or any other mobile computer device that may be interacted with by one or more personnel. Alternatively, any other type or form of computer device, mobile or otherwise, may be utilized in accordance with embodiments of the present disclosure. The computer device 1145-1 includes one or more data stores that may store information or data regarding a plurality of users that are authorized to access a facility thereon, including names and images of such users, dimensions or other physical attributes of such users (e.g., heights and weights), and identifiers of mobile devices or other systems (e.g., media access control, or "MAC," addresses) typically operated by the users. The computer device 1145-1 further includes a touchscreen or any number of other I/O devices for displaying information or data, or receiving interactions from personnel.

As is further shown in FIG. 11A, the autonomous vehicle 1110 may be programmed with information or data regarding the plurality of authorized users, e.g., via one or more interactions by a person 1140-1 with the computer device 1145-1, which transfers information or data regarding authorized users to the autonomous vehicle 1110 via the network 1190 in response to such interactions. Alternatively, or additionally, the autonomous vehicle 1110 may be programmed with one or more time or date restrictions regarding access, such as to temporarily grant access to the facility 1160 to one or more persons via a door 1174, or to temporarily block access to the facility 1160 to all persons via the door 1174, or take any other action.

Figure 11B:
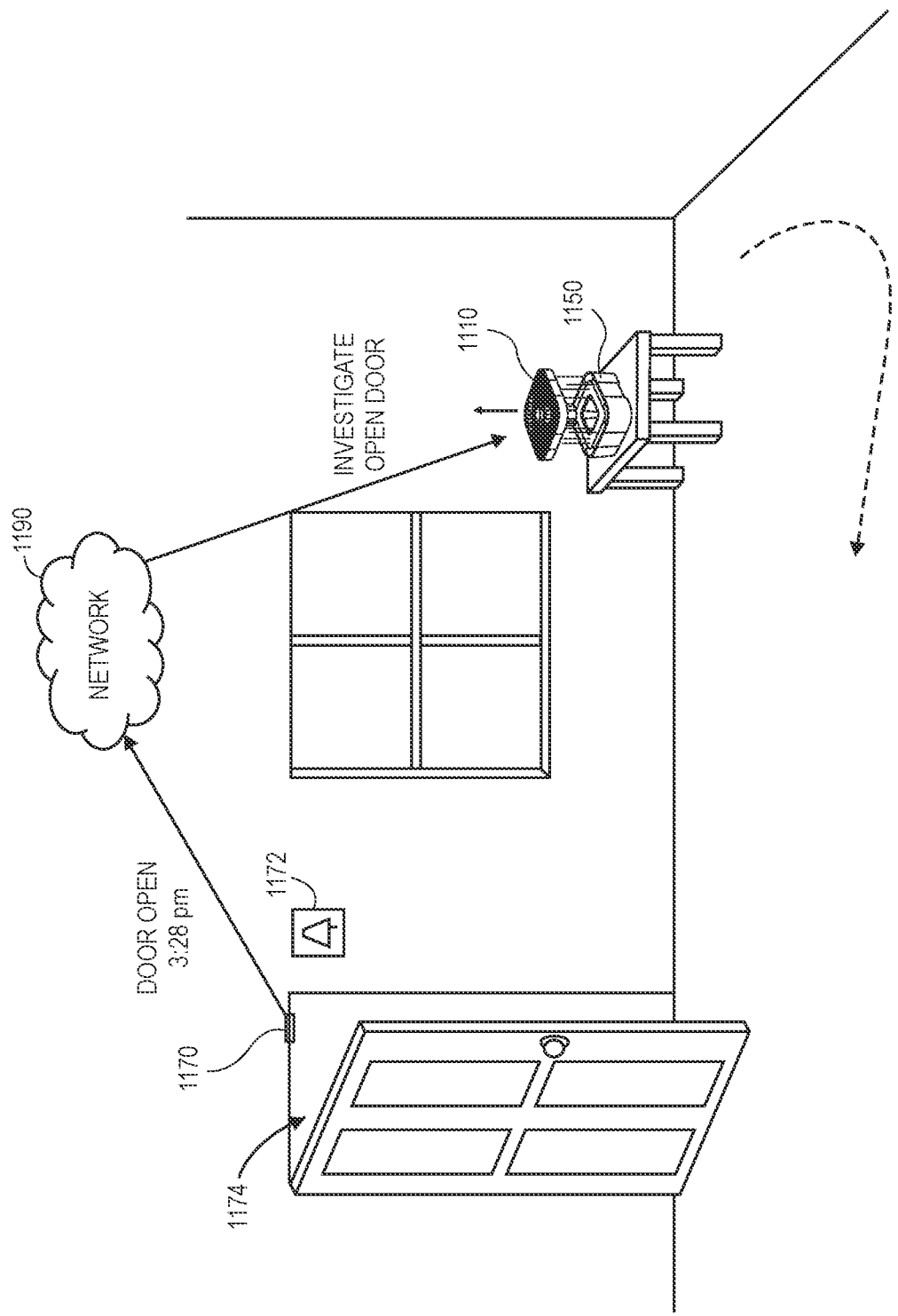

As is shown in FIG. 11B, upon detecting an opening of the door (or another portal) 1174 to a facility 1160, a sensor 1170 provided on the door 1174 or other portal transmits a signal to the autonomous vehicle 1110 via the network 1190, identifying the door 1174 that was opened and a time at which the door 1174 was opened. For example, the door sensor 1170 may include one or more Wi-Fi or Bluetooth transceivers and may, upon determining that the door 1174 has been opened, transmit one or more signals to the autonomous vehicle 1110 that identify the door 1174 and indicate a time at which the door 1174 was opened. As is also shown in FIG. 11n, upon receiving the signals from the door sensor 1170, the autonomous vehicle 1110 takes off and begins traveling to a vicinity of the door 1174, e.g., from an intermediary device 1150, e.g., a base component, a charging dock, or any other intermediary device.

Figure 11C:
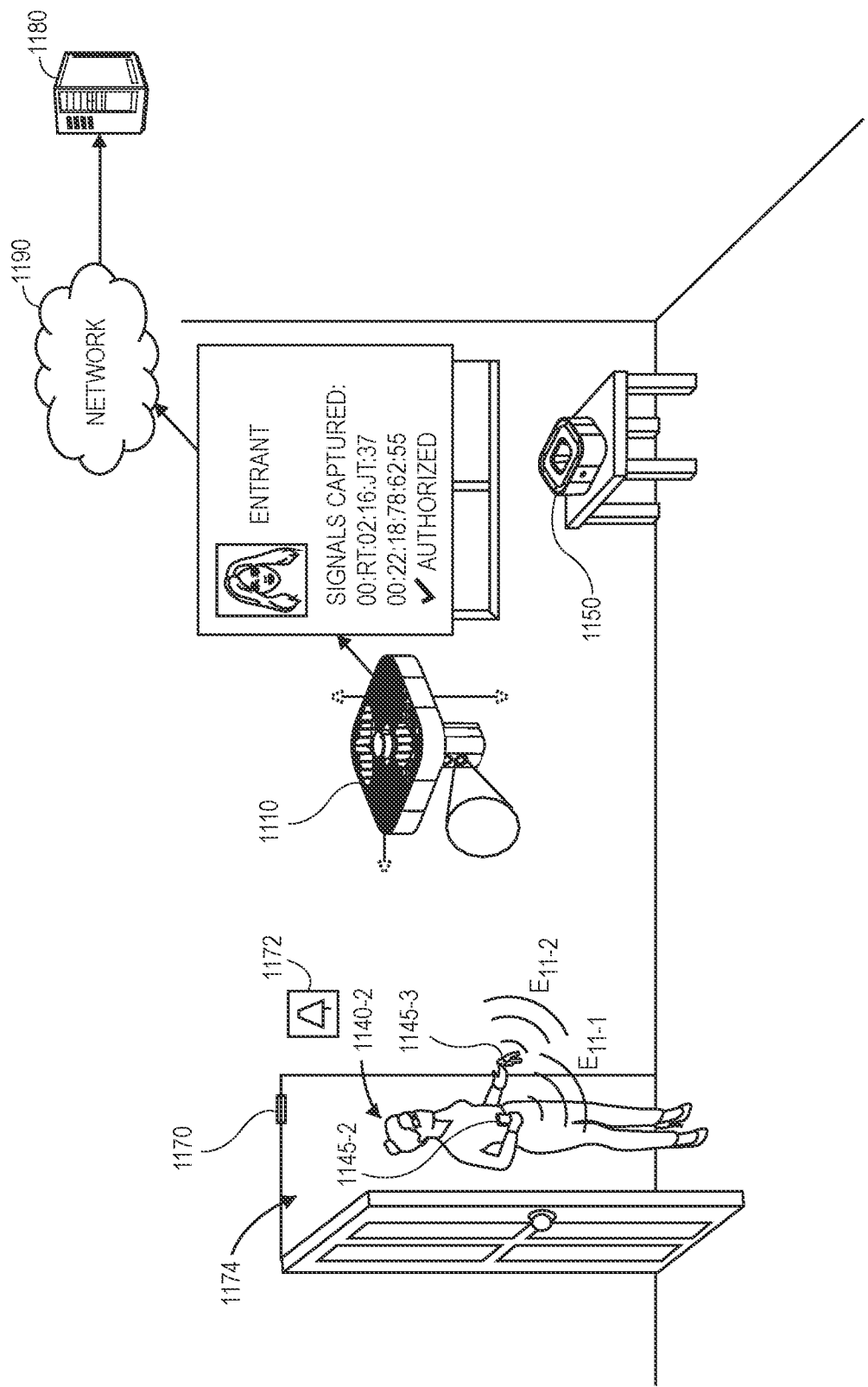

As is shown in FIG. 11C, upon arriving at the door 1174, the autonomous vehicle 1110 captures one or more images of a person 1140-2 that entered the facility 1160 via the door 1174 using one or more visual cameras 1130-4. In some embodiments, one or more wireless sensors provided aboard the autonomous vehicle 1110 may also monitor for wireless energy emitted by personal devices 1145-2, 1145-3 (e.g., a set of car keys and a mobile device) of the person 1140-2. After capturing and interpreting the images of the person 1140-2 and wireless energy $E_{11-1}$, $E_{11-2}$ emitted by the personal devices 1145-2, 1145-3, the autonomous vehicle 1110 compares the images and the wireless energy $E_{11-1}$, $E_{11-2}$ to the information or data regarding the plurality of authorized users received from the computer device 1145-1 as shown in FIG. 11A. To the extent that the images of the person 1140-2 captured by the autonomous vehicle 1110 are consistent with images of the person 1140-2 that were programmed into the autonomous vehicle 1110, the person 1140-2 may be identified as one of the users who is authorized to access the facility 1160 via the door 1174. Similarly, to the extent that the wireless energy $E_{11-1}$, $E_{11-2}$ emitted by the personal devices 1145-2, 1145-3 (e.g., MAC addresses of the personal devices 1145-2, 1145-3) is consistent with the identifiers of the wireless energy $E_{11-1}$, $E_{11-2}$ that were programmed into the autonomous vehicle 1110, the person 1140-2 may be identified as one of the users who is authorized to access the facility 1160 via the door 1174.

Upon determining that the person 1140-2 is authorized to access the facility 1160 via the door 1174, e.g., to a sufficiently high level of confidence, the autonomous vehicle 1110 transmits one or more messages or reports to an external computer device or system 1180 or, alternatively, to the mobile device 1145-1, over the network 1190, indicating that the entry of the person 1140-2 into the facility 1160 is authorized.

Figure 11D:
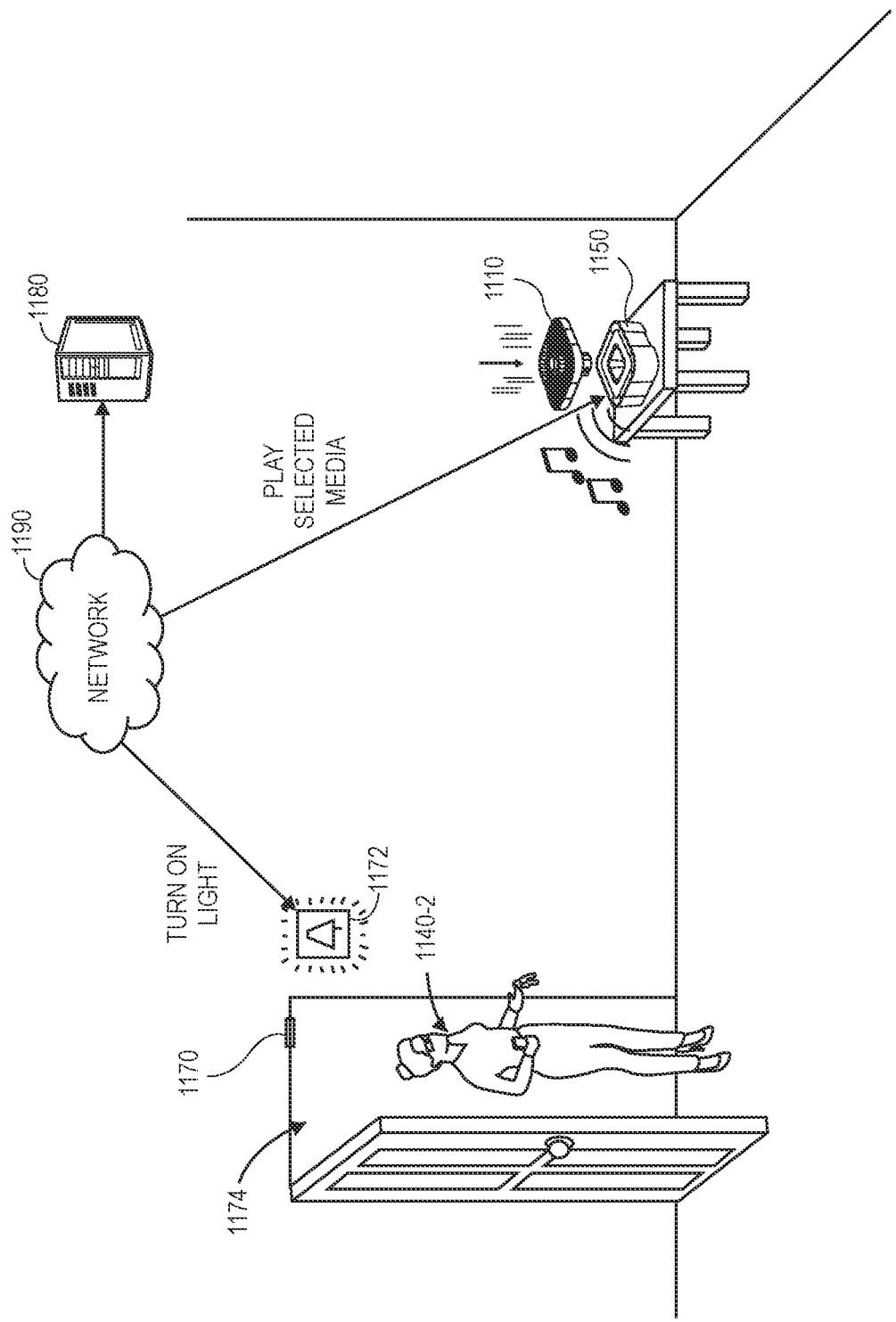

Additionally, as is shown in FIG. 11D, upon receiving an indication that the person 1140-2 is authorized to access the facility 1160 via the door 1174, the external computer device or system 1180 may automatically cause the intermediary device 1150 to play one or more media files, or activate a light 1172 or other environmental system within the facility 1160. The autonomous vehicle 1110 may return to the intermediary device 1150 or proceed to another location. Alternatively, or additionally, any set of actions or steps designated by the person 1140-1 or any other personnel may be undertaken upon determining that the person 1140-2 is, or is not, authorized to enter the facility 1160 via the door 1174.

Figure 12A:
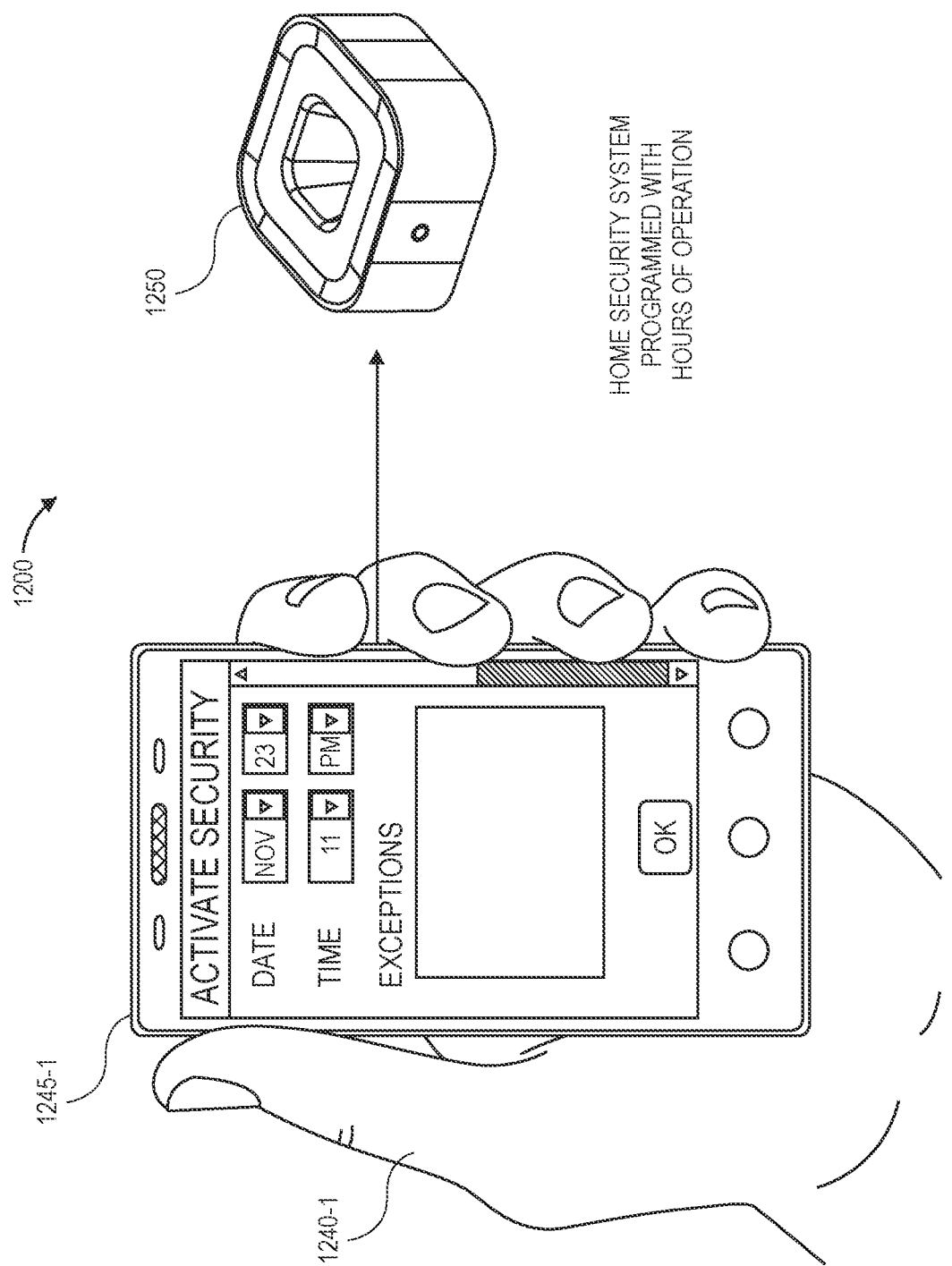
Figure 12C:
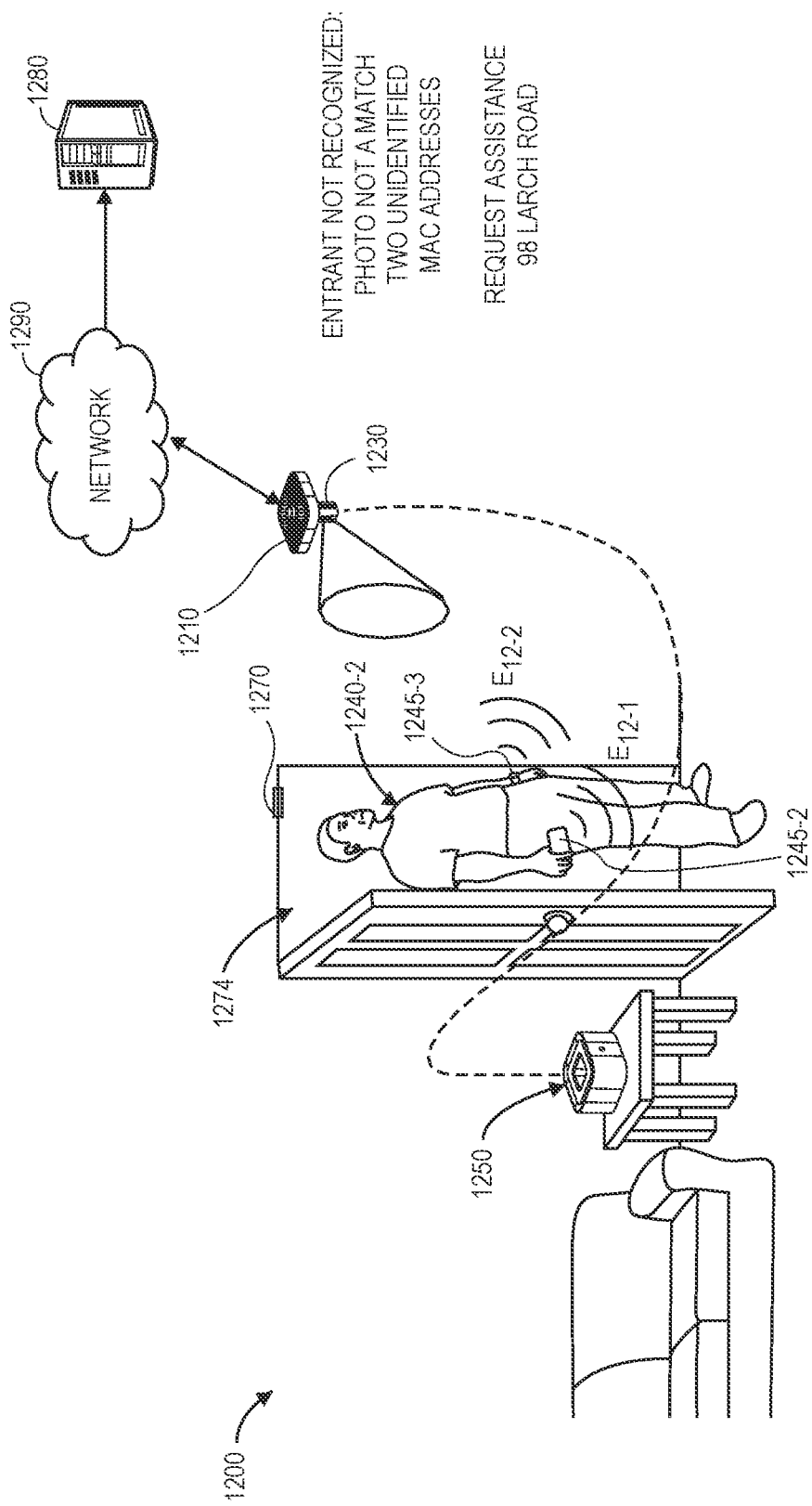

Referring to FIGS. 12A through 12C, views of aspects of one system including an autonomous home security device (e.g., an aerial vehicle 1210) in accordance with embodiments of the present disclosure are shown. Except where otherwise noted, reference numerals preceded by the number "12" shown in FIGS. 12A through 12C indicate components or features that are similar to components or features having reference numerals preceded by the number "11" shown in FIGS. 11A through 11D, by the number "9" shown in FIG. 9, by the number "7" shown in FIGS. 7A and 7B, by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

As is shown in FIG. 12A, a person 1240-1 operating a mobile device 1245-1 may activate a security system, or place one or more sets of restrictions on access to a facility, via an intermediary device 1250. For example, as is shown in FIG. 12A, the person 1240-1 may specify one or more times or dates by which access to the facility may be granted or restricted. Alternatively, the mobile device 1245-1 may be configured to program the intermediary device 1250 with any other restrictions or exceptions regarding times, dates or persons who may access the facility.

As is shown in FIG. 12B, upon detecting an opening of a door (or another portal) 1274 to a facility 1260, a sensor 1270 provided on the door 1274 or other portal transmits a signal to the intermediary device 1250, identifying the door 1274 that was opened and a time at which the door 1274 was opened. The intermediary device 1250 further transmits one or more signals to the aerial vehicle 1210, e.g., a drone, having one or more digital cameras 1230 and one or more wireless sensors (e.g., a Wi-Fi sensor or receiver, or a Bluetooth sensor or receiver). The aerial vehicle 1210 and/or the intermediary device 1250 may include one or more memory components or data stores having information or data regarding a plurality of users that are authorized to access the facility 1260, including names and images of such users, dimensions or other physical attributes of such users (e.g., heights and weights), and identifiers of mobile devices or other systems (e.g., MAC addresses) typically operated by such users. Upon receiving the one or more signals from the intermediary device 1250, the aerial vehicle 1210 begins to take off and proceed toward a vicinity of the door 1274.

As is shown in FIG. 12C, upon arriving at the door 1274, the aerial vehicle 1210 captures one or more images of a person 1240-2 that entered the facility 1260 via the door 1274 using the one or more digital cameras 1230. As is also shown in FIG. 12C, one or more wireless sensors provided aboard the aerial vehicle 1210 also monitor for wireless energy $E_{12-1}$, $E_{12-2}$ emitted by personal devices 1245-2, 1245-3 (e.g., a mobile device and a wristwatch) of the person 1240-2. The wireless energy $E_{12-1}$, $E_{12-2}$ may take any form, and may include any content, including but not limited to one or more identifiers of the personal devices 1245-2, 1245-3. After capturing and interpreting the images of the person 1240-2, and the wireless energy $E_{12-1}$, $E_{12-2}$ emitted by the personal devices 1245-2, 1245-3, the aerial vehicle 1210 compares the images and the wireless energy $E_{12-1}$, $E_{12-2}$ to information or data regarding the plurality of authorized users that is stored in one or more onboard memory components or data stores. Alternatively, or additionally, the aerial vehicle 1210 may transmit the images and/or the identifiers of the personal devices 1245-2, 1245-3 to the intermediary device 1250 (or any other computer device or system), which may be programmed or otherwise configured to compare the images and the identifiers of the personal devices 1245-2, 1245-3 to the information or data regarding the plurality of authorized users that is stored in one or more onboard memory components or data stores of the intermediary device 1250 or elsewhere.

To the extent that the images of the person 1240-2 captured by the aerial vehicle 1210 do not match any images that are available to the aerial vehicle 1210, the person 1240-2 may be identified as one who is not authorized to access the facility 1260 via the door 1274. Similarly, to the extent that the wireless energy $E_{12\text{-}1}$, $E_{12\text{-}2}$ emitted by the personal devices 1245-2, 1245-3 (e.g., MAC addresses of the personal devices 1245-2, 1245-3) is inconsistent with the identifiers of the wireless energy that is available to the aerial vehicle 1210, the person 1240-2 may be identified as one who is not authorized to access the facility 1260 via the door 1274.

Upon determining that the person 1240-2 is not authorized to access the facility 1260 via the door 1274, the aerial vehicle 1210 transmits one or more messages or reports to a computer device or system 1280 over the network 1290, indicating that the entry of the person 1240-2 into the facility 1260 is unauthorized, and requesting additional assistance (e.g., one or more public or private authorities) at a location of the facility 1260.

Those of ordinary skill in the pertinent arts will recognize that one or more of the systems or methods disclosed herein, such as the process embodied in the flow chart 1000 of FIG. 10, or the systems shown in FIGS. 11A through 11D or FIG. 12A through 12C, may also be utilized to determine whether a non-human animal, or a machine, that has entered a facility is authorized to do so, or to take any actions in response to determining that the non-human animal or the machine is not authorized to do so.

Figure 13A:
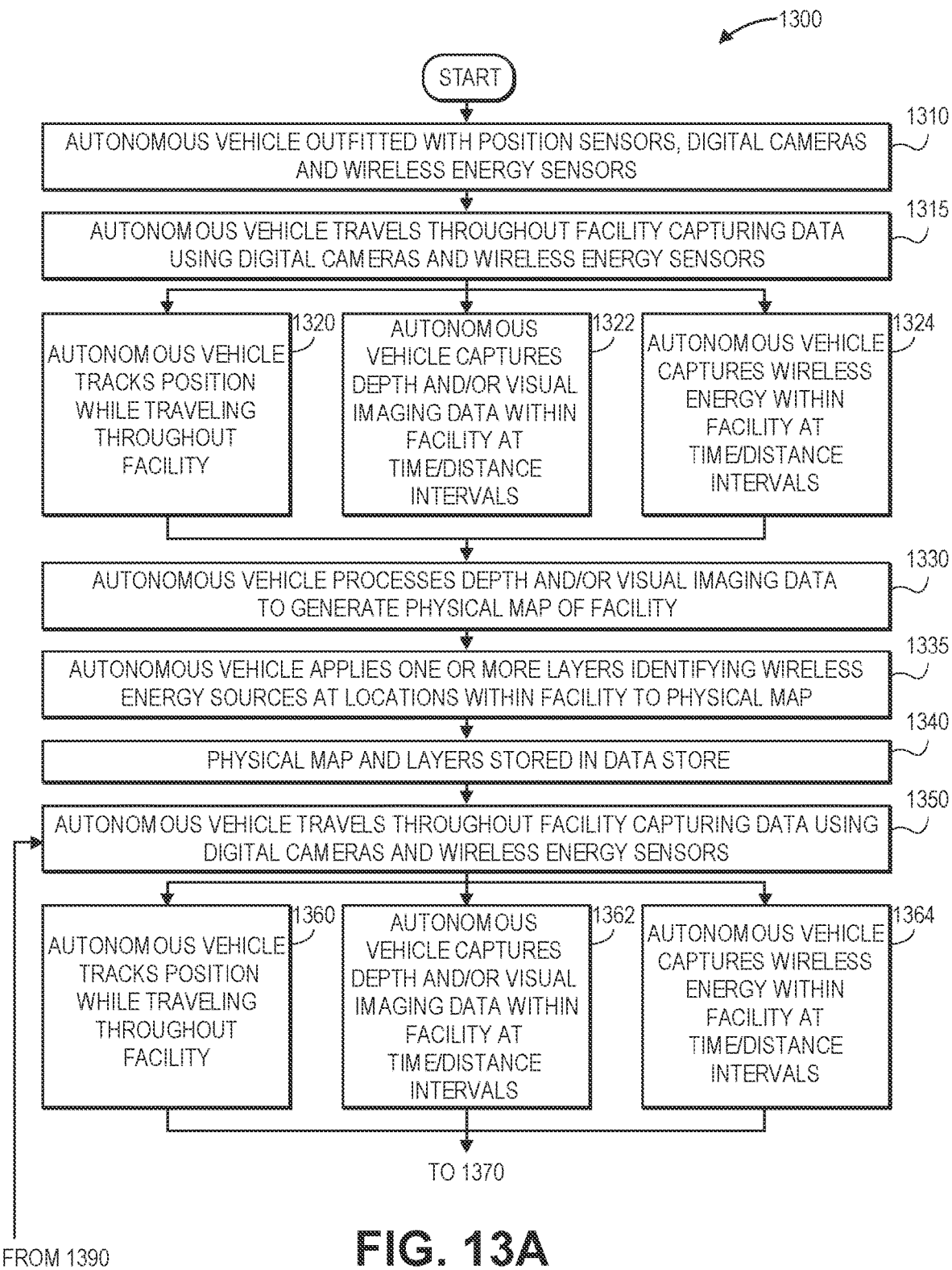
FIGS. 13A and 13B are a flow chart of one process for using an autonomous home security device in accordance with embodiments of the present disclosure.
Figure 13B:
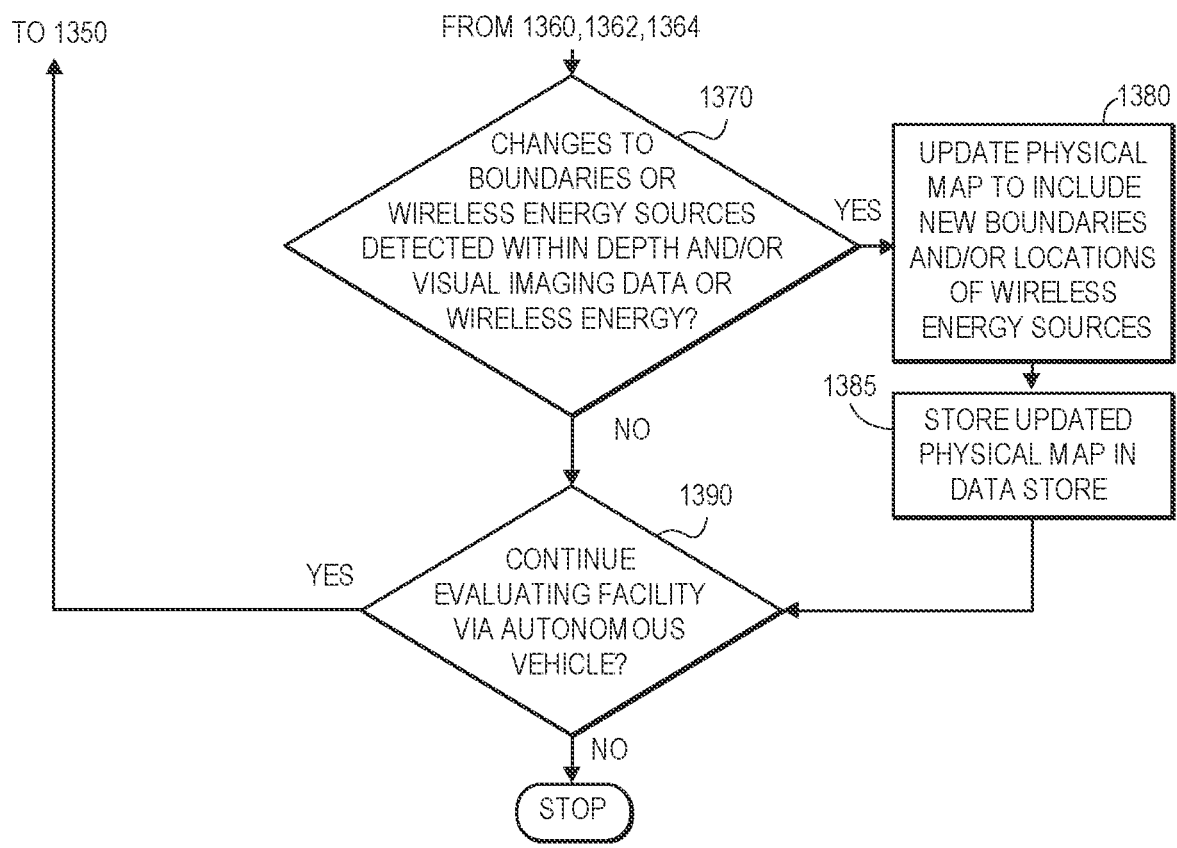

As is further discussed above, autonomous vehicles may be programmed or configured to generate physical maps of one or more spaces within a facility, and such maps may include one or more layers or other sets of data identifying locations of systems or other aspects of the facility within such maps. Referring to FIGS. 13A and 13B, a flow chart 1300 of one process for using an autonomous home security device in accordance with embodiments of the present disclosure is shown. At box 1310, an autonomous vehicle is outfitted with position sensors, digital cameras and any other wireless sensors. The position sensors may include one or more GPS transceivers, as well as any other type or form of position sensing equipment, including but not limited to Wi-Fi receivers in communication with one or more wireless access points, Bluetooth Low Energy or UWB sensors in communication with one or more beacons, RFID tags or receivers, or other sensors that may be used to determine positions of the autonomous vehicle within any indoor or outdoor spaces of the facility.

At box 1315, the autonomous vehicle travels throughout a facility capturing data using the digital cameras and the wireless energy sensors. For example, the autonomous vehicle may travel throughout spaces of the facility in regular or irregular patterns, such as along one or more paths that are parallel to walls, ceilings and/or floors. The autonomous vehicle may travel within such spaces on courses or at speeds or altitudes that are selected on any basis, including the dimensions of such spaces, any activities occurring within such spaces, or the types or forms of the wireless energy sensors, or any other factors. Alternatively, in some embodiments, the autonomous vehicle may be transported (e.g., carried) or escorted by a human actor throughout such spaces as the data is captured. For example, as the autonomous vehicle is transported or escorted throughout a space, the autonomous vehicle may operate one or more propulsion motors or other systems to maintain altitude or tilt control.

At box 1320, the autonomous vehicle tracks its position while traveling through the facility. In parallel, at box 1322, the autonomous vehicle captures depth and/or visual imaging data within the facility at various time or distance intervals, and at box 1324, the autonomous vehicle captures wireless energy transmitted by one or more sources within the facility at the various time or distance intervals. For example, as the autonomous vehicle tracks its position throughout the facility, the autonomous vehicle may capture depth and/or visual images in any direction with respect to a direction of travel of the autonomous vehicle, such as by digital cameras having fields of view aligned forward or aft of the autonomous vehicle, above or below the autonomous vehicle, or to port or to starboard sides of the autonomous vehicle. Concurrently, the autonomous vehicle may capture wireless energy such as Wi-Fi or Bluetooth emissions, RFID signals, or any other wireless energy. Alternatively, the autonomous vehicle may also capture acoustic data or other energy within such spaces.

At box 1330, the autonomous vehicle processes the depth and/or visual imaging data captured from within the facility at box 1322 in order to generate a physical map of the facility. For example, the depth imaging data may include ranges to one or more objects within fields of view of a depth sensor or range camera, which may be fixed or may rotate with respect to an orientation of the autonomous vehicle, and boundaries or other features within the space may be identified based on such ranges. The visual imaging data may likewise be processed to identify or detect one or more boundaries or other features, e.g., based on one or more edges, contours, outlines, colors, textures, silhouettes, shapes or other characteristics of objects depicted within such images. The depth imaging data and/or the visual imaging data may be processed independently or in concert with one another to generate the physical map.

At box 1335, the autonomous vehicle determines locations of sources of the wireless energy captured at box 1324, and applies one or more layers to the physical map generated at box 1330 that identifies the sources at such locations. Types or categories of the wireless energy may be determined, and sources of the wireless energy may be classified or identified based on such types or categories. Additionally, locations of the sources of the wireless energy may be estimated based on the strengths of the wireless energy at various positions of the autonomous vehicle.

Furthermore, by classifying and identifying the sources of the wireless energy, one or more corresponding aspects of the facility may be identified accordingly. For example, where wireless energy emitted at frequencies that are normally associated with door sensors is detected, e.g., frequencies of approximately 319.5 MHz, 345 MHz, 433 MHz or 915 MHz, the source of the wireless energy may be presumed to be a door sensor. Moreover, by tracking strengths of the wireless energy with respect to positions of the autonomous vehicle, a location of the door sensor and, accordingly, a door, may be estimated or determined. Similarly, where wireless energy at frequencies that are normally associated with Wi-Fi sources, audio speakers, cellular telephones, or other devices or systems is detected, such wireless energy may be indicative of the presence of a wireless router, an audio speaker or television, or a cell phone or charging dock, respectively. Aspects of the wireless energy other than strengths or frequencies, such as pulse intervals, amplitudes or frequencies, may also be determined and used to classify a source of the wireless energy or identify a location of the source.

Moreover, the wireless energy that may be identified and classified in accordance with the present disclosure is not limited to communications signals. For example, where magnetic fields are detected at various locations within such spaces, the magnetic fields may in some applications be determined to be associated with a current-carrying conductor, such as a power cord or power supply associated with an electrical appliance or system. Moreover, the strength of the magnetic field may also be calculated and used to estimate or otherwise determine a location of the current-carrying conductor.

At box 1340, the physical map and the one or more layers is stored in one or more data stores, which may be provided at the location or in one or more alternate or virtual locations, such as in a "cloud"-based environment. In some embodiments, the physical map may be stored in a data store or memory component associated with the autonomous vehicle, or a data store or memory component associated with an intermediary device in communication with the autonomous vehicle. In some embodiments, the physical map may be stored in association with an electronic marketplace or other source for information or data regarding one or more consumer goods.

As is discussed above, processes by which a physical map or one or more layers thereof are generated may be repeated at later times, in order to confirm that the physical map or the various layers remain accurate and relevant. At box 1350, the autonomous vehicle again travels throughout the facility capturing data using the digital cameras and the wireless energy sensors, e.g., at a later time, which may be in accordance with a regular interval or at random times. In some embodiments, the autonomous vehicle may follow the same paths or routes that the autonomous vehicle followed at box 1315. In some other embodiments, the autonomous vehicle may follow one or more other paths or routes. Additionally, in still other embodiments, the autonomous vehicle that traveled throughout the facility and captured data at box 1315 may be different from the autonomous vehicle that traveled throughout the facility and captured data at box 1350.

At box 1360, the autonomous vehicle tracks its position while traveling through the facility. In parallel, at box 1362, the autonomous vehicle captures depth and/or visual imaging data within the facility at various time or distance intervals, and at box 1364, the autonomous vehicle captures wireless energy transmitted by one or more sources within the facility at the various time or distance intervals.

At box 1370, whether any changes to the boundaries of the facility or the wireless energy sources are detected within the depth and/or visual imaging data captured at box 1362 or the wireless energy captured at box 1364 is determined. If any changes to the boundaries of the facility or the wireless energy sources are detected, then the process advances to box 1380, where the physical map is updated to include the new boundaries and/or locations of the wireless energy sources, and to box 1385, where the updated physical map is stored in one or more data stores. Alternatively, or additionally, the updated physical map may further include additional information or data regarding the wireless energy sources, such as types or strengths of the wireless energy, or any other information or data.

If no changes to the boundaries of the facility or the wireless energy sources have been detected, or after an updated physical map including new boundaries and/or locations of the wireless energy sources has been stored in the one or more data stores, then the process advances to box 1390, where whether the continued evaluation of the facility by the autonomous vehicles is desired is determined. If the continued evaluation of the facility by the autonomous vehicle is desired, then the process returns to box 1350, where the autonomous vehicle travels throughout the facility capturing data using digital cameras and wireless energy sources. If the continued evaluation of the facility by the autonomous vehicle is no longer desired, then the process ends.

In some embodiments, determining whether a physical map or any layers thereof remains accurate or relevant, such as in accordance with boxes 1350, 1360, 1362, 1364, 1370, 1380, 1385 or 1390 described above with regard to FIGS. 13A and 13B, may be triggered or initiated by one or more sensors themselves. For example, where a sensor indicates a new location, or otherwise that the sensor has been moved, an autonomous vehicle may be programmed or configured to travel throughout the facility and to capture data in order to determine whether the physical map or any of the layers requires changing.

As is discussed above, an autonomous vehicle may be programmed or configured to capture images or other data while traveling throughout one or more spaces of a facility, and to generate a physical map of the facility that includes one or more layers identifying locations of utilities, portals, systems, appliances, fixtures or other aspects of the facility within such spaces.

Referring to FIGS. 14A through 14H, views of aspects of one system 1400 including an autonomous home security device (e.g., an autonomous vehicle 1410) in accordance with embodiments of the present disclosure are shown. Except where otherwise noted, reference numerals preceded by the number "14" shown in FIGS. 14A through 14H indicate components or features that are similar to components or features having reference numerals preceded by the number "12" shown in FIGS. 12A through 12C, by the number "11" shown in FIGS. 11A through 11D, by the number "9" shown in FIG. 9, by the number "7" shown in FIGS. 7A and 7B, by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

Figure 14A:
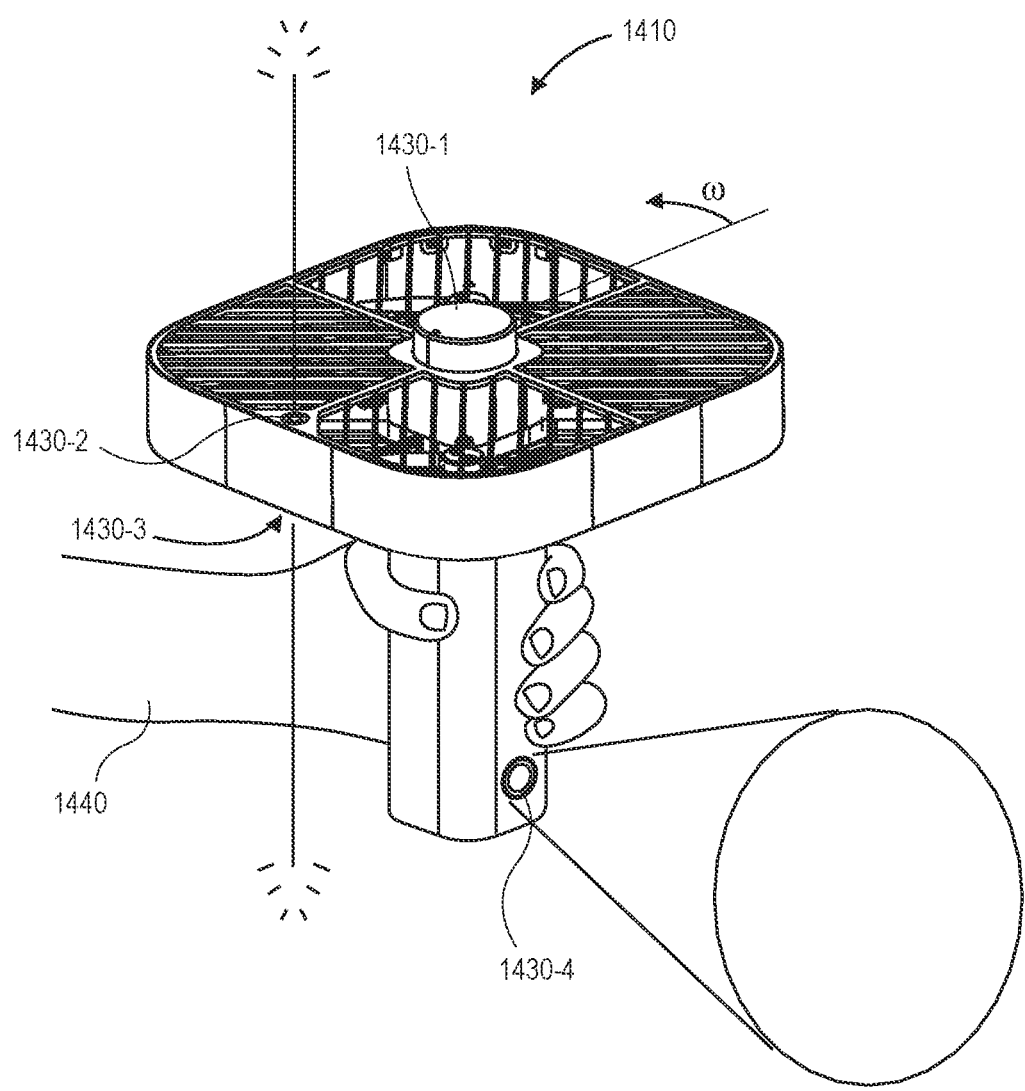
FIGS. 14A through 14H are views of aspects of one system including an autonomous home security device in accordance with embodiments of the present disclosure.

As is shown in FIG. 14A, the autonomous vehicle 1410 (e.g., an aerial vehicle, or drone) is outfitted with a plurality of sensors 1430-1, 1430-2, 1430-3, 1430-4, and is held within a hand of a human actor 1440. For example, as is shown in FIG. 14A, the autonomous vehicle 1410 includes a plurality of time-of-flight sensors 1430-1, 1430-2, 1430-3 configured to determine ranges to objects above, below and around the autonomous vehicle 1410. The time-of-flight sensor 1430-1 is configured to rotate about a yaw axis (or vertical axis) of the autonomous vehicle 1410 at an angular velocity ω, and to capture depth images, range profiles or other sets of distances around the autonomous vehicle 1410, while the time-of-flight sensors 1430-2, 1430-3 are configured to determine depth images, range profiles or other sets of distances above or below the autonomous vehicle 1410, respectively. Alternatively, the autonomous vehicle 1410 may further include any number of other depth sensors or range cameras with fields of view extending in any direction.

As is also shown in FIG. 14A, the autonomous vehicle 1410 includes a visual camera 1430-4 that is configured to capture color, grayscale or black-and-white images from fields of view extending from one or more surfaces of the autonomous vehicle 1410. Alternatively, the autonomous vehicle 1410 may be outfitted with any number of visual cameras 1430-4 that are configured to capture any other type or form of imaging data.

The autonomous vehicle 1410 may also include a number of other wireless energy sensors that are substantially omni-directional, including but not limited to a Bluetooth sensor (or receiver), a Wi-Fi sensor (or receiver), or a magnetometer. Alternatively, in some embodiments, the autonomous vehicle 1410 may be a ground vehicle, such as an autonomous mobile robot, having any number of the sensors 1430-1, 1430-2, 1430-3, 1430-4 shown in FIG. 14A or described herein.

Figure 14B:
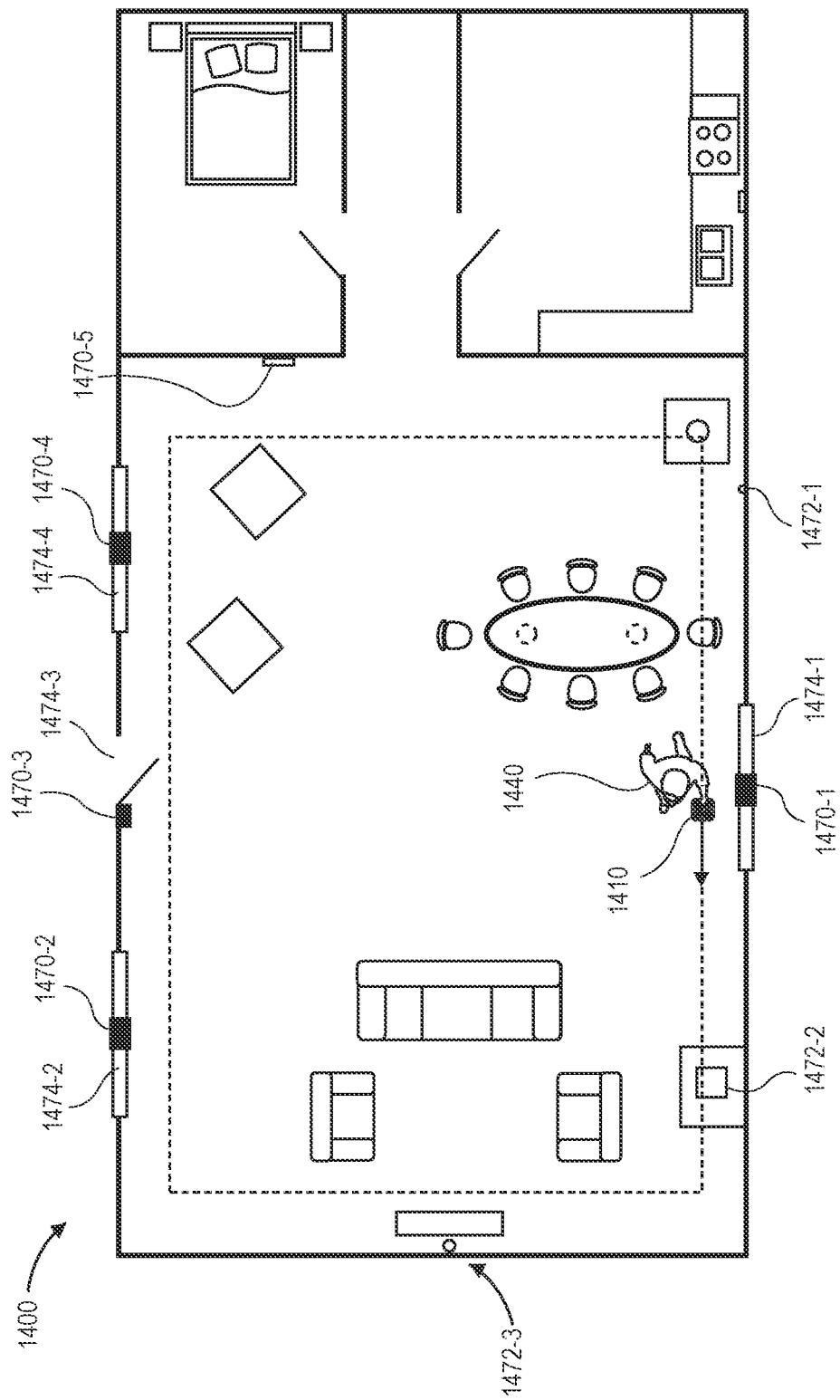

Autonomous vehicles of the present disclosure, such as the autonomous vehicle 1410, may be transported or carried throughout any number of spaces within a facility, and may capture images or other data from such spaces while being transported or carried throughout the facility. As is shown in FIG. 14B, the autonomous vehicle 1410 is transported or carried by the actor 1440 throughout a facility 1460 having a number of portals, sensors or sources of wireless energy. For example, as is shown in FIG. 14B, the facility 1460 includes an electrical outlet 1472-1, a wireless router 1472-2 and an electrical outlet 1472-3. The electrical outlets 1472-1, 1472-3 emit magnetic fields having strengths that may be calculated according to Ampere's Law. The wireless router 1472-2 is configured to transmit and receive electromagnetic signals according to any protocol or standard, e.g., the 802.11 standard, including frequencies within bands centered at 1400 MHz, 2.4 GHz, 3.6 GHz, 4.9 GHz, 5 GHz, 5.9 GHz, 60 GHz or others. As is further shown in FIG. 14B, the facility 1460 also includes a plurality of portals, including windows 1474-1, 1474-2, 1474-4 and a door 1474-3. Each of the portals includes a sensor 1470-1, 1470-2, 1470-3, 1470-4 that may be programmed or configured to transmit one or more signals in response to changes in state of a corresponding one of the portals, such as when the portals are opened or closed, or locked or unlocked. The facility 1460 also includes a smoke detector 1470-5, which may be configured to detect the presence of smoke within the facility 1460 using one or more photoelectric sensors or ionization sensors. Alternatively, or additionally, the smoke detector 1470-5 may also be programmed or configured to monitor for any other type or form of airborne matter, such as carbon dioxide, carbon monoxide, or other substances.

Figure 14C:
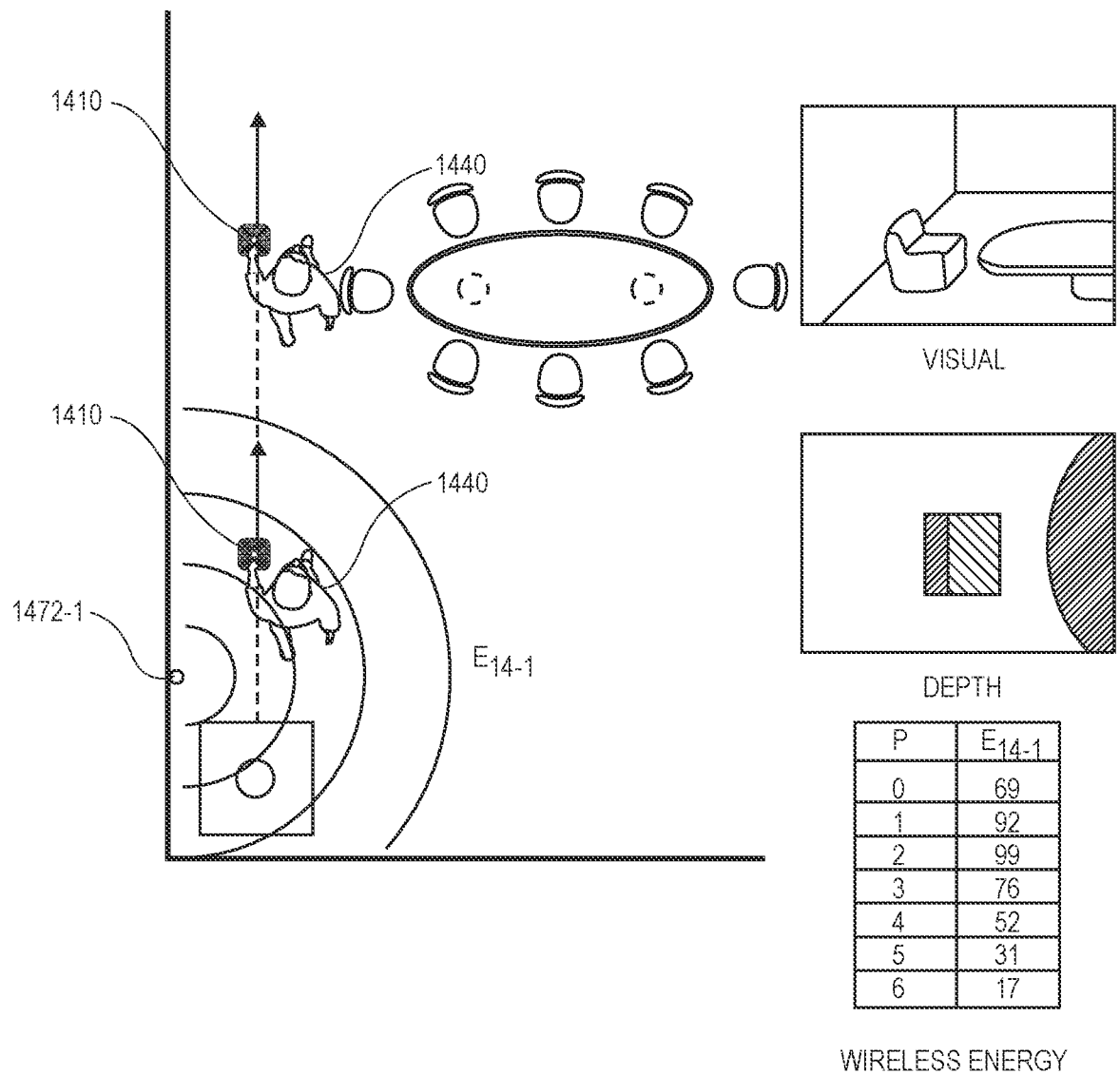

The actor 1440 transports or carries the autonomous vehicle 1410 throughout the facility 1460, and the autonomous vehicle 1410 captures data using the one or more onboard sensors 1430-1, 1430-2, 1430-3, 1430-4, or any other sensors, while tracking its position within the facility 1460. As is shown in FIG. 14C, the autonomous vehicle 1410 travels over or near the electrical outlet 1472-1, adjacent to walls of the facility 1460, and records values of a magnetic field $E_{14-1}$ or other wireless energy radiating from the electrical outlet 1472-1 or one or more components connected thereto, at various time or distance intervals. The autonomous vehicle 1410 also travels over or near furniture or other fixtures, and is further configured to capture visual and depth images at one or more of such intervals. In some embodiments, where the autonomous vehicle 1410 is not transported or carried at a desired or predetermined altitude, attitude or velocity within the facility 1460, the autonomous vehicle 1410 may be programmed to selectively operate one or more propulsion motors or other systems, as necessary, to maintain the autonomous vehicle 1410 at the desired or predetermined altitude, attitude or velocity. In some other embodiments, visual and/or depth images captured by the autonomous vehicle 1410 may be adjusted to account for detections of body parts of the actor 1440, as necessary.

Figure 14D:
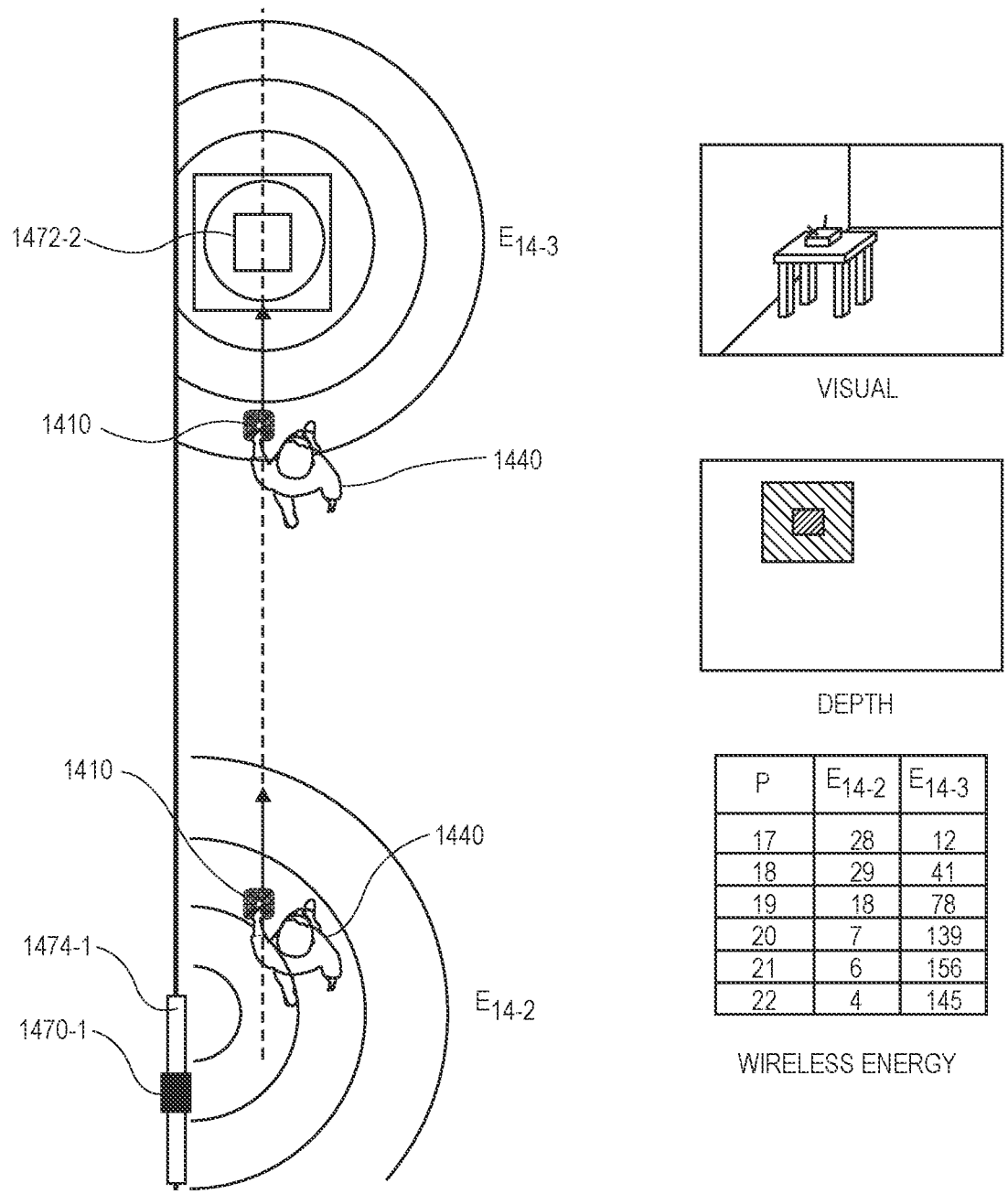

As is shown in FIG. 14D, the autonomous vehicle 1410 is transported or carried within a vicinity of the window 1474-1 while tracking its position, and records values of wireless energy $E_{14-2}$ (e.g., according to one or more Bluetooth protocols or standards) emitted by the window sensor 1470-1 at various time or distance intervals. The autonomous vehicle 1410 is further transported or carried over or near the wireless router 1472-2 while tracking its position, and also records values of wireless energy $E_{14-3}$ (e.g., according to one or more Wi-Fi protocols or standards) emitted by the wireless router 1472-2 at various time or distance intervals. The autonomous vehicle 1410 also captures visual and depth images at one or more of such intervals.

Figure 14E:
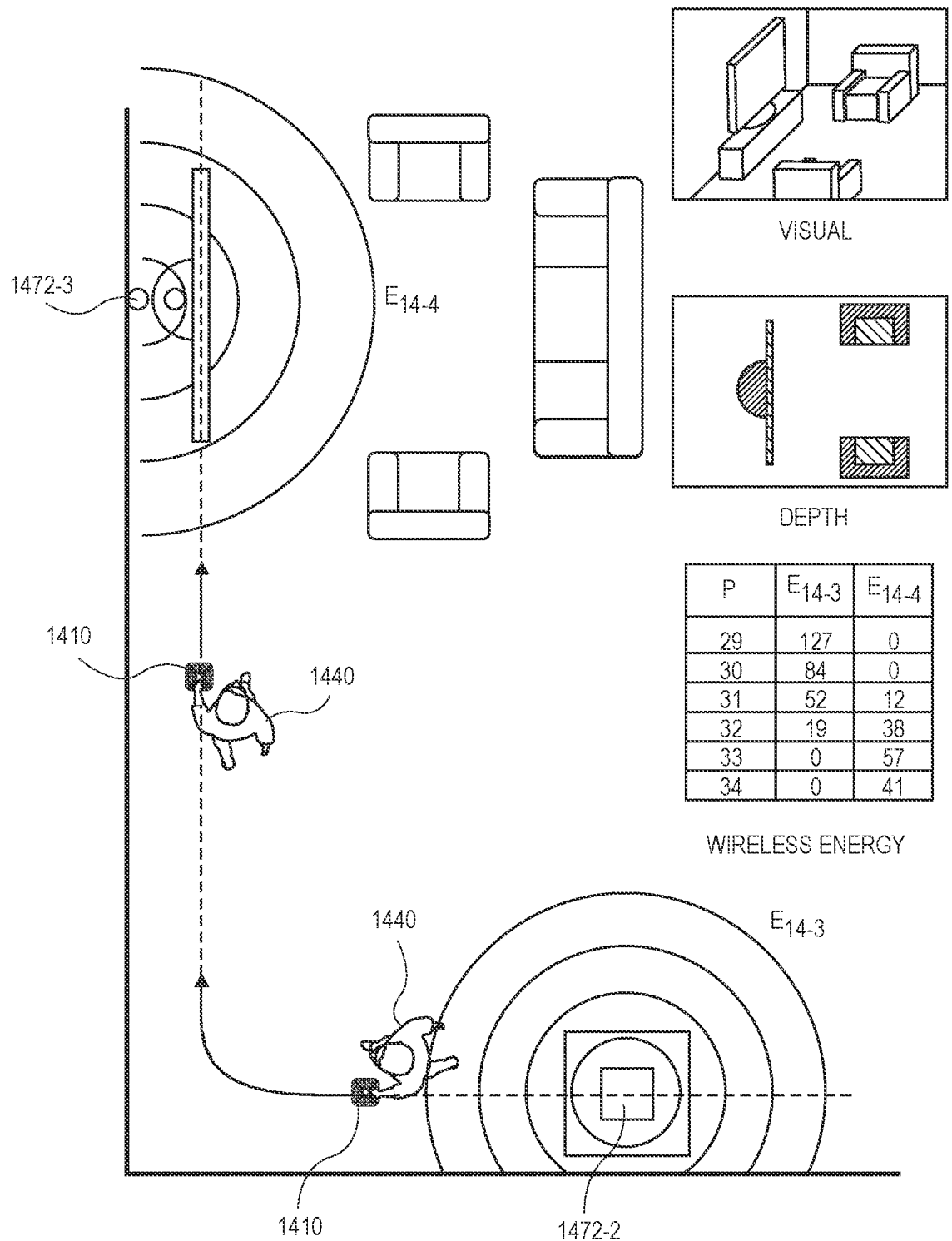

As is shown in FIG. 14E, the autonomous vehicle 1410 is transported or carried near a corner of the facility 1460, before the actor 1440 turns to change course and to transport or carry the autonomous vehicle 1410 adjacent to another wall of the facility 1460. The autonomous vehicle 1410 continues to record its positions, along with values of wireless energy $E_{14-3}$ emitted by the wireless router 1472-2, and also records values of a magnetic field $E_{14-4}$ or other wireless energy radiating from the electrical outlet 1472-3 or one or more components connected thereto. The autonomous vehicle 1410 is also transported or carried over or near furniture or other fixtures, and is captures visual and depth images at one or more of such intervals.

Figure 14F:
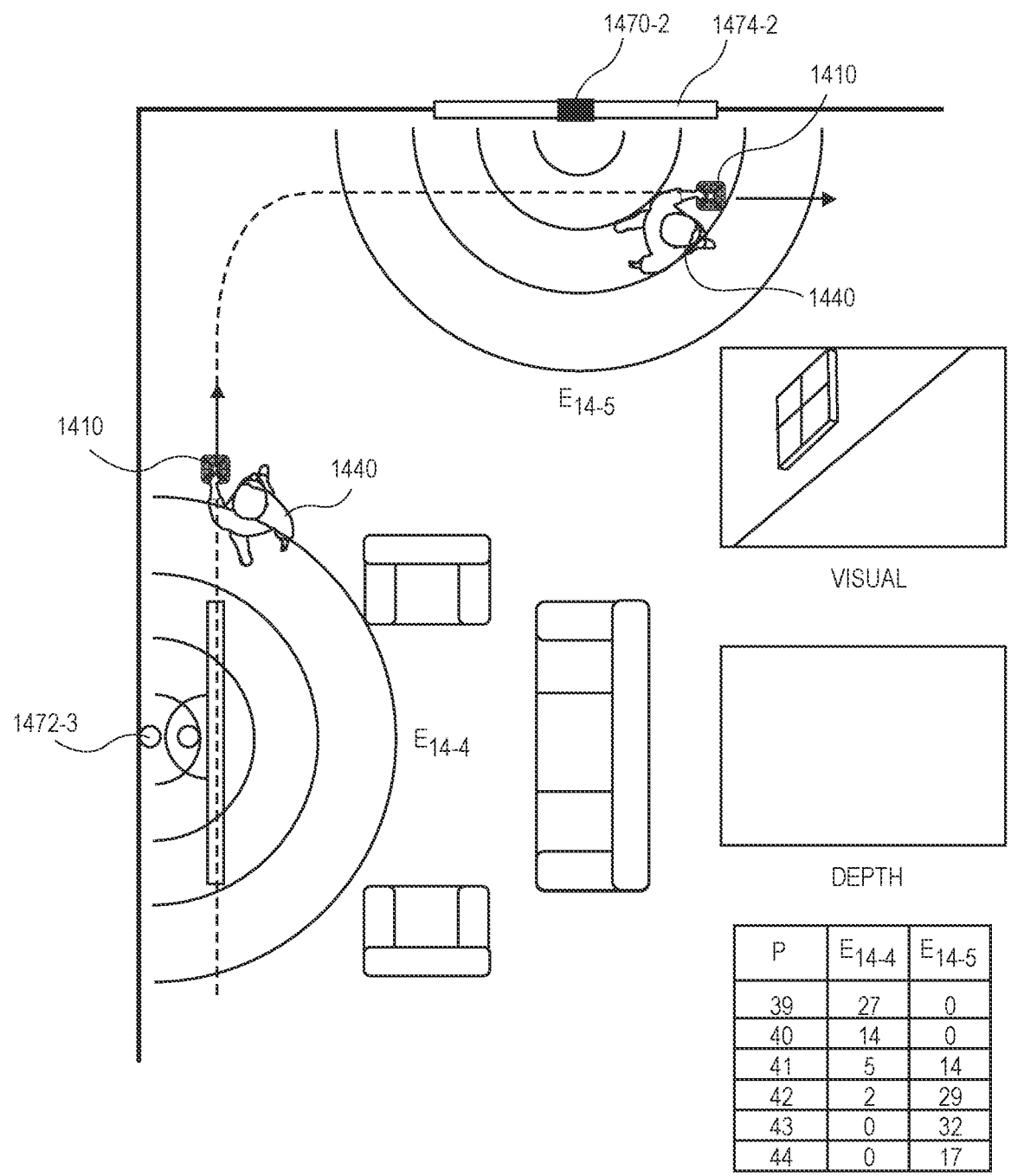

As is shown in FIG. 14F, the autonomous vehicle 1410 is transported or carried near another corner of the facility 1460, before the actor 1440 turns to change course and to transport the autonomous vehicle 1410 adjacent to another wall of the facility 1460. The autonomous vehicle 1410 continues to record its positions, along with values of the magnetic field $E_{14-4}$ radiating from the electrical outlet 1472-3 or the one or more components connected thereto, and also records values of wireless energy $E_{14-5}$ (e.g., according to one or more Bluetooth protocols or standards) emitted by the window sensor 1470-2. The autonomous vehicle 1410 is also transported or carried over or near furniture or other fixtures, and captures visual and depth images at one or more of such intervals.

Figure 14G:
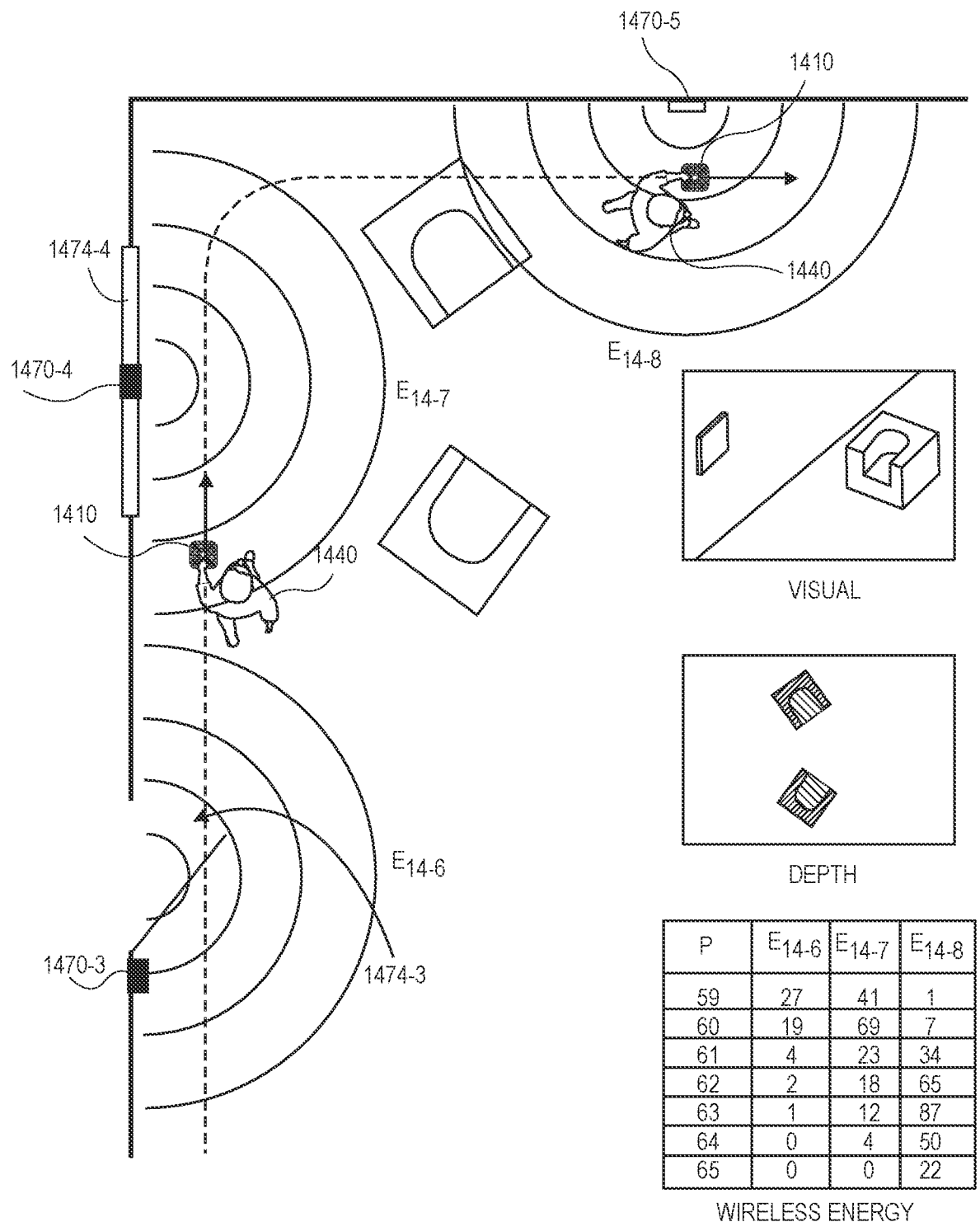

As is shown in FIG. 14G, the autonomous vehicle 1410 is transported or carried near another corner of the facility 1460, before the actor 1440 turns to change course and to transport the autonomous vehicle 1410 adjacent to another wall of the facility 1460. The autonomous vehicle 1410 continues to record its positions, along with values of wireless energy $E_{14-6}$, $E_{14-7}$ (e.g., according to one or more Bluetooth protocols or standards) emitted by the door sensor 1470-3 and the window sensor 1470-4. The autonomous vehicle 1410 records values of wireless energy $E_{14-8}$ (e.g., according to one or more Bluetooth protocols or standards) emitted by the smoke detector 1470-5. The autonomous vehicle 1410 is also transported or carried over or near furniture or other fixtures, and captures visual and depth images at one or more of such intervals.

Information or data captured by the autonomous vehicle 1410 while the autonomous vehicle is carried throughout the facility 1460, such as is shown in FIGS. 14C through 14G, may be interpreted to generate a physical map of the facility 1460 having one or more layers identifying locations of boundaries of spaces within the facility as well as one or more utilities, services or other systems within such spaces. In some embodiments, various utilities, services or other systems may be identified in any manner, such as by analyzing information or data regarding wireless energy (e.g., communications signals, magnetic fields or other energy) emitted within the facility 1460, including but not limited to the energy $E_{14-1}$, $E_{14-2}$, $E_{14-3}$, $E_{14-4}$, $E_{14-5}$, $E_{14-6}$, $E_{14-7}$, $E_{14-8}$, as captured by the autonomous vehicle 1410. Locations of such utilities, services or systems may be identified by determining strengths of the wireless energy at various locations within the facility, as determined by the autonomous vehicle 1410.

Figure 14H:
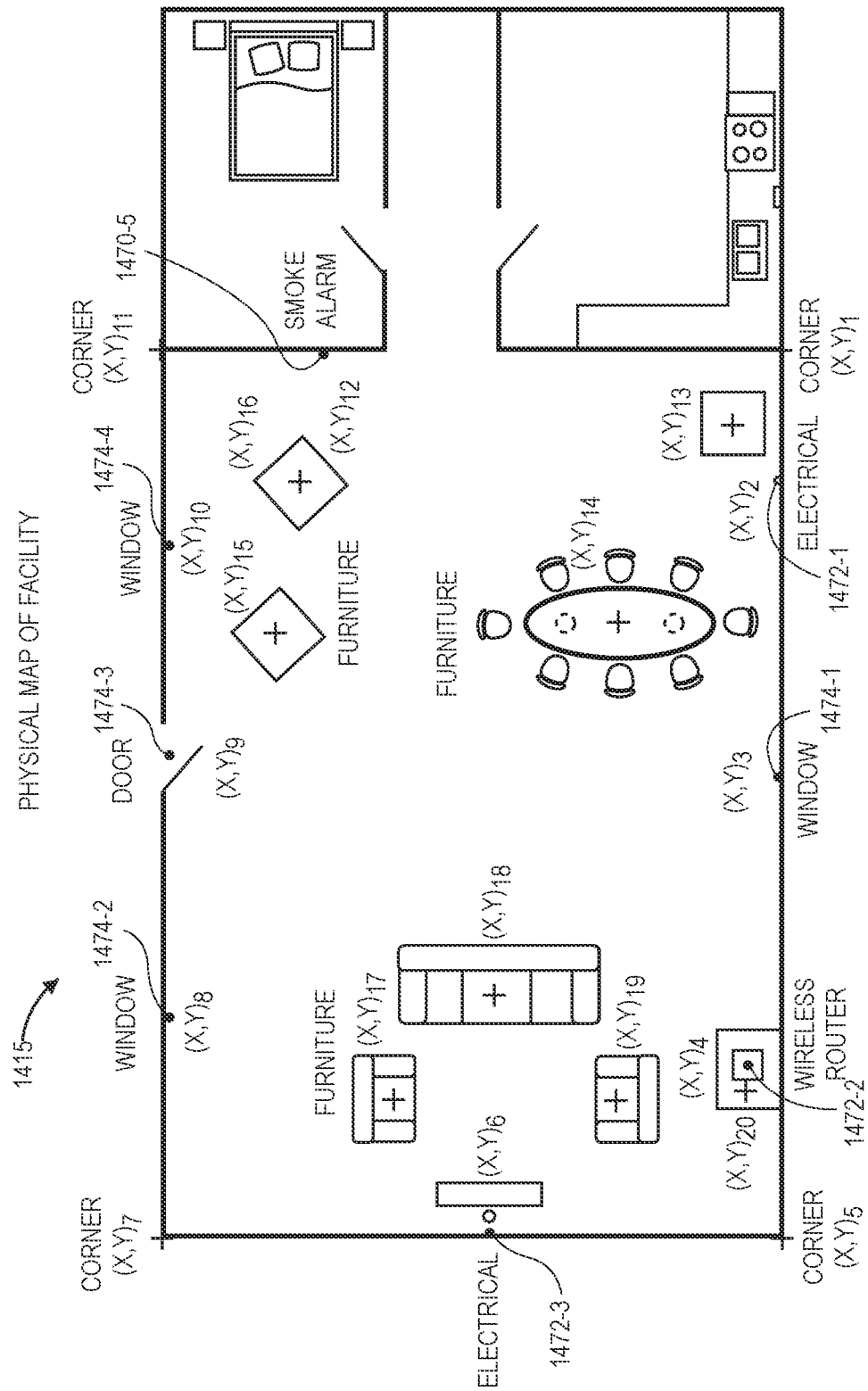

As is shown in FIG. 14H, the physical map 1415 includes coordinates $(x, y)_1$, $(x, y)_5$, $(x, y)_7$, $(x, y)_{11}$ corresponding to locations of corners of the facility 1460. Additionally, the physical map 1415 further includes coordinates $(x, y)_2$, $(x, y)_6$, corresponding to locations of the electrical outlets 1472-1, 1472-3, and coordinates $(x, y)_4$ corresponding to a location of the wireless router 1472-2. The physical map 1415 also includes coordinates $(x, y)_3$ of a location of the window 1474-1, as determined based on signals received from the window sensor 1470-1, as well as coordinates $(x, y)_8$, $(x, y)_{10}$ of locations of the windows 1474-2, 1474-4, as determined based on signals received from the window sensors 1470-2, 1470-4. The physical map 1415 further includes coordinates $(x, y)_9$ of a location of the door 1474-3, as determined based on signals received from the door sensor 1470-3, and coordinates $(x, y)_{12}$ of a location of the smoke detector 1470-5, as determined based on signals received from the smoke detector 1470-5.

Additionally, the physical map 1415 also includes sets of coordinates $(x, y)_{13}$, $(x, y)_{14}$ corresponding to locations of furniture within a vicinity of the electrical outlet 1472-1 and the window 1474-1, sets of coordinates $(x, y)_{15}$, $(x, y)_{16}$ corresponding to locations of furniture within a vicinity of the window 1474-4, sets of coordinates $(x, y)_{17}$, $(x, y)_{18}$, $(x, y)_{19}$ corresponding to locations of furniture within a vicinity of the electrical outlet 1472-3 and sets of coordinates $(x, y)_{20}$ corresponding to a location of furniture on which the wireless router 1472-2 rests. The sets of coordinates $(x, y)_{13}$, $(x, y)_{14}$, $(x, y)_{15}$, $(x, y)_{16}$, $(x, y)_{17}$, $(x, y)_{18}$, $(x, y)_{19}$, $(x, y)_{20}$ may have been determined based on the visual images and depth images captured by the autonomous vehicle 1410, which may be processed to not only detect and classify the objects depicted therein but also to determine the respective locations of such objects based on their locations within image planes of such images and the positions of the autonomous vehicle 1410 within the facility 1460 when the images were captured.

Once the physical map 1415 of FIG. 14H has been generated, the physical map 1415 may be stored in any memory component, data store or other location and used for any purpose.

Alternatively, in some embodiments, rather than capturing wireless energy from one or more sensors or other sources, an autonomous vehicle, e.g., the autonomous vehicle 1410, may transmit wireless energy of any type or form to such sensors or other sources as the autonomous vehicle travels throughout one or more spaces of a facility. Where the sensors or other sources are so configured or equipped, the sensors or other sources may capture the wireless energy transmitted by the autonomous vehicle and report values of the wireless energy at specific times to one or more computer devices or systems, such as an intermediary device located at or near the facility or, alternatively, in one or more alternate or virtual locations, e.g., in a "cloud"-based environment. Based on positions of the autonomous vehicle and the values of the wireless energy at such times, a physical map including locations of some or all of the sensors or other sources may be generated independently or along with one or more visual images or depth images captured by the autonomous vehicle or, alternatively, by one or more of the sensors or other sources. Moreover, in some embodiments, rather than being transported or carried by the actor 1440, the autonomous vehicle 1410 may travel throughout the facility 1460 autonomously, capturing data by one or more onboard sensors and executing one or more changes in course, speed or altitude, as necessary. Data captured by the autonomous vehicle 1410 may be processed to generate a physical map accordingly.

Figure 15A:
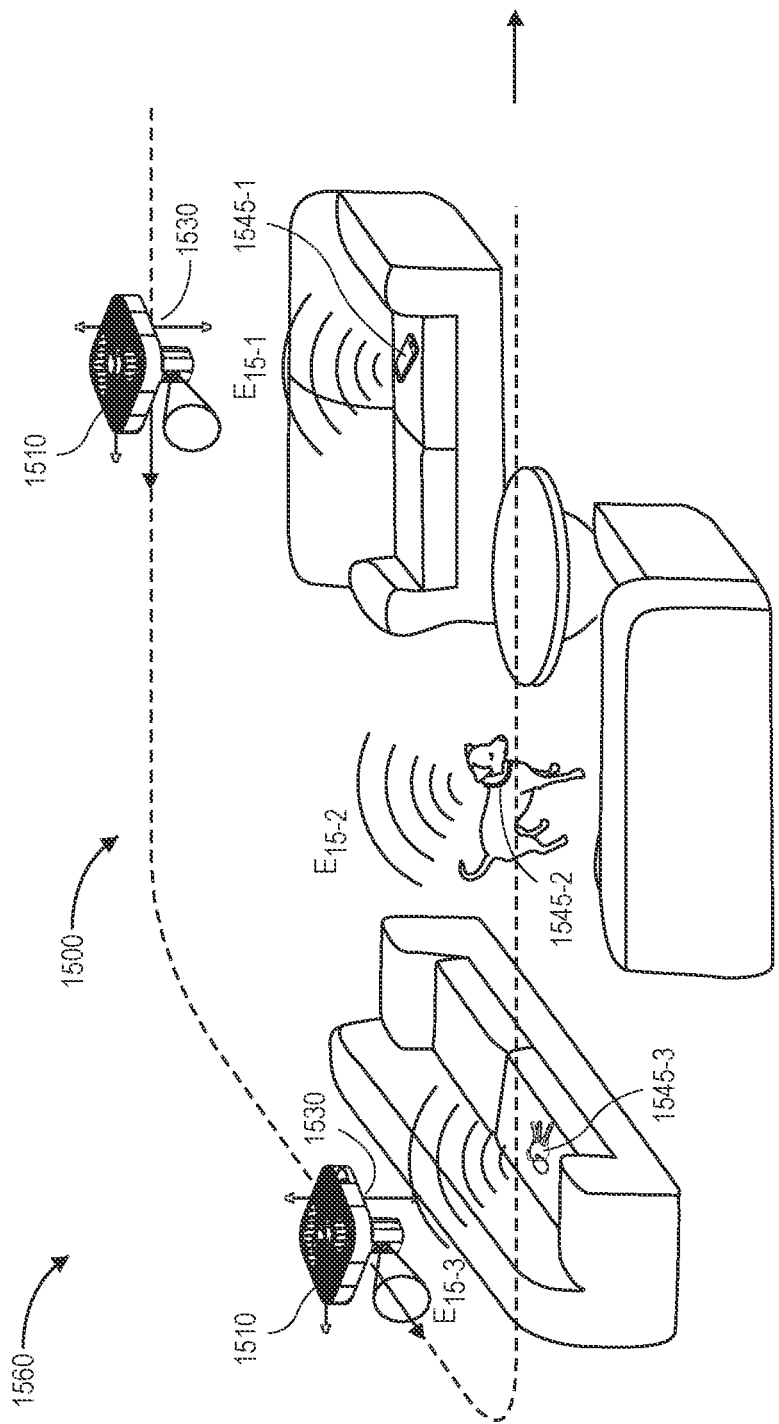
FIGS. 15A and 15B are views of aspects of one system including an autonomous home security device in accordance with embodiments of the present disclosure.
Figure 15B:
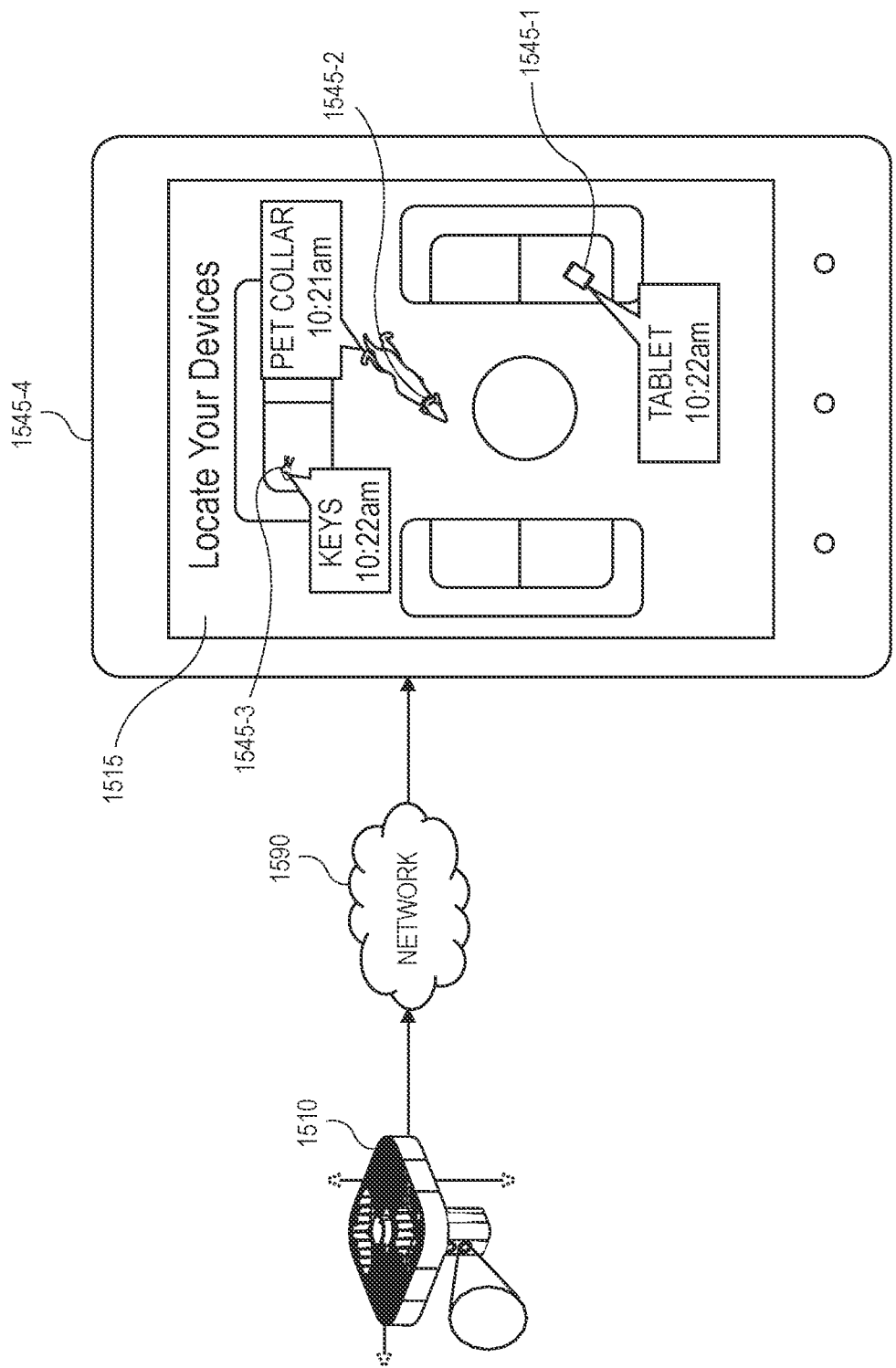

As is discussed above, the autonomous home security devices of the present disclosure may travel throughout a facility and detect locations of one or more wireless energy-emitting objects, such as mobile devices or others, and generate one or more reports regarding the locations of such objects on behalf of one or more users. Referring to FIGS. 15A and 15B, views of aspects of one system 1500 including an autonomous home security device, e.g., an aerial vehicle 1510, in accordance with embodiments of the present disclosure are shown. Except where otherwise noted, reference numerals preceded by the number "15" shown in FIGS. 15A and 15B indicate components or features that are similar to components or features having reference numerals preceded by the number "14" shown in FIGS. 14A through 14H, by the number "12" shown in FIGS. 12A through 12C, by the number "11" shown in FIGS. 11A through 11D, by the number "9" shown in FIG. 9, by the number "7" shown in FIGS. 7A and 7B, by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

As is shown in FIG. 15A, the aerial vehicle 1510 travels throughout a facility 1560, e.g., along one or more paths or routes. The aerial vehicle 1510 is outfitted with one or more sensors 1530, e.g., digital cameras or other imaging devices, or sensors configured to capture wireless energy of any type or form, such as Wi-Fi or Bluetooth signals, magnetic fields, or any other wireless energy. The aerial vehicle 1510 captures data using the one or more sensors 1530, e.g., regularly or periodically, or at scheduled or random times, while tracking its position throughout the facility 1560. As is shown in FIG. 15A, the aerial vehicle 1510 captures and records values of wireless energy $E_{15-1}$ emitted by a mobile device 1545-1 (e.g., a tablet computer or smartphone), wireless energy $E_{15-2}$ emitted by a pet collar 1545-2, and wireless energy $E_{15-3}$ emitted by a set of car keys 1545-3 (e.g., a fob, or one or more of the keys). The wireless energy $E_{15-1}$, $E_{15-2}$, $E_{15-3}$ may include one or more Wi-Fi signals, Bluetooth signals, RFID signals, NFC signals, or any other energy. Alternatively, or additionally, the wireless energy $E_{15-1}$, $E_{15-2}$, $E_{15-3}$ may include magnetic fields emitted by a current-carrying conductor or any other source, or any other type or form of wireless energy.

As is discussed above, an autonomous home security device that captures wireless energy while tracking its position throughout a facility may classify a source of the wireless energy and determine a location of the source based on strengths of the wireless energy at various positions. As is shown in FIG. 15B, the aerial vehicle 1510 transmits information or data regarding the wireless energy $E_{15-1}$, $E_{15-2}$, $E_{15-3}$ to a mobile device 1545-4 over a network 1590, which may include the Internet in whole or in part. The information or data may include one or more values of the wireless energy $E_{15-1}$, $E_{15-2}$, $E_{15-3}$ at various locations within the facility 1560, as well as positions of the aerial vehicle 1510 when such values were determined. The mobile device 1545-4 may classify sources of the wireless energy $E_{15\text{-}1}$, $E_{15\text{-}2}$, $E_{15\text{-}3}$, and determine that the wireless energy $E_{15\text{-}1}$, $E_{15\text{-}2}$, $E_{15\text{-}3}$ was emitted by the mobile devices 1545-1, 1545-2, 1545-3, respectively. Additionally, the mobile device 1545-4 may determine locations of the sources of the energy $E_{15\text{-}1}$, $E_{15\text{-}2}$, $E_{15\text{-}3}$, viz., the mobile devices 1545-1, 1545-2, 1545-3.

As is shown in FIG. 15B, a physical map 1515 of the facility 1560 is displayed on the mobile device 1545-4. The physical map 1515 indicates locations of the mobile devices 1545-1, 1545-2, 1545-3 within the facility 1560, and further includes identifiers of the mobile devices 1545-1, 1545-2, 1545-3, as well as times at which the mobile devices 1545-1, 1545-2, 1545-3 were most recently located based on the wireless energy emitted thereby. The physical map 1515 also indicates locations, colors, shapes or other attributes of background features within the facility 1560, which may be identified based on visual images or depth images captured by the aerial vehicle 1510, or by imaging devices provided aboard one or more other autonomous vehicles or any other systems.

Figure 16A:
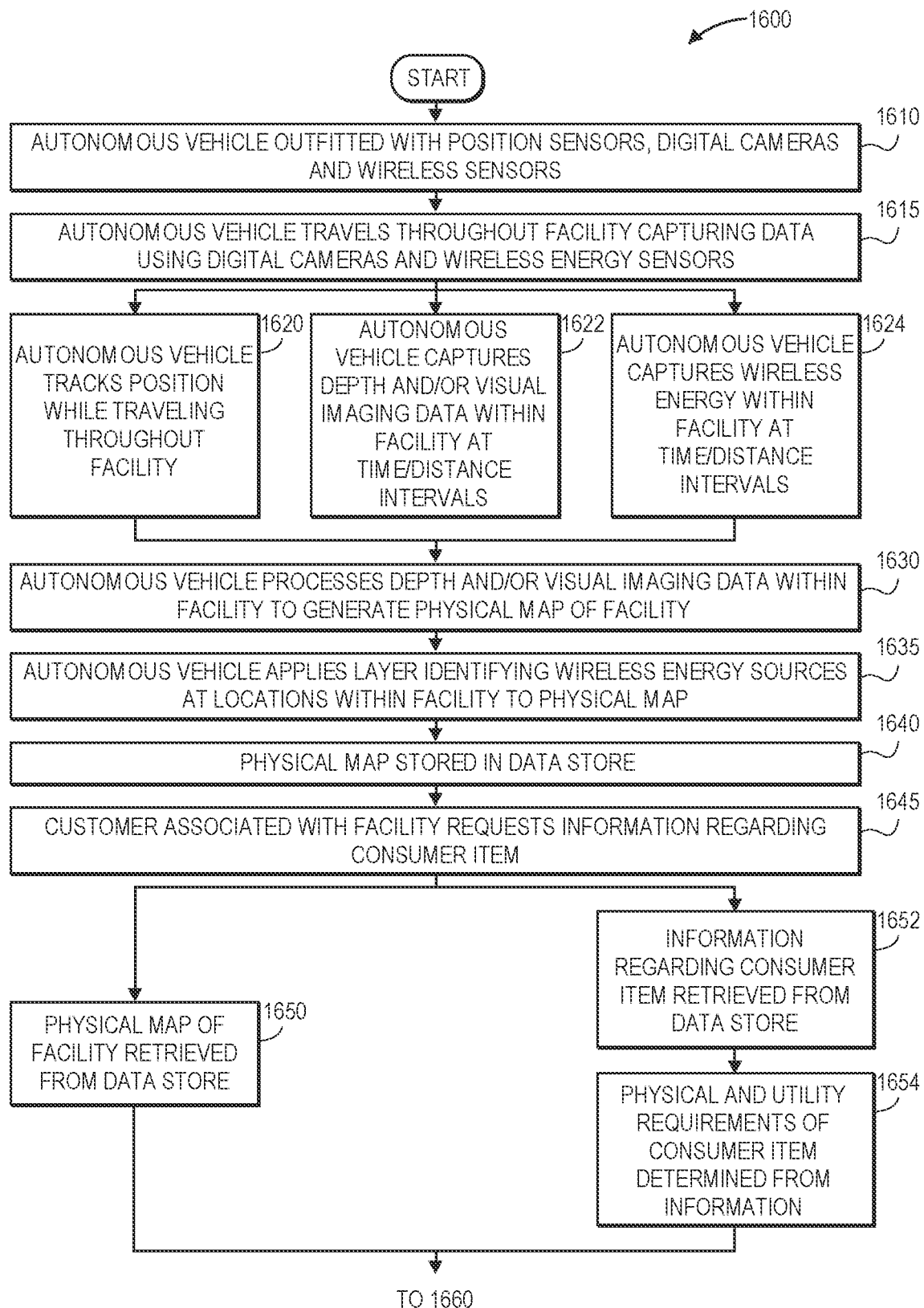
FIGS. 16A and 16B are a flow chart of one process for using an autonomous home security device in accordance with embodiments of the present disclosure.
Figure 16B:
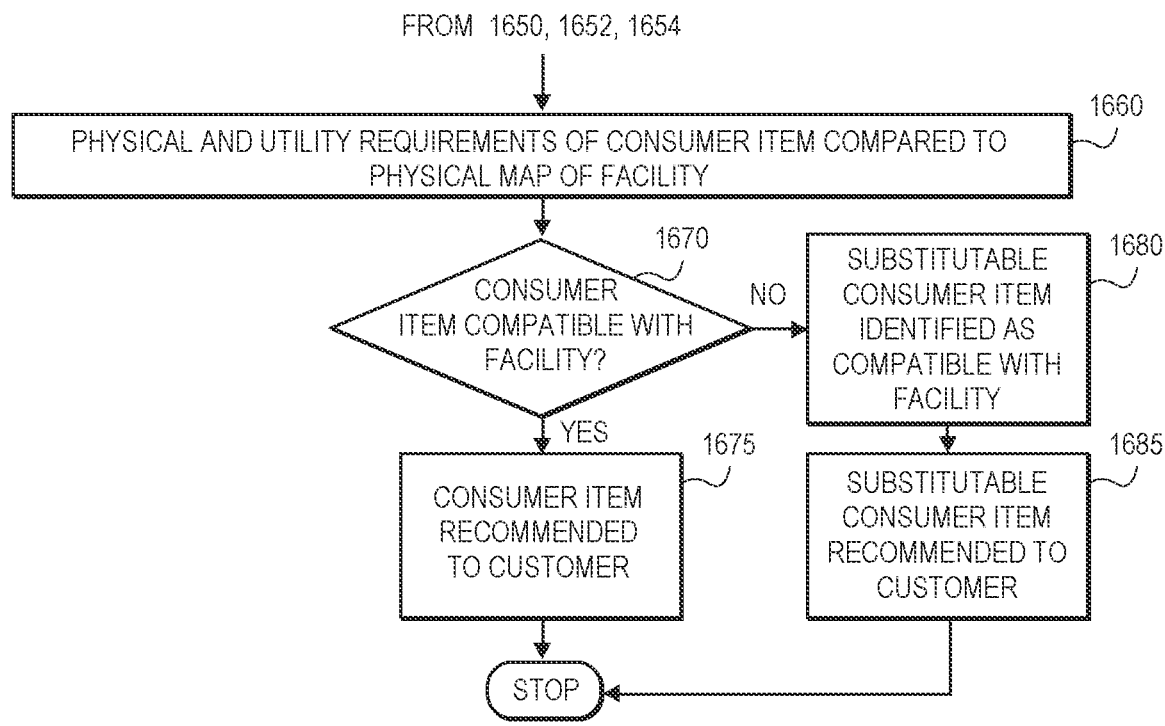

As is also discussed above, a physical map of a facility generated by one or more of the autonomous vehicles of the present disclosure may be used to aid in the selection of one or more consumer goods for use in the facility, or in identifying one or more consumer goods that may be accommodated within spaces of the facility. Referring to FIGS. 16A and 16B, a flow chart 1600 of one process for using an autonomous home security device in accordance with embodiments of the present disclosure is shown.

At box 1610, an autonomous vehicle is outfitted with position sensors, digital cameras and any other wireless sensors. The autonomous vehicle may be an aerial vehicle (e.g., a drone), or, alternatively, an autonomous ground vehicle (e.g., a robot), or any other autonomous vehicle. At box 1615, the autonomous vehicle travels throughout a facility capturing data using the digital cameras and the wireless energy sensors. For example, the autonomous vehicle may be transported or carried, or may autonomously travel, throughout spaces of the facility in regular or irregular patterns, such as along one or more paths that are parallel to walls, ceilings and/or floors.

At box 1620, the autonomous vehicle tracks its position while traveling through the facility. In parallel, at box 1622, the autonomous vehicle captures depth and/or visual imaging data within the facility at various time or distance intervals, and at box 1624, the autonomous vehicle captures wireless energy transmitted by one or more sources within the facility at the various time or distance intervals.

At box 1630, the autonomous vehicle processes the depth and/or visual imaging data captured from within the facility in order to construct a physical map of the facility. For example, the depth imaging data may include ranges to one or more objects within fields of view of a depth sensor or range camera, and boundaries or other features within the space may be identified based on such ranges. The visual imaging data may likewise be processed to identify or detect one or more boundaries or other features, e.g., based on one or more edges, contours, outlines, colors, textures, silhouettes, shapes or other characteristics of objects depicted within such images. The depth imaging data and/or the visual imaging data may be processed independently or in concert with one another to generate the physical map.

At box 1635, the autonomous vehicle determines locations of sources of the wireless energy captured at box 1624, and applies a layer to the physical map generated at box 1630 that identifies the sources at such locations. At box 1640, the physical map is stored in one or more data stores, which may be provided at the location or in one or more alternate or virtual locations, such as in a "cloud"-based environment. The physical map that is stored in the one or more data stores may include locations of boundaries of spaces within the facility as well as one or more utilities, services or other systems within such spaces. The physical map may be an original physical map that was generated and stored for the first time in the one or more data stores, or one or more updates to the original physical map that is generated at a later time.

At box 1645, a customer associated with the facility requests information regarding one or more consumer items. For example, the customer may make a request via one or more pages associated with an electronic marketplace, such as by entering one or more keywords into a search engine, or selecting one or more categories, and identifying the one or more consumer items based on results obtained via the search engine or within a list of consumer items in one or more selected categories. Alternatively, the customer may make a request by telephone, or may make an in-person request for such information at a bricks-and-mortar facility.

At box 1650, a physical map of the facility, e.g., the physical map stored in the one or more data stores at box 1640, is retrieved from the one or more data stores. In parallel, at box 1652, information regarding the consumer item is retrieved from one or more data stores, and at box 1654, physical and utility requirements of the consumer item are determined from the information that is retrieved. The information may be a set of information or data provided to an electronic marketplace, a bricks-and-mortar establishment, or any other entity, and may include one or more identifiers or labels of the consumer item, which may be used to access or otherwise determine dimensions such as lengths, widths, heights, volumes, surface areas, masses or other physical dimensions of the consumer item, as well as any additional attributes of the consumer item, such as whether the consumer item requires AC or DC power, whether the consumer item requires a predetermined physical clearance or distance between the consumer item and one or more other items, whether the consumer item requires direct sunlight or proximity to water, or whether the consumer item has any other operating requirements, restrictions or limitations. Such requirements, restrictions or limitations may be either objective in nature, e.g., determined by a manufacturer or other vendor of the consumer item, or subjective in nature, e.g., determined from one or more comments or reviews of the consumer item provided by other customers.

At box 1660, the physical and utility requirements of the consumer item determined at box 1654 are compared to the physical map of the facility. For example, whether the facility includes a sufficiently large floor space or sufficiently high ceilings that may accommodate the consumer item may be determined based on the physical map and the physical and utility requirements. Likewise, whether one or more locations within the facility where the consumer item may be installed are sufficiently proximate to one or more other consumer items or fixtures may also be determined based on the physical map and the physical and utility requirements. Alternatively, whether utility connections at the facility, e.g., connections to power or one or more networks, are adequate to support installing the consumer item at the facility, may be determined based on the physical map and the physical and utility requirements. Any other considerations that may relate to the anticipated or expected use of the consumer item at the facility may be considered in accordance with embodiments of the present disclosure.

At box 1670, whether the consumer item is compatible with the facility is determined. If the consumer item is determined to be incompatible with the facility, for any reason, the process advances to box 1680, where a substitutable consumer item is identified as compatible with the facility. For example, one or more substitutable consumer items that are associated with one or more keywords that were entered by the customer or are included in one or more categories with the consumer item may be identified in any manner or on any basis. Alternatively, the substitutable consumer item may have anticipated or expected uses that are similar to those of the consumer item, or may have customer ratings that are similar to those of the consumer item. A consumer item may be identified as substitutable for the consumer item for which the customer requested information on any basis. At box 1685, the substitutable consumer item is recommended to the customer, e.g., by presenting information regarding the substitutable consumer item to the customer in one or more pages in a user interface of a browser or other application, and the process ends. In some embodiments, such information may be presented to the customer in a manner that explains why the substitutable consumer item, and not the consumer item for which the customer requested information at box 1645, is being recommended to the customer.

If the consumer item is compatible with the facility, however, the process advances to box 1675, where the consumer item is recommended to the customer, e.g., by presenting information regarding the consumer item to the customer in one or more pages in a user interface of a browser or other application, and the process ends.

Referring to FIGS. 17A through 17D, views of aspects of one system including an autonomous home security device in accordance with embodiments of the present disclosure are shown. Except where otherwise noted, reference numerals preceded by the number "17" shown in FIGS. 17A through 17D indicate components or features that are similar to components or features having reference numerals preceded by the number "15" shown in FIGS. 15A and 15B, by the number "14" shown in FIGS. 14A through 14H, by the number "12" shown in FIGS. 12A through 12C, by the number "11" shown in FIGS. 11A through 11D, by the number "9" shown in FIG. 9, by the number "7" shown in FIGS. 7A and 7B, by the number "6" shown in FIGS. 6A and 6B, by the number "5" shown in FIGS. 5A and 5B, by the number "4" shown in FIGS. 4A and 4B, by the number "3" shown in FIGS. 3A through 3C, by the number "2" shown in FIG. 2 or by the number "1" shown in FIGS. 1A through 1F.

Figure 17A:
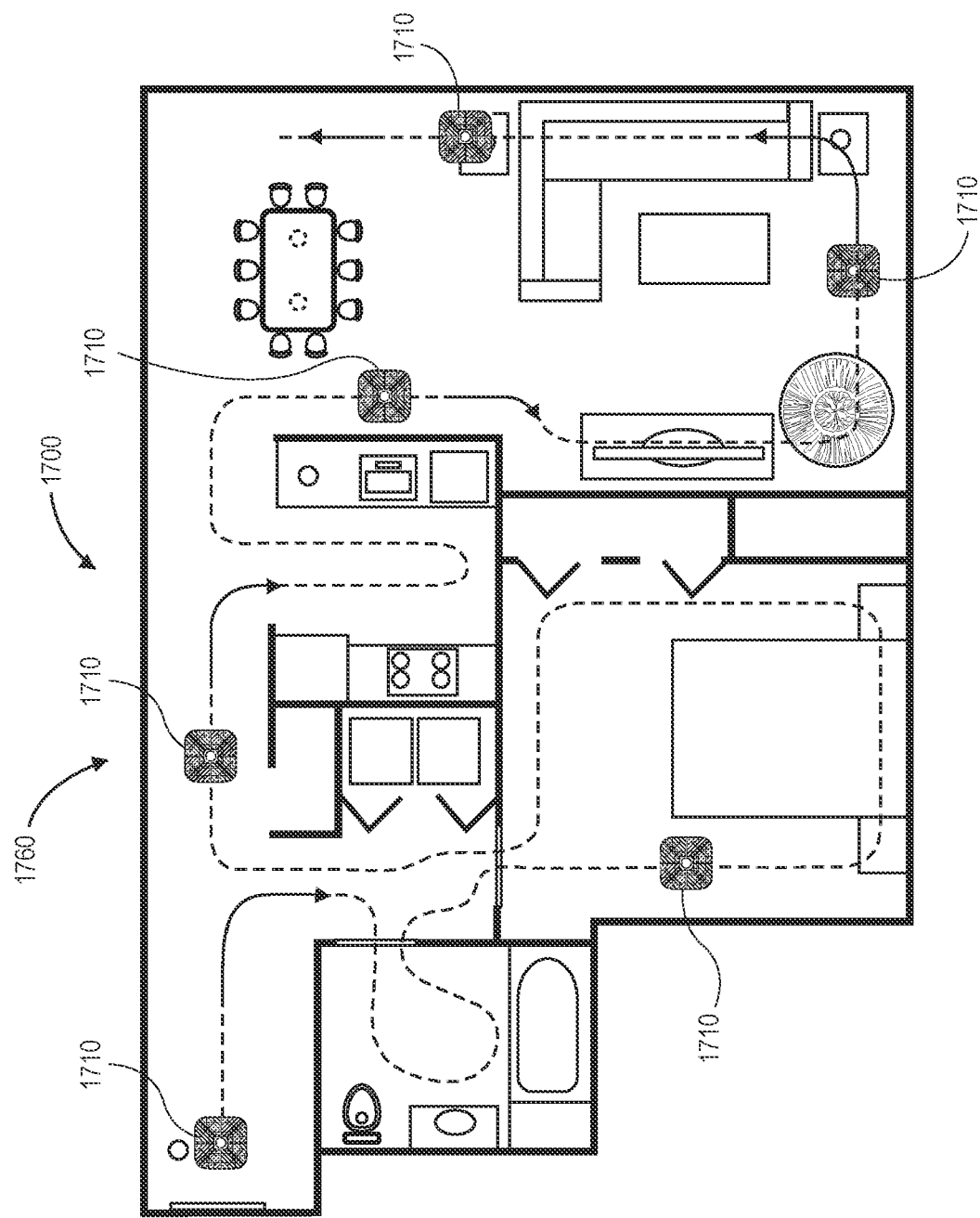
FIGS. 17A through 17D are views of aspects of one system including an autonomous home security device in accordance with embodiments of the present disclosure.

As is shown in FIG. 17A, an autonomous vehicle 1710 (e.g., an unmanned aerial vehicle, or drone) is shown traveling throughout a facility 1760 (e.g., an apartment or condominium). The autonomous vehicle 1710 is programmed or configured to travel at selected courses, speeds and altitudes throughout the facility 1760, into and out of one or more spaces, and over or near furniture, appliances, fixtures and other aspects of the facility 1760. The autonomous vehicle 1710 is further outfitted with one or more sensors, such as digital cameras or other imaging devices, wireless energy sensors, or any other sensors configured to capture data regarding conditions within the facility 1760. In some embodiments, the autonomous vehicle 1710 may be transported or carried throughout the facility 1760, e.g., by a human actor, and may capture data regarding conditions within the facility 1760 as the autonomous vehicle 1710 is transported or carried. Alternatively, in some embodiments, the autonomous vehicle 1710 may be a ground vehicle, such as an autonomous mobile robot.

Figure 17B:
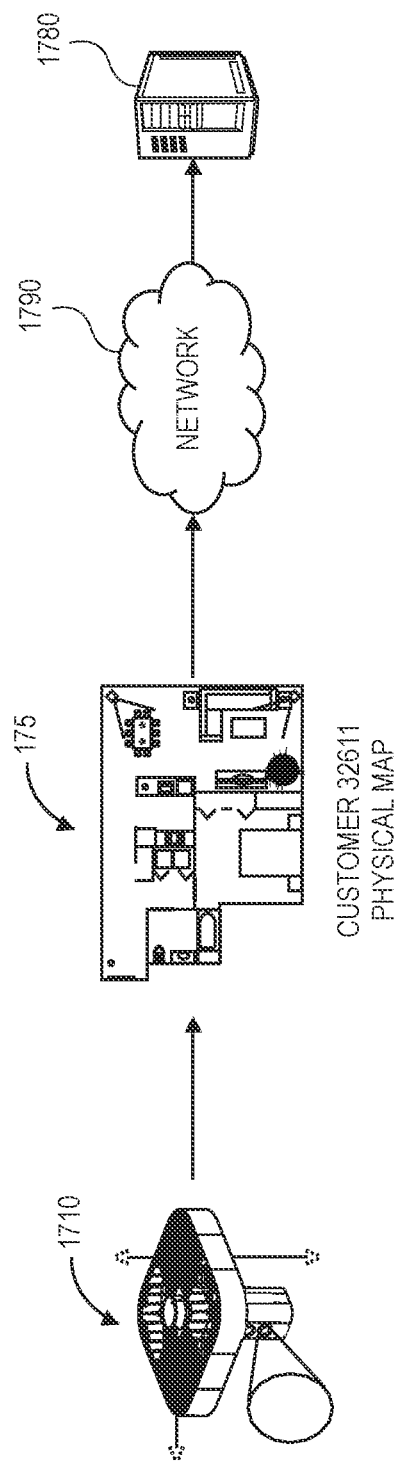

As is shown in FIG. 17B, in accordance with embodiments of the present disclosure, the autonomous vehicle 1710 may be programmed or configured to generate a physical map 175 of the facility 1760, based on any images or other data captured within the facility 1760. The autonomous vehicle 1710 transmits the physical map 175 to an external computer device or system 1780 over a network 1790. The computer device or system 1780 may be associated with an electronic marketplace, a bricks-and-mortar establishment, or any other entity, and the physical map 175 may be stored in association with any type or form of identifying information regarding a customer associated with the facility 1760.

Figure 17C:
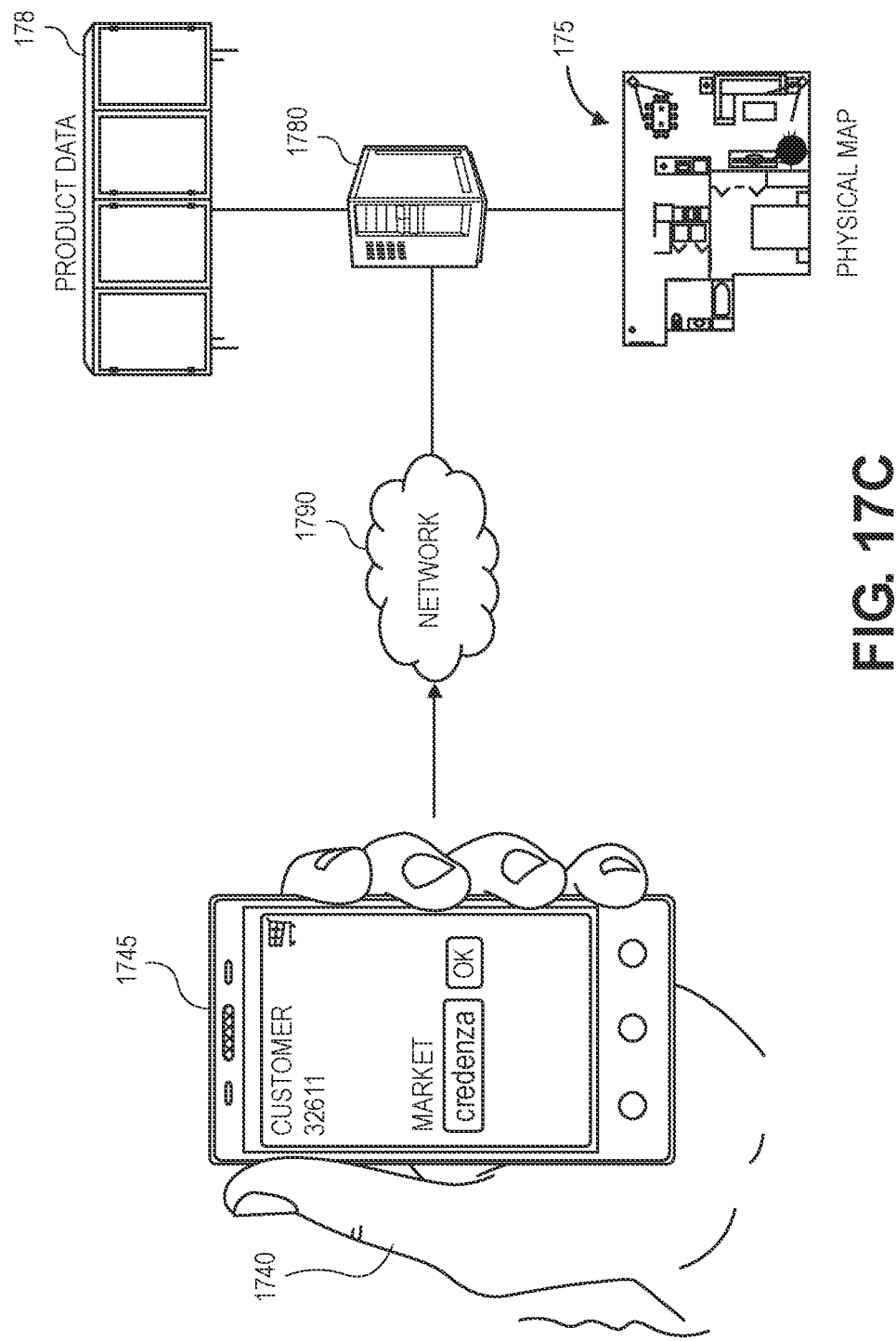

As is shown in FIG. 17C, a customer 1740 associated with the facility 1760 may search for one or more consumer items via a mobile device 1745. For example, as is shown in FIG. 17C, the customer 1740 may enter one or more keywords into a search engine or, alternatively, select a category of items, via one or more pages associated with a browser or other application operating on the mobile device 1745. Upon receiving the keyword from the mobile device 1745 associated with the customer 1740, the computer device or system 1780 may retrieve the physical map 175 of the facility 1760, and product data 178 regarding one or more products responsive to the keyword. Based on the product data 178, the computer device or system 1780 may determine whether a product responsive to the keyword may be accommodated within the facility 1760. For example, the product data 178 may include a set of dimensions or other attributes of the product responsive to the keyword, and may determine whether one or more spaces within the facility 1760 are sufficiently sized or oriented to include the product for any of its anticipated or expected uses.

Figure 17D:
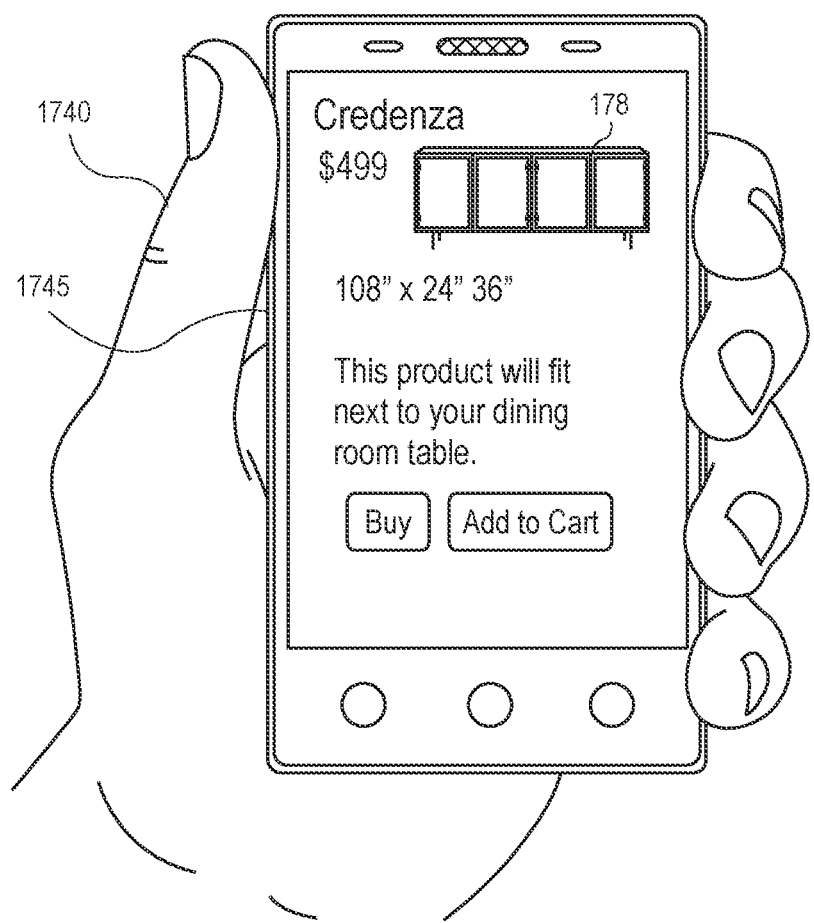

As is shown in FIG. 17D, upon determining that the product responsive to the keyword may be accommodated within the facility 1760, information or data regarding the product, including some or all of the product data 178, is displayed on the mobile device 1745. Alternatively, or additionally, information or data regarding one or more other products, e.g., substitutable products that may be offered in lieu of the product, or complementary products that may be offered along with the product, may also be displayed on the mobile device 1745. The customer 1740 may elect to purchase any number of products via the mobile device 1745, or enter one or more alternate keywords or select one or more categories of items via the mobile device 1745, or take any other actions using the mobile device 1745.

The contents of U.S. patent application Ser. No. 16/584,721 are incorporated by reference herein in their entirety.

Although some embodiments of the present disclosure show the use of autonomous vehicles in support of one or more applications or functions (e.g., security applications or functions) at a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

Additionally, although some of the embodiments show the use of unmanned aerial vehicles or drones, and some of the embodiments show the use of autonomous ground vehicles or robots, those of ordinary skill in the pertinent arts will recognize that the applications or functions performed by an "autonomous vehicle," as described herein, may be executed or performed by any type of vehicle that may be configured for travel on land, by air, or both on land and by air.

Furthermore, although some of the signals or energy that are described as being transmitted or received by one or more transceivers or other sensors herein have specific labels of protocols, standards or frequency bands (e.g., Wi-Fi or Bluetooth), those of ordinary skill in the pertinent arts will recognize that signals or energy may be transmitted or received by one or more transceivers or other sensors at any frequency or at any intensity level, and according to any protocol or standard, in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 8, 10, 13A and 13B or 16A and 16B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
 a fuselage having a first height and a first cross-section,
  wherein the fuselage comprises a first plurality of sides,
   wherein each of the first plurality of sides has the first height and a first width, and wherein the first plurality of sides are joined to define the first cross-section, and
  wherein the first height is greater than the first width;
 a frame having a second height and a second cross-section,
  wherein the frame comprises a second plurality of sides, wherein each of the second plurality of sides has the second height and a second width, and wherein the second plurality of sides are joined to define the second cross-section,
  wherein the second height is less than the first height, wherein the second width is greater than the first width, and wherein a centroid of the first cross-section is aligned along a first axis with a centroid of the second cross-section;
a plurality of struts, wherein each of the struts has a proximal end joined to an external surface of the fuselage and a distal end joined to an internal surface of the frame;
a plurality of propulsion motors, wherein each of the propulsion motors is coupled to one of the plurality of struts;
at least one memory component provided within a chamber defined by the fuselage;
at least one transceiver provided within the chamber; and
at least one computer processor provided within the chamber,
wherein the at least one computer processor is in communication with each of the plurality of propulsion motors, the at least one memory component and the at least one transceiver.

2. The aerial vehicle of claim 1, wherein each of the struts comprises an inlet hole on an upper surface,
wherein the fuselage comprises a plurality of outlet holes provided on a bottom surface,
wherein the fuselage, the chamber and the struts define a plurality of flow paths, and
wherein each of the flow paths extends between one of the inlet holes and one of the outlet holes through the chamber.

3. The aerial vehicle of claim 1, further comprising a time-of-flight sensor mounted at an upper edge of the fuselage,
wherein the time-of-flight sensor is configured to transmit light along a second axis normal to and radially outward from the first axis and to receive one or more reflections of the light,
wherein the time-of-flight sensor is configured to rotate the second axis about the first axis, and
wherein the at least one computer processor is in communication with the time-of-flight sensor.

4. The aerial vehicle of claim 1, further comprising:
a first time-of-flight sensor mounted to an upper edge of the frame, wherein the first time-of-flight sensor is configured to transmit first light above the frame and to receive one or more reflections of the first light; and
a second time-of-flight sensor mounted to a lower edge of the frame, wherein the second time-of-flight sensor is configured to transmit second light below the frame and to receive one or more reflections of the second light,
wherein the at least one computer processor is in communication with the first time-of-flight sensor and the second time-of-flight sensor.

5. The aerial vehicle of claim 1, wherein a bottom surface of the fuselage comprises at least one electrical contact connected to an onboard power source,
wherein the at least one electrical contact is provided in a position on the bottom surface of the fuselage that corresponds to a position of at least one electrical contact on a bottom surface of an opening provided within a charging dock,
wherein the opening defines a third cross-section,
wherein the third cross-section is sized to accommodate the first cross-section, and
wherein the first height is greater than the third height.

6. A method comprising:
receiving, by an aerial vehicle at a first location within a first space of a facility, an indication that one of an event or a condition exists within a second space of the facility at a first time, wherein the aerial vehicle comprises:
a fuselage having a first height and a first cross-section,
wherein the fuselage comprises a first plurality of sides, wherein each of the first plurality of sides has the first height and a first width, and wherein the first plurality of sides are joined to define the first cross-section, and
wherein the first height is greater than the first width;
a frame having a second height and a second cross-section,
wherein the frame comprises a second plurality of sides, wherein each of the second plurality of sides has the second height and a second width, and wherein the second plurality of sides are joined to define the second cross-section,
wherein the second height is less than the first height,
wherein the second width is greater than the first width, and
wherein a centroid of the first cross-section is aligned along a first axis with a centroid of the second cross-section;
determining, by the aerial vehicle, at least one of a course, a speed or an altitude for travel from the first location to a second location within the second space based at least in part on information regarding a map of at least the first space and the second space stored in at least one memory component of the aerial vehicle;
operating at least one of a plurality of propulsion motors of the aerial vehicle to cause the aerial vehicle to travel from the first location to the second location at the at least one of the course, the speed or the altitude;
capturing first data by at least one sensor of the aerial vehicle at a second time, wherein the aerial vehicle is within a vicinity of the second location at the second time; and
determining, by the aerial vehicle based at least in part on the first data, whether the event or the condition exists within the second space at the second time.

7. The method of claim 6, further comprising:
a plurality of struts, wherein each of the struts has a proximal end joined to an external surface of the fuselage and a distal end joined to an internal surface of the frame, wherein each of the propulsion motors is coupled to one of the plurality of struts.

8. The method of claim 7, wherein each of the struts comprises an inlet hole on an upper surface,
wherein the fuselage comprises a plurality of outlet holes provided on a bottom surface,
wherein the fuselage and the struts define a plurality of flow paths, and
wherein each of the flow paths extends from one of the inlet holes through the chamber defined by the fuselage to one of the outlet holes.

9. The method of claim 6, wherein the aerial vehicle further comprises a time-of-flight sensor mounted at an upper edge of the fuselage,
wherein the time-of-flight sensor is configured to transmit light along a second axis normal to and radially outward from the first axis and to receive one or more reflections of the light, and
wherein the time-of-flight sensor is configured to rotate the second axis about the first axis.

10. The method of claim 6, wherein the aerial vehicle further comprises:

a first time-of-flight sensor mounted to an upper edge of the frame, wherein the first time-of-flight sensor is configured to transmit first light above the frame and to receive one or more reflections of the first light; and a second time-of-flight sensor mounted to a lower edge of the frame, wherein the second time-of-flight sensor is configured to transmit second light below the frame and to receive one or more reflections of the second light.

11. The method of claim 6, wherein the aerial vehicle further comprises:

a first cover mounted to an upper edge of the frame, wherein the first cover comprises a first plurality of bars distributed within a first plane, and a second cover mounted to a lower edge of the frame, wherein the second cover comprises a second plurality of bars distributed within a second plane and an opening for accommodating the fuselage, wherein each of the propulsion motors is provided within a cavity defined at least in part by interior surfaces of the frame, the first cover and the second cover.

12. The method of claim 6, wherein at least a portion of at least one of the fuselage or the frame is formed at least in part from one or more of:

an acrylonitrile butadiene styrene;
a carbon fiber;
a composite material;
a metal;
a polycarbonate;
a polystyrene;
a recycled plastic;
a rubber; or
a wood.

13. The method of claim 6, wherein the fuselage of the aerial vehicle is inserted into an opening of a charging dock at the first time, wherein the opening of the charging dock has a third height and a third cross-section, wherein the third cross-section is sized to accommodate the first cross-section of the fuselage, and wherein operating the at least one of the plurality of propulsion motors of the aerial vehicle to cause the aerial vehicle to travel from the first location to the second location comprises:

operating the at least one of the plurality of propulsion motors of the aerial vehicle to ascend from the charging dock.

14. The method of claim 13, wherein the at least one sensor comprises a visual camera having a lens defining a field of view extending normal to the fuselage, wherein a distance between a bottom surface of the fuselage and an axis of orientation of the visual camera is less than the third height, and wherein at least a portion of the first data comprises imaging data captured by the visual camera at the second time.

15. The method of claim 6, further comprising:
prior to the first time, capturing second data by the at least one sensor while the aerial vehicle travels within at least the first space of the facility and the second space of the facility;

determining positions corresponding to at least a first boundary of the first space based at least in part on the second data, wherein the first boundary is associated with one of a floor, a ceiling or a wall;

determining positions corresponding to at least a second boundary of the second space based at least in part on the second data, wherein the second boundary is associated with one of a floor, a ceiling or a wall;

generating the map based at least in part on the positions corresponding to at least the first boundary and the positions corresponding to at least the second boundary; and storing information regarding the map in the at least one memory component.

16. The method of claim 6, wherein receiving the indication that the one of the event or the condition exists within the second space of the facility at the first time comprises:

determining that at least one sensor in one of the first space or the second space has indicated that the one of the event or the condition is occurring within the second space at the first time, wherein determining the at least one of the course, the speed or the altitude comprises:

selecting the second location based at least in part on a third location of the at least one sensor; and generating at least one path for the aerial vehicle to travel from the first location to the second location based at least in part on the map, and wherein operating the at least one of the propulsion motors of the aerial vehicle comprises:

causing the aerial vehicle to travel from the first location to the second location via the at least one path.

17. The method of claim 6, wherein determining whether the event or the condition exists within the second space comprises:

determining, by the aerial vehicle based at least in part on the first data, that the one of the event or the condition exists within at least one of the first space or the second space; and transmitting, by the aerial vehicle, at least one message indicating that the one of the event or the condition exists within the at least one of the first space or the second space to at least one of:

an intermediary device located within the facility; or
a computer device external to the facility.

18. The method of claim 6, wherein the one of the event or the condition is one of:

a high temperature condition;
a low temperature condition;
a fire;
a flood;
an unauthorized entry into the facility;
a temperature above or below a predetermined setpoint;
presence of smoke;
presence of water;
presence of unauthorized personnel;
a level of carbon dioxide above a predetermined setpoint;
a level of carbon monoxide above a predetermined setpoint;
a level of a hydrocarbon above a predetermined setpoint; or
a level of radon above a predetermined setpoint.

19. A system comprising:
an aerial vehicle comprising:

a fuselage having a first height and a first cross-section, wherein a bottom of the fuselage comprises at least a first electrical contact;

a first frame having a second height and a second cross-section, wherein a centroid of the first cross-section is aligned along a first axis with a centroid of the second cross-section, wherein the second height is greater than the first height, and wherein a first area of the first cross-section is greater than a second area of the second cross-section;
a plurality of struts, wherein each of the struts has a proximal end joined to an external surface of the fuselage and a distal end joined to an internal surface of the first frame;
a plurality of propulsion motors, wherein each of the propulsion motors is coupled to one of the plurality of struts;
at least one sensor mounted to at least one of the fuselage or the first frame;
at least one memory component provided within a chamber defined by the fuselage;
at least one transceiver provided within the chamber; and
at least one computer processor provided within the chamber,
wherein the at least one computer processor is in communication with each of the plurality of propulsion motors, the at least one sensor, the at least one memory component and the at least one transceiver; and
a charging dock comprising:
a second frame having a third height and a third cross-section, wherein the second frame comprises an upper surface, a lower surface, and an opening within the upper surface having a fourth height and a fourth cross-section,
wherein the third cross-section is substantially similar to the second cross-section,
wherein the opening is configured to accommodate at least a lower end of the fuselage therein,
wherein a centroid of the second cross-section and a centroid of the fourth cross-section are aligned along the first axis when at least the lower end of the fuselage is accommodated within the opening, and
wherein a bottom of the opening comprises at least a second electrical contact aligned to contact the first electrical contact when at least the lower end of the fuselage is accommodated within the opening.

20. The system of claim 19, wherein each of the struts comprises an inlet hole on an upper surface,
wherein the fuselage comprises a plurality of outlet holes provided on the bottom of the fuselage,
wherein the fuselage and the struts define a plurality of flow paths, and
wherein each of the flow paths extends from one of the inlet holes through the chamber defined by the fuselage to one of the outlet holes.

\* \* \* \* \*